US010896479B2

(12) United States Patent
Vembu et al.

(10) Patent No.: US 10,896,479 B2
(45) Date of Patent: *Jan. 19, 2021

(54) HANDLING PIPELINE SUBMISSIONS ACROSS MANY COMPUTE UNITS

(71) Applicant: Intel Corporation, Santa Clara, CA (US)

(72) Inventors: Balaji Vembu, Folsom, CA (US); Altug Koker, El Dorado Hills, CA (US); Joydeep Ray, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,946

(22) Filed: Jun. 20, 2019

(65) Prior Publication Data
US 2019/0304055 A1 Oct. 3, 2019

Related U.S. Application Data

(63) Continuation of application No. 16/150,012, filed on Oct. 2, 2018, now Pat. No. 10,497,087, which is a (Continued)

(51) Int. Cl.
G06T 1/20 (2006.01)
G06T 15/00 (2011.01)

(52) U.S. Cl.
CPC ............ G06T 1/20 (2013.01); G06T 15/005 (2013.01); G06T 2200/04 (2013.01)

(58) Field of Classification Search
None
See application file for complete search history.

(56) References Cited

U.S. PATENT DOCUMENTS 5,794,016 A 8/1998 Kelleher
5,895,489 A 4/1999 Hammond et al.
(Continued)

FOREIGN PATENT DOCUMENTS

WO 2015/002466 A2 1/2015
WO 2017/027053 A1 2/2017

OTHER PUBLICATIONS

Sampson, Jack, et al. "Exploiting fine-grained data parallelism with chip multiprocessors and fast barriers." Proceedings of the 39th Annual IEEE/ACM International Symposium on Microarchitecture. IEEE Computer Society, 2006.
(Continued)

Primary Examiner — Michelle Chin
(74) Attorney, Agent, or Firm — Jaffery Watson Mendonsa & Hamilton LLP

(57) ABSTRACT

One embodiment provides for a general-purpose graphics processing unit multiple processing elements having a single instruction, multiple thread (SIMT) architecture, the multiple processing elements to perform hardware multithreading during execution of multiple warps of threads, wherein a warp is a group of parallel threads; a scheduler to schedule a set of sub-warps to the multiple processing elements at sub-warp granularity, wherein a sub-warp is a sub-group of parallel threads, a warp includes multiple sub-warps, and the scheduler is to schedule threads in a first sub-warp of a first warp of threads to execute concurrently with the threads in a second sub-warp of a second warp of threads; and a logic unit including hardware or firmware logic, the logic unit to group active threads for execution on the multiple processing elements.

29 Claims, 32 Drawing Sheets

Related U.S. Application Data continuation of application No. 15/493,233, filed on Apr. 21, 2017, now Pat. No. 10,325,341.

(56) References Cited

U.S. PATENT DOCUMENTS

| | | | |
|---|---|---|---|
| 5,933,844 A | 8/1999 | Young | |
| 6,233,667 B1 | 5/2001 | Shaylor | |
| 6,243,863 B1 | 6/2001 | Kothari | |
| 6,412,043 B1 | 6/2002 | Chopra | |
| 6,604,188 B1 | 8/2003 | Coon | |
| 6,967,745 B1 | 11/2005 | Konno | |
| 7,015,913 B1 | 3/2006 | Lindholm | |
| 7,522,167 B1 | 4/2009 | Diard | |
| 7,627,723 B1 | 12/2009 | Buck et al. | |
| 7,873,812 B1 | 1/2011 | Mimar | |
| 8,099,733 B2 | 1/2012 | Birdwell | |
| 8,966,155 B1 | 2/2015 | Mulligan | |
| 9,432,298 B1 | 8/2016 | Smith | |
| 9,466,090 B2 | 10/2016 | Surti | |
| 9,547,931 B2 | 1/2017 | Crassin | |
| 9,557,795 B1 | 1/2017 | Sabih | |
| 9,569,886 B2 | 2/2017 | Akenine-Moller | |
| 9,626,234 B2 | 4/2017 | Bourd et al. | |
| 9,652,284 B2 | 5/2017 | Mei | |
| 9,754,345 B2 | 9/2017 | Akenine-Moller | |
| 9,804,666 B2 | 10/2017 | Jiao | |
| 9,912,957 B1 | 3/2018 | Surti | |
| 2002/0124134 A1 | 9/2002 | Chilton | |
| 2002/0131083 A1 | 9/2002 | Hamzy | |
| 2003/0018685 A1 | 1/2003 | Kalafatis | |
| 2003/0038798 A1 | 2/2003 | Besl | |
| 2003/0149716 A1 | 8/2003 | Peterson | |
| 2004/0078617 A1 | 4/2004 | Moser | |
| 2004/0107336 A1 | 6/2004 | Douglas | |
| 2004/0148593 A1 | 7/2004 | Civlin | |
| 2004/0217956 A1 | 11/2004 | Besl | |
| 2005/0071438 A1 | 3/2005 | Liao | |
| 2005/0081201 A1 | 4/2005 | Aguilar, Jr. | |
| 2005/0195200 A1 | 9/2005 | Chuang | |
| 2006/0001663 A1 | 1/2006 | Ruttenberg et al. | |
| 2006/0103658 A1 | 5/2006 | Liao | |
| 2006/0248489 A1 | 11/2006 | Ruf | |
| 2007/0294663 A1 | 12/2007 | McGuire et al. | |
| 2008/0050025 A1 | 2/2008 | Bashyam | |
| 2008/0140980 A1 | 6/2008 | Mei | |
| 2008/0250422 A1 | 10/2008 | Lewis | |
| 2008/0256449 A1 | 10/2008 | Bhatt | |
| 2009/0016430 A1 | 1/2009 | Schmit | |
| 2009/0037664 A1 | 2/2009 | Kornegay | |
| 2009/0046926 A1 | 2/2009 | Ono | |
| 2009/0109510 A1 | 4/2009 | Varga | |
| 2009/0164812 A1 | 6/2009 | Capps, Jr. | |
| 2009/0199170 A1 | 8/2009 | Arimilli | |
| 2009/0323942 A1 | 12/2009 | Sharon et al. | |
| 2010/0001999 A1 | 1/2010 | Everitt | |
| 2010/0321397 A1 | 12/2010 | Gizburg | |
| 2011/0041131 A1 | 2/2011 | Srivatsa | |
| 2011/0055515 A1 | 3/2011 | Khubaib | |
| 2011/0055838 A1 | 3/2011 | Moyes | |
| 2011/0078381 A1* | 3/2011 | Heinrich | G06F 12/0897 711/122 |
| 2011/0141123 A1 | 6/2011 | Kumar | |
| 2011/0161620 A1 | 6/2011 | Kaminski | |
| 2011/0252200 A1 | 10/2011 | Hendry et al. | |
| 2012/0023316 A1 | 1/2012 | Flachs | |
| 2012/0233486 A1 | 9/2012 | Phull | |
| 2012/0317362 A1 | 12/2012 | Hendry et al. | |
| 2013/0042090 A1* | 2/2013 | Krashinsky | G06F 9/3887 712/214 |
| 2013/0198549 A1 | 8/2013 | Longnecker | |
| 2013/0293565 A1 | 11/2013 | Arvo | |
| 2013/0318323 A1 | 11/2013 | Weissmann | |
| 2014/0019723 A1 | 1/2014 | Yamada | |
| 2014/0022221 A1 | 1/2014 | Furihata | |
| 2014/0108734 A1 | 4/2014 | Kitchin et al. | |
| 2014/0109102 A1 | 4/2014 | Duncan | |
| 2014/0173193 A1 | 6/2014 | Fahs | |
| 2014/0176541 A1 | 6/2014 | Surti | |
| 2014/0181421 A1 | 6/2014 | O'Connor | |
| 2014/0189249 A1 | 7/2014 | Ye | |
| 2014/0195720 A1 | 7/2014 | Akella | |
| 2014/0229706 A1 | 8/2014 | Kuesel | |
| 2014/0282566 A1* | 9/2014 | Lindholm | G06F 9/522 718/102 |
| 2014/0366033 A1 | 12/2014 | Nystad | |
| 2014/0380322 A1 | 12/2014 | Ailamaki | |
| 2015/0134985 A1 | 5/2015 | Gopal | |
| 2015/0161757 A1 | 6/2015 | Li | |
| 2015/0178132 A1 | 6/2015 | Cho | |
| 2015/0187040 A1 | 7/2015 | Rao | |
| 2015/0261722 A1 | 9/2015 | Vorbach | |
| 2015/0268963 A1 | 9/2015 | Etsion | |
| 2015/0348222 A1 | 12/2015 | Surti | |
| 2015/0378762 A1 | 12/2015 | Saladi | |
| 2015/0378920 A1 | 12/2015 | Gierach | |
| 2016/0035129 A1 | 2/2016 | Bolz | |
| 2016/0062947 A1 | 3/2016 | Chetlur et al. | |
| 2016/0127734 A1 | 5/2016 | Nurijanyan | |
| 2016/0133029 A1 | 5/2016 | Akenine-Moller | |
| 2016/0188380 A1 | 6/2016 | Eastep | |
| 2016/0196112 A1 | 7/2016 | Edwards et al. | |
| 2016/0350262 A1 | 12/2016 | Sarangi | |
| 2017/0003967 A1 | 1/2017 | Lin | |
| 2017/0155907 A1 | 6/2017 | Baeza | |
| 2017/0083373 A1 | 7/2017 | Jones | |
| 2017/0199835 A1 | 7/2017 | Kim | |
| 2017/0272722 A1 | 9/2017 | Salvi | |
| 2017/0199707 A1 | 10/2017 | Varghese | |
| 2017/0345122 A1 | 11/2017 | Seiler et al. | |
| 2017/0345186 A1 | 11/2017 | Seiler | |
| 2017/0371786 A1 | 12/2017 | Srinivasan et al. | |
| 2018/0024938 A1 | 1/2018 | Paltashev | |
| 2018/0075574 A1 | 7/2018 | Brennan | |

OTHER PUBLICATIONS

Liktor G, Dachsbacher C. Decoupled deferred shading for hardware rasterization. In Proceedings of the ACM SIGGRAPH Symposium on Interactive 3D Graphics and Games Mar. 9, 2012 (pp. 143-150). ACM.

Ragan-Kelley, J., Lehtinen, J., Chen, J., Doggett, M. and Durand, F., 2011. Decoupled sampling for graphics pipelines. ACM Transactions on Graphics (TOG), 30(3), p. 17.

Office Action from U.S. Appl. No. 15/493,233, dated Oct. 4, 2018, 14 pages.

Rogers et al, "A Variable Warp Size Architecture", ISCA, Jun. 2015, 13 pages.

Notice of Allowance from U.S. Appl. No. 15/493,233, dated Feb. 5, 2019, 9 pages.

Notice of Allowance from U.S. Appl. No. 16/150,012, dated Jun. 11, 2019, 6 pages.

Office Action from U.S. Appl. No. 16/150,012, dated Nov. 28, 2018, 13 pages.

Goodfellow, et al. "Adaptive Computation and Machine Learning Series", Book, Nov. 18, 2016, pp. 98-165, Chapter 5, The MIT Press, Cambridge, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junking, "The Compute Architecture of Intel Processor Graphics Gen9", paper, Aug. 14, 2015, 22 pages, Version 1.0, Intel Corporation, Santa Clara, CA.

(56) References Cited

OTHER PUBLICATIONS

Notice of Allowance from U.S. Appl. No. 16/150,012, dated Aug. 21, 2019, 9 pages.

* cited by examiner

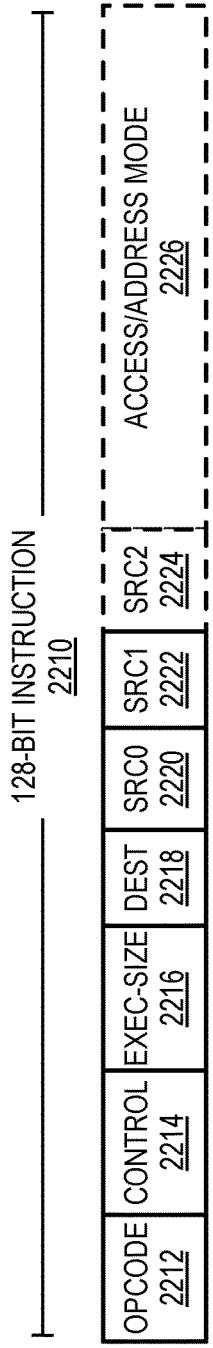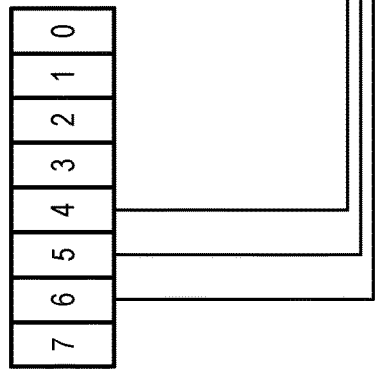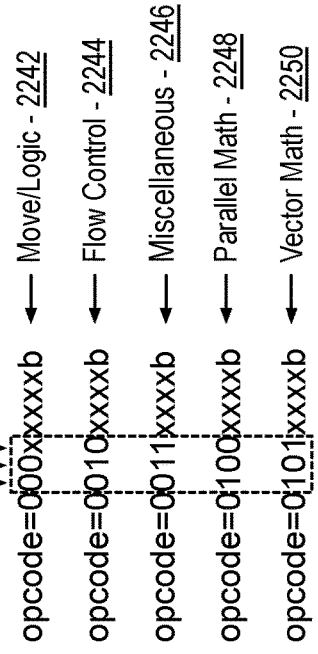
FIG. 22

FIG. 24A   GRAPHICS PROCESSOR COMMAND FORMAT
2400
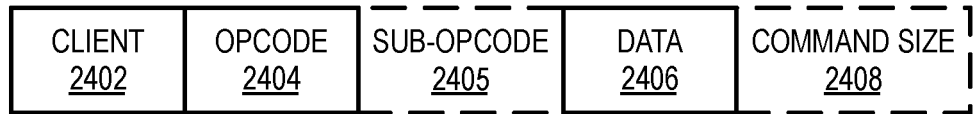
FIG. 24B   GRAPHICS PROCESSOR COMMAND SEQUENCE
2410
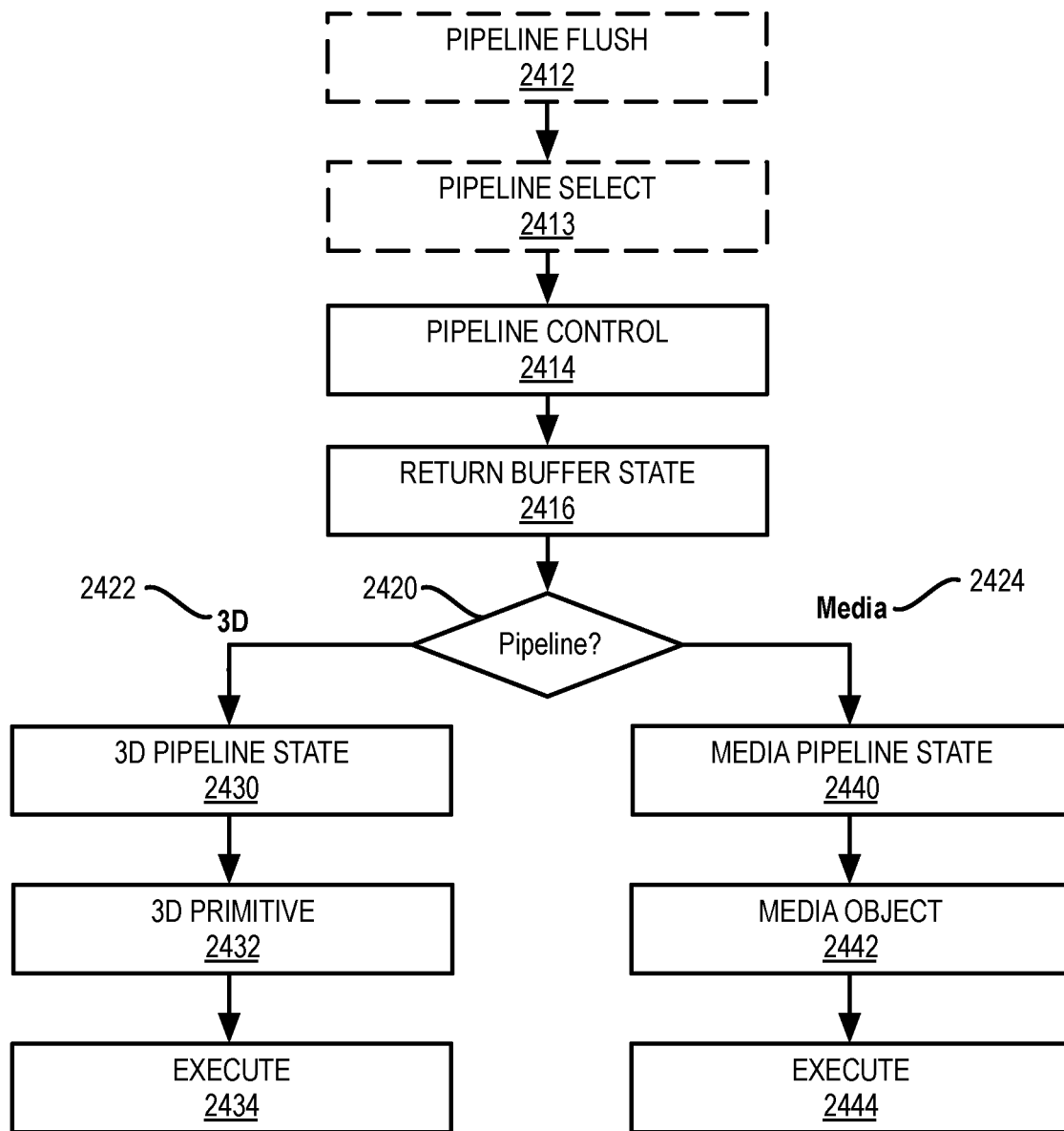

HANDLING PIPELINE SUBMISSIONS ACROSS MANY COMPUTE UNITS

CROSS-REFERENCE

This application is a continuation of co-pending U.S. patent application Ser. No. 16/150,012, filed Oct. 2, 2018, which is a continuation of co-pending U.S. patent application Ser. No. 15/493,233, filed Apr. 21, 2017, which is incorporated by reference in its entirety to the extent that it is consistent with this disclosure.

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance; graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming*, Chapter 3, pages 37-51 (2013) and/or Nicholas Wilt, CUDA Handbook, *A Comprehensive Guide to GPU Programming*, Sections 2.6.2 to 3.1.2 (June 2013).

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

FIG. 22 is a block diagram illustrating a graphics processor instruction formats according to some embodiments;

FIG. 24A-24B illustrate a graphics processor command format and command sequence, according to some embodiments;

DETAILED DESCRIPTION

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Parallel graphics processors with SIMT architectures are designed to maximize the amount of parallel processing in the graphics pipeline. In the SIMT architecture, groups of parallel threads attempt to execute program instructions synchronously together as often as possible to increase processing efficiency.

A graphics processing cluster array as described herein is capable of executing potentially thousands of concurrent threads within multiple thread groups. In some instances, thread groups can be arranged as an array of cooperating threads that concurrently execute the same program on an input data set to produce an output data set. Threads having the same thread group ID can cooperate by sharing data with each other in a manner that depends on thread ID. For instance, data can be produced by one thread in a thread group and consumed by another thread in the thread group. Additionally, synchronization instructions can be inserted into program code to ensure that that data to be consumed by a consumer thread has been produced by a producer thread before the consumer thread attempts to access the data. In instances where threads share access to common resources, it may be beneficial to execute all threads of the thread group within a single shader processor.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
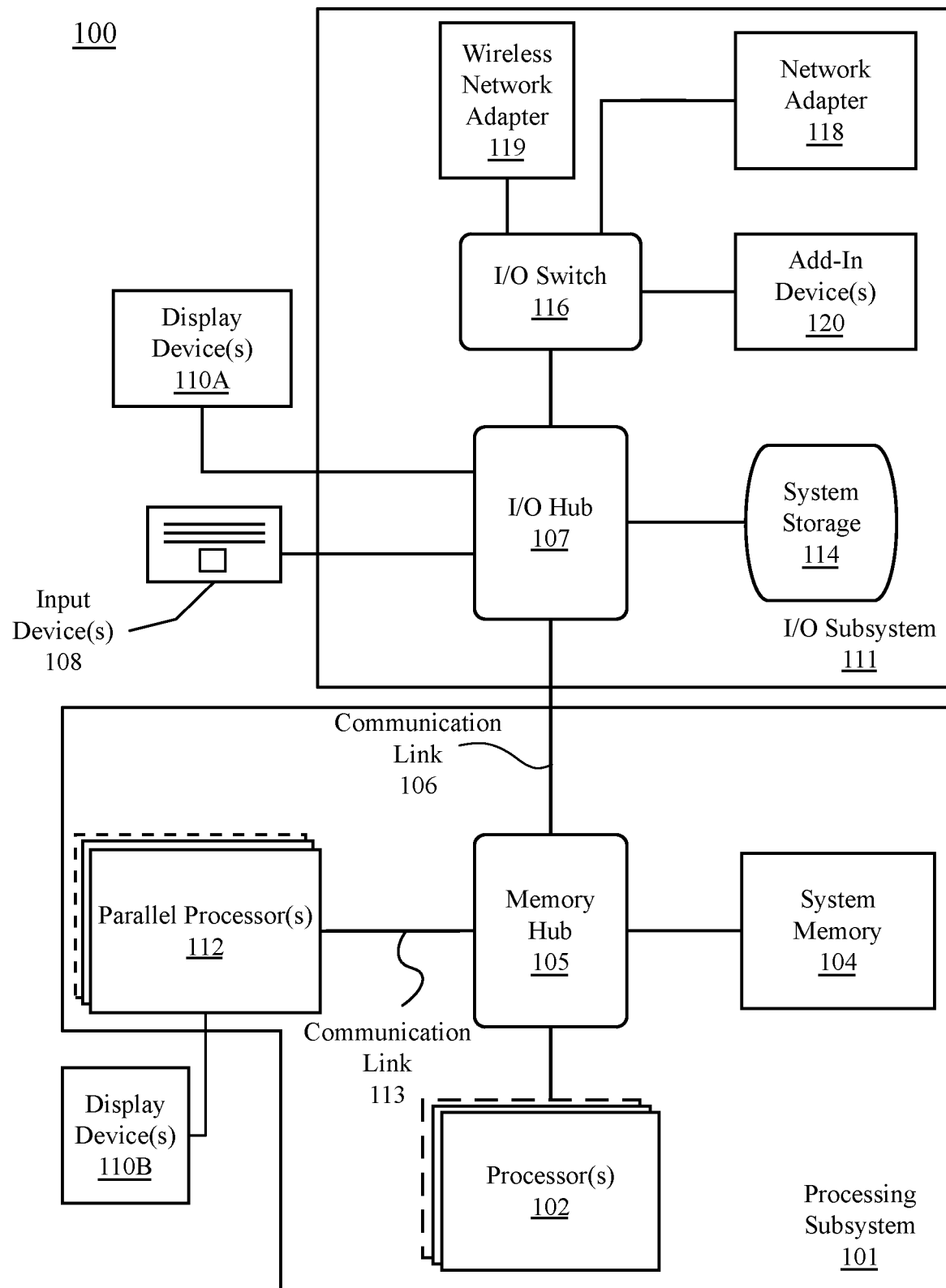
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards-based communication link technologies or protocols, such as, but not limited to PCI Express, or may be a vendor specific communications interface or communications fabric. In one embodiment the one or more parallel processor(s) 112 form a computationally focused parallel or vector processing system that an include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adaptor 119 that may be integrated into the platform, and various other devices that can be added via one or more add-in device(s) 120. The network adapter 118 can be an Ethernet adaptor or another wired network adaptor. The wireless network adaptor 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s), 112 memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Large embodiments may include two or more sets of processor(s) 102 attached via multiple sockets, which can couple with two or more instances of the parallel processor(s) 112. Some of the particular components shown herein are optional and may not be included in all implementations of the computing system 100. For example, any number of add-in cards or peripherals may be supported, or some components may be eliminated.

Figure 2:
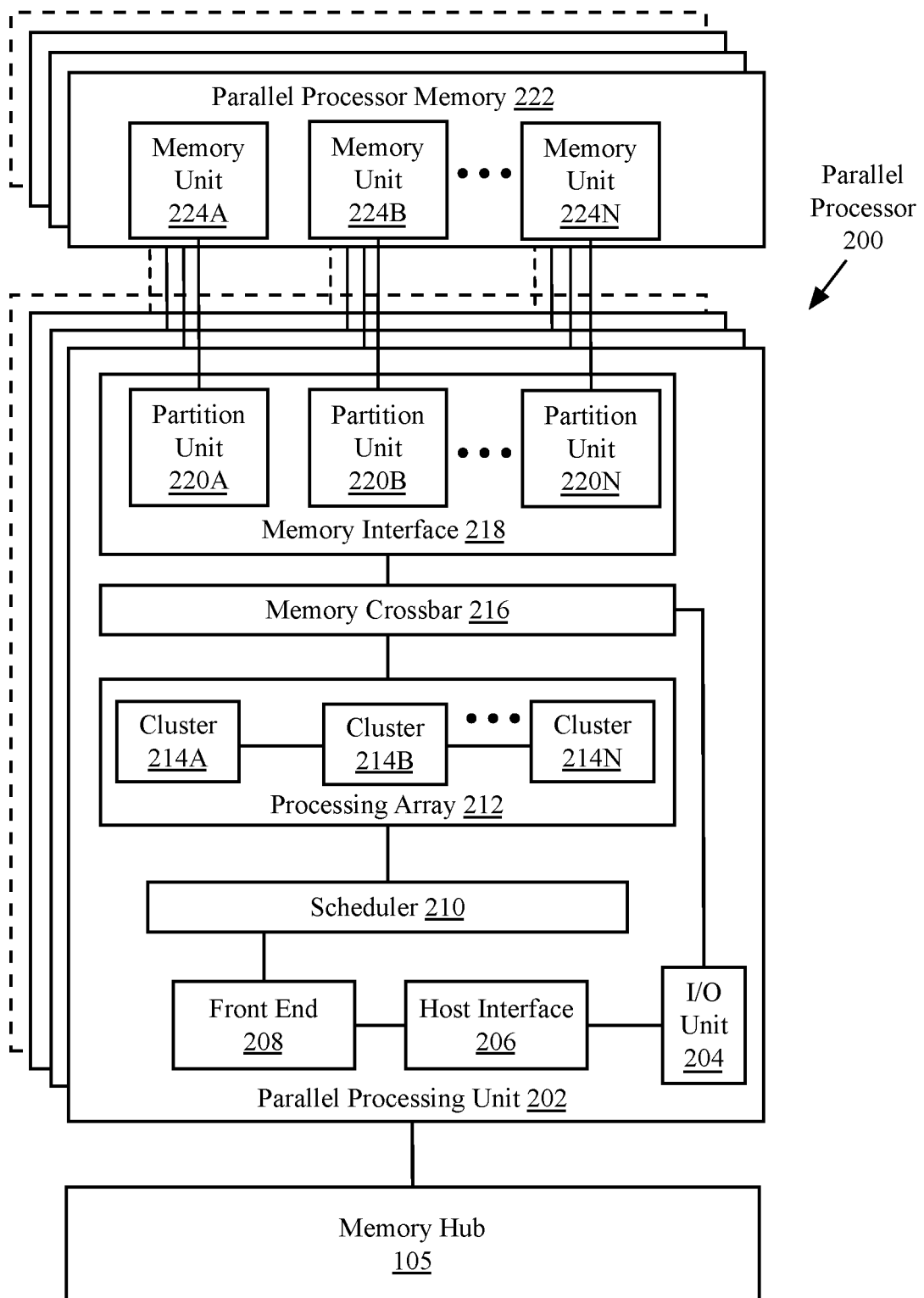
FIG. 2 illustrates a parallel processor according to an embodiment.

FIG. 2 illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212.

The processing cluster array 212 can include up to "N" processing clusters (e.g., cluster 214A, cluster 214B, through cluster 214N). Each cluster 214A-214N of the processing cluster array 212 is capable of executing a large number (e.g., thousands) of concurrent threads, where each thread is an instance of a program.

In one embodiment, different clusters 214A-214N can be allocated for processing different types of programs or for performing different types of computations. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210 or can be assisted in part by compiler logic during compilation of program logic configured for execution by the processing cluster array 212.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including but not limited to, linear and nonlinear data transforms, filtering of video and/or audio data, and/or modeling operations (e.g., applying laws of physics to determine position, velocity and other attributes of objects).

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that are each directly coupled to a portion (e.g., memory unit) of parallel processor memory 222. The number of partition units 220A-220N generally equals the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not equal the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data to be written to any of the memory units 224A-224N within parallel processor memory 222. The memory crossbar 216 can be configured to route the output of each cluster 214A-214N to the input of any partition unit 220A-220N or to another cluster 214A-214N for further processing. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example, in one embodiment some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 3A:
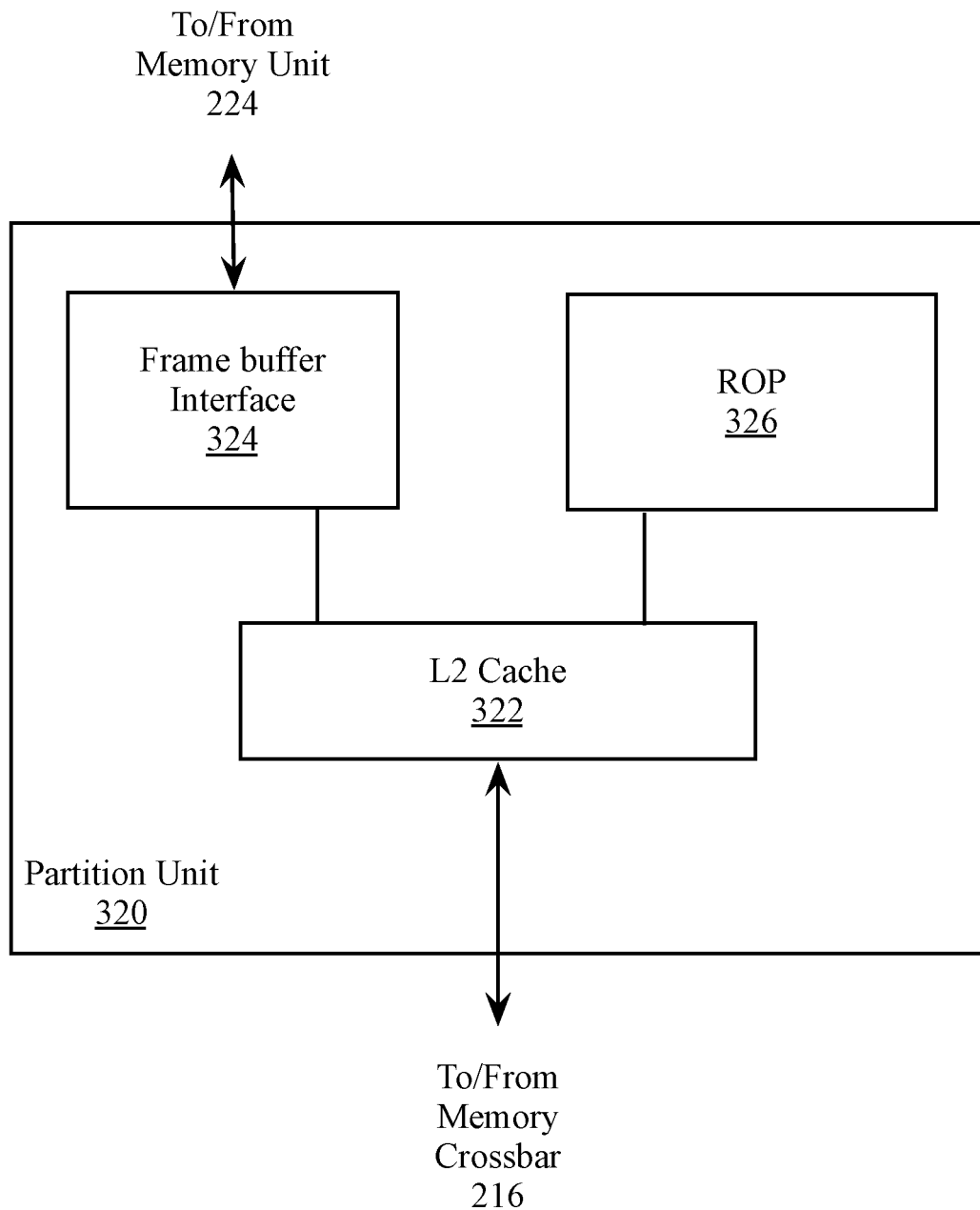
FIG. 3A is a block diagram of a partition unit, according to an embodiment.

FIG. 3A is a block diagram of a partition unit 320, according to an embodiment. In one embodiment the partition unit 320 is an instance of one of the partition units 220A-220N of FIG. 2. As illustrated, the partition unit 320 includes an L2 cache 322, a frame buffer interface 324, and a ROP 326 (raster operations unit). The L2 cache 322 is a read/write cache that is configured to perform load and store operations received from the memory crossbar 216 and ROP 326. Read misses and urgent write-back requests are output by L2 cache 322 to frame buffer interface 324 for processing. Dirty updates can also be sent to the frame buffer via the frame buffer interface 324 for opportunistic processing. In one embodiment the frame buffer interface 324 interfaces with one of the memory units in parallel processor memory, such as the memory units 224A-224N of FIG. 2 (e.g., within parallel processor memory 222).

In graphics applications, the ROP 326 is a processing unit that performs raster operations, such as stencil, z test, blending, and the like, and outputs pixel data as processed graphics data for storage in graphics memory. In some embodiments, ROP 326 may be configured to compress z or color data that is written to memory and decompress z or color data that is read from memory. In some embodiments, the ROP 326 is included within each processing cluster (e.g., cluster 214A-214N of FIG. 2) instead of within the partition unit 320. In such embodiment, read and write requests for pixel data are transmitted over the memory crossbar 216 instead of pixel fragment data.

The processed graphics data may be displayed on display device, such as one of the one or more display device(s) 110 of FIG. 1, routed for further processing by the processor(s) 102, or routed for further processing by one of the processing entities within the parallel processor 200 of FIG. 2.

Figure 3B:
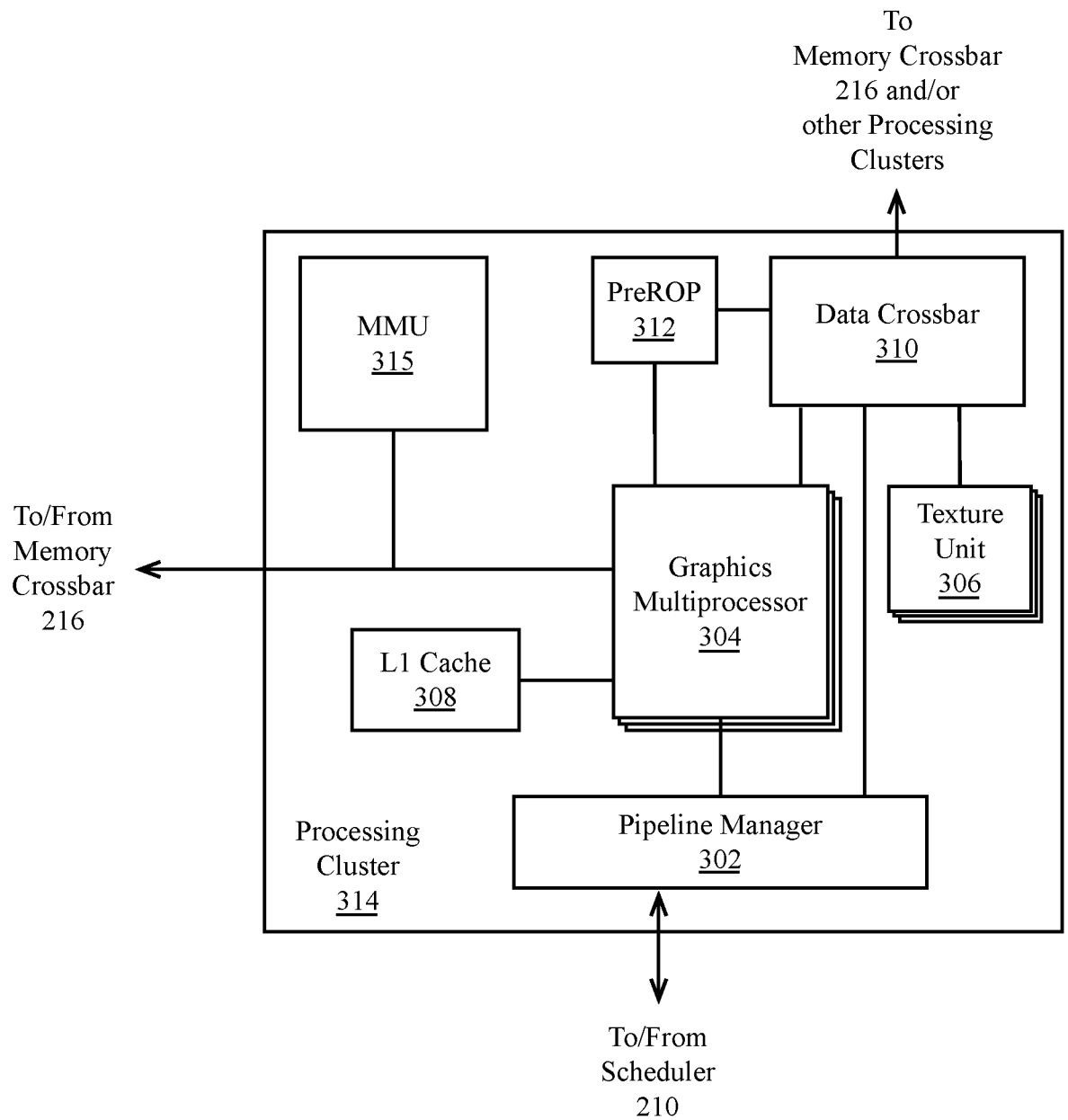
FIG. 3B is a block diagram of a processing cluster, according to an embodiment.

FIG. 3B is a block diagram of a processing cluster 314 within a parallel processing unit, according to an embodiment. In one embodiment the processing cluster is an instance of one of the processing clusters 214A-214N of FIG. 2. The processing cluster 314 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters 314. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 314 can be controlled via a pipeline manager 302 that distributes processing tasks to SIMT parallel processors. The pipeline manager 302 receives instructions from the scheduler 210 of FIG. 2 and manages execution of those instructions via a graphics multiprocessor 304 and/or a texture unit 306. The illustrated graphics multiprocessor 304 is an exemplary instance of an SIMT parallel processor. However, various types of SIMT parallel processors of differing architectures may be included within the processing cluster 314. One or more instances of the graphics multiprocessor 304 can be included within a processing cluster 314. The graphics multiprocessor 304 can process data and a data crossbar 310 can be used to distribute the processed data to one of multiple possible destinations, including other graphics multiprocessors and/or shader units. The pipeline manager 302 can facilitate the distribution of processed data by specifying destinations for processed data to be distributed vis the data crossbar 310.

Each graphics multiprocessor 304 within the processing cluster 314 can include an identical set of functional execution logic (e.g., arithmetic logic units, load-store units, etc.), which may be pipelined, allowing a new instruction to be issued before a previous instruction has finished. Any combination of functional execution logic may be provided. In one embodiment, the functional logic support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to the processing cluster 314 constitutes a thread, as previously defined herein, and the collection of a certain number of concurrently executing threads across the parallel processing engines (not shown) within a graphics multiprocessor 304 is referred to herein as a thread group. As used herein, a thread group refers to a group of threads concurrently executing the same program on different input data, with one thread of the group being assigned to a different processing engine within a graphics multiprocessor 304. A thread group may include fewer threads than the number of processing engines within the graphics multiprocessor 304, in which case some processing engines will be idle during cycles when that thread group is being processed. A thread group may also include more threads than the number of processing engines within the graphics multiprocessor 304, in which case processing will take place over consecutive clock cycles. Each graphics multiprocessor 304 can support up to G thread groups concurrently. Additionally, a plurality of related thread groups may be active (in different phases of execution) at the same time within a graphics multiprocessor 304.

In one embodiment the graphics multiprocessor 304 includes an internal cache memory to perform load and store operations. In one embodiment, the graphics multiprocessor 304 can forego an internal cache and use a cache memory (e.g., L1 cache 308) within the processing cluster 314. Each graphics multiprocessor 304 also has access to L2 caches within the partition units (e.g., partition units 220A-220N of FIG. 2) that are shared among all processing clusters 314 and may be used to transfer data between threads. The graphics multiprocessor 304 may also access off-chip global memory, which can include one or more of local parallel processor memory and/or system memory. Any memory external to the parallel processing unit 202 may be used as global memory. Embodiments in which the processing cluster 314 includes multiple instances of the graphics multiprocessor 304 can share common instructions and data, which may be stored in the L1 cache 308.

Each processing cluster 314 may include an MMU 315 (memory management unit) that is configured to map virtual addresses into physical addresses. In other embodiments, one or more instances of the MMU 315 may reside within the memory interface 218 of FIG. 2. The MMU 315 includes a set of page table entries (PTEs) used to map a virtual address to a physical address of a tile and optionally a cache line index. The MMU 315 may include address translation lookaside buffers (TLB) or caches that may reside within the graphics multiprocessor 304 or the L1 cache or processing cluster 314. The physical address is processed to distribute surface data access locality to allow efficient request interleaving among partition units. The cache line index may be used to determine whether or not a request for a cache line is a hit or miss.

In graphics and computing applications, a processing cluster 314 may be configured such that each graphics multiprocessor 304 is coupled to a texture unit 306 for performing texture mapping operations, e.g., determining texture sample positions, reading texture data, and filtering the texture data. Texture data is read from an internal texture L1 cache (not shown) or in some embodiments from the L1 cache within graphics multiprocessor 304 and is fetched from an L2 cache, local parallel processor memory, or system memory, as needed. Each graphics multiprocessor 304 outputs processed tasks to the data crossbar 310 to provide the processed task to another processing cluster 314 for further processing or to store the processed task in an L2 cache, local parallel processor memory, or system memory via the memory crossbar 216. A preROP 312 (pre-raster operations unit) is configured to receive data from graphics multiprocessor 304, direct data to ROP units, which may be located with partition units as described herein (e.g., partition units 220A-220N of FIG. 2). The preROP 312 unit can perform optimizations for color blending, organize pixel color data, and perform address translations.

It will be appreciated that the core architecture described herein is illustrative and that variations and modifications are possible. Any number of processing units, e.g., graphics multiprocessor 304, texture units 306, preROPs 312, etc., may be included within a processing cluster 314. Further, while only one processing cluster 314 is shown, a parallel processing unit as described herein may include any number of instances of the processing cluster 314. In one embodiment, each processing cluster 314 can be configured to operate independently of other processing clusters 314 using separate and distinct processing units, L1 caches, etc.

Figure 4A:
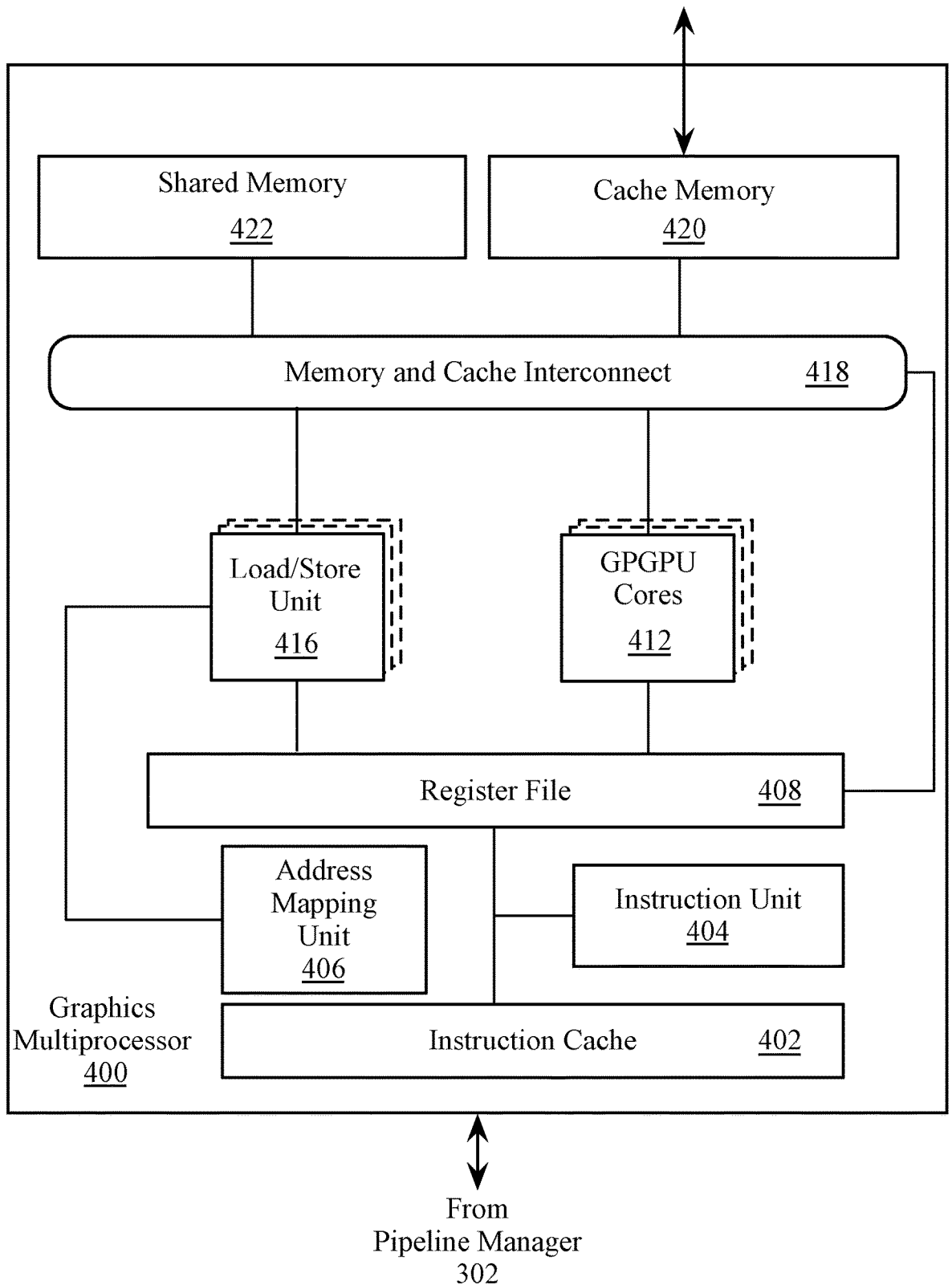
FIG. 4A-4C are block diagrams of graphics multiprocessors, according to embodiments.
Figure 4B:
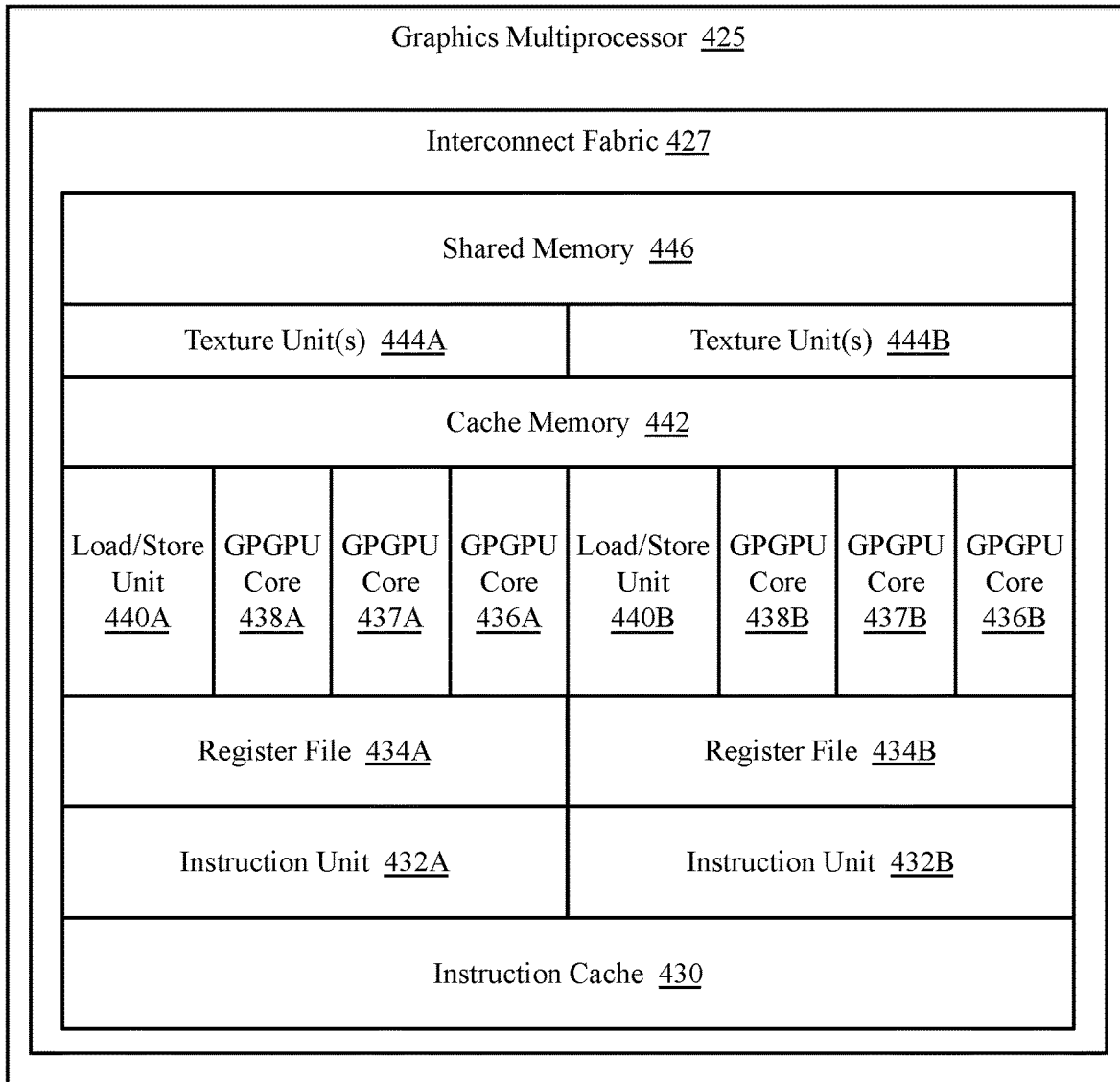
Figure 4C:
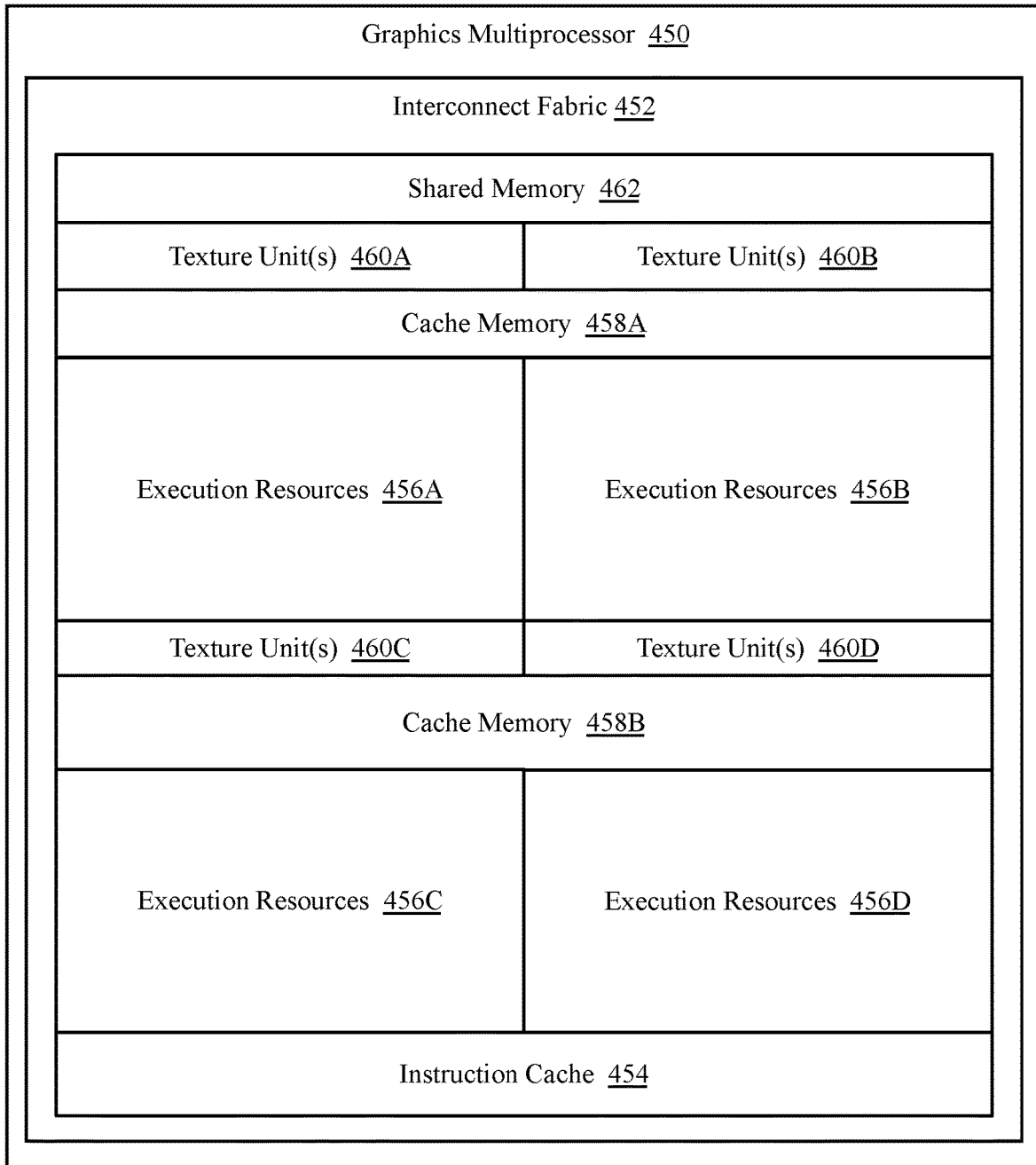

FIG. 4A-C illustrate graphics multiprocessors, according to embodiments. The illustrated graphics multiprocessors 400, 425, 450 are variants of the graphics multiprocessor 304 of FIG. 3. The illustrated graphics multiprocessors 400, 425, 450 can be configured as a streaming multiprocessor (SM) capable of simultaneous execution of a large number of execution threads.

FIG. 4A shows a graphics multiprocessor 400, according to one embodiment. In such embodiment the graphics multiprocessor 400 couples with the pipeline manager 302 of the processing cluster 314 of FIG. 3. The graphics multiprocessor 400 has an execution pipeline including but not limited to an instruction cache 402, an instruction unit 404, an address mapping unit 406, a register file 408, one or more general purpose graphics processing unit (GPGPU) cores 412, and one or more load/store units 416. The GPGPU cores 412 and load/store units 416 are coupled with cache memory 420 and shared memory 422 via a memory and cache interconnect 418.

In one embodiment, the instruction cache 402 receives a stream of instructions to execute from the pipeline manager 302 of FIG. 3. The instructions are cached in the instruction cache 402 and dispatched for execution by the instruction unit 404. The instruction unit 404 can dispatch instructions as thread groups (e.g., warps), with each thread of the thread group assigned to a different execution unit within GPGPU core 412. An instruction can access any of a local, shared, or global address space by specifying an address within a unified address space. The address mapping unit 406 can be used to translate addresses in the unified address space into a distinct memory address that can be accessed by the load/store units 416.

The register file 408 provides a set of registers for the functional units of the graphics multiprocessor 400. The register file 408 provides temporary storage for operands connected to the data paths of the functional units (e.g., GPGPU cores 412, load/store units 416) of the graphics multiprocessor 400. In one embodiment, the register file 408 is divided between each of the functional units such that each functional unit is allocated a dedicated portion of the register file 408. In one embodiment, the register file 408 is divided between the different warps being executed by the graphics multiprocessor 400.

The GPGPU cores 412 can each include floating point units (FPUs) and/or integer arithmetic logic units (ALUs) that are used to execute instructions of the graphics multiprocessor 400. The GPGPU cores 412 can be similar in architecture or can differ in architecture, according to embodiments. For example, in one embodiment a first portion of the GPGPU cores 412 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 400 can additionally include one or more fixed function or special function units to perform specific functions such as copy rectangle or pixel blending operations. In one embodiment one or more of the GPGPU cores can also include fixed or special function logic, The memory and cache interconnect 418 is an interconnect network that connects each of the functional units of the graphics multiprocessor 400 to the register file 408 and to the shared memory 422. In one embodiment, the memory and cache interconnect 418 is a crossbar interconnect that allows the load/store unit 416 to implement load and store operations between the shared memory 422 and the register file 408. In one embodiment the shared memory 422 can be used to enable communication between threads that execute on the functional units. The cache memory 420 can be used as a data cache for example, to cache texture data communicated between the functional units and the texture unit 306 of FIG. 3.

FIG. 4B shows a graphics multiprocessor 425 according to an additional embodiment. The graphics multiprocessor 425 includes multiple additional instances of execution resource units relative to the graphics multiprocessor 400 of FIG. 4A. For example, the graphics multiprocessor 425 can include multiple instances of the instruction unit 432A-432B, register file 434A-434B, and texture unit(s) 444A-444B. The graphics multiprocessor 425 also includes multiple sets of graphics or compute execution units (e.g., GPGPU Core 436A-436B, GPGPU core 437A-437B, GPGPU core 438A-438B) and multiple sets of load/store units 440A-440B. In one embodiment the execution resource units have a common instruction cache 430, texture and/or data cache memory 442, and shared memory 446. The various components can communicate via an interconnect fabric 427. In one embodiment the interconnect fabric 427 includes one or more crossbar switches to enable communication between the various components of the graphics multiprocessor 425.

FIG. 4C shows a graphics multiprocessor 450 according to an additional embodiment. The graphics processor includes multiple sets of execution resources 456A-D, where each set of execution resource includes multiple instruction units, register files, GPGPU cores, and load store units, as illustrated in FIG. 4A-4B. The execution resources 456A-D can work in concert with texture unit(s) 460A-D for texture operations, while sharing an instruction cache 454, and shared memory 462. In one embodiment the execution resources 456A-D can share an instruction cache 454 and shared memory 462, as well as multiple instances of a texture and/or data cache memory 458A-458B. The various components can communicate via an interconnect fabric 452 similar to the interconnect fabric 427 of FIG. 4B.

Persons skilled in the art will understand that the architecture described in FIGS. 1, 2, 3A-3B, and 4A-4C are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 5:
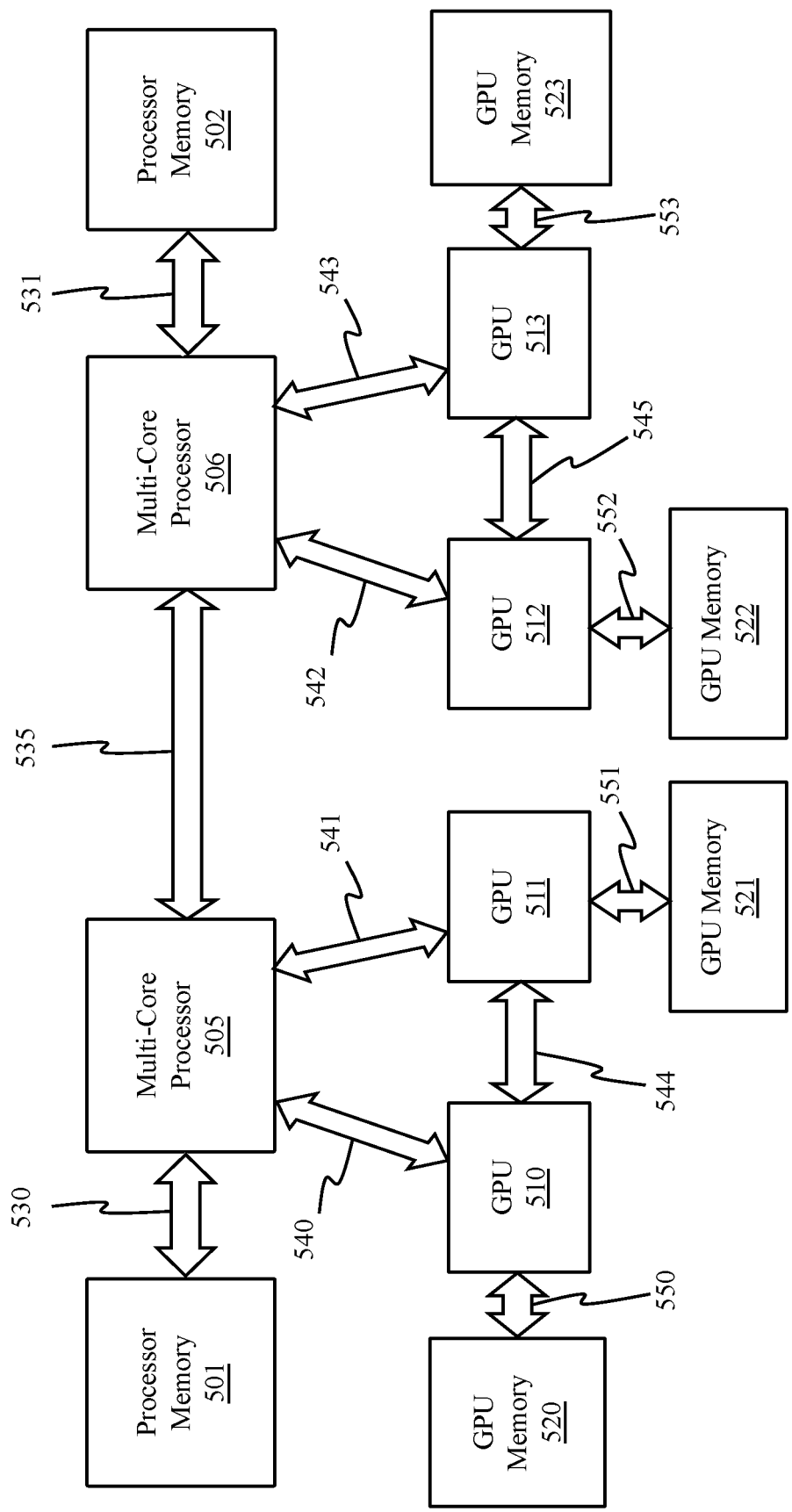
FIG. 5 illustrates an exemplary architecture in which a plurality of GPUs is communicatively coupled to a plurality of multi-core processors.

FIG. 5 illustrates an exemplary architecture in which a plurality of GPUs 510-1313 are communicatively coupled to a plurality of multi-core processors 505-506 over high-speed links 540-543 (e.g., buses, point-to-point interconnects, etc.). In one embodiment, the high-speed links 540-543 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 510-513 are interconnected over high speed links 544-545, which may be implemented using the same or different protocols/links than those used for high-speed links 540-543. Similarly, two or more of the multi-core processors 505-506 may be connected over high speed links 535 which may be symmetric multi-processor (SMP) buses operating at 20 GB/s, 30 GB/s, 120 GB/s or higher. Alternatively, all communication between the various system components shown in FIG. 5 may be accomplished using the same protocols/links (e.g., over a common interconnection fabric). As mentioned, however, the underlying principles of the invention are not limited to any particular type of interconnect technology.

In one embodiment, each multi-core processor 505-506 is communicatively coupled to a processor memory 501-502, via memory interconnects 530-531, respectively, and each GPU 510-513 is communicatively coupled to GPU memory 520-523 over GPU memory interconnects 550-553, respectively. The memory interconnects 530-531 and 550-553 may utilize the same or different memory access technologies. By way of example, and not limitation, the processor memories 501-502 and GPU memories 520-523 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 505-506 and GPUs 510-513 may be physically coupled to a particular memory 501-502, 520-523, respectively, a unified memory architecture may be implemented in which the same virtual system address space (also referred to as the "effective address" space) is distributed among all of the various physical memories. For example, processor memories 501-502 may each comprise 64 GB of the system memory address space and GPU memories 520-523 may each comprise 32 GB of the system memory address space (resulting in a total of 256 GB addressable memory in this example).

Figure 6:
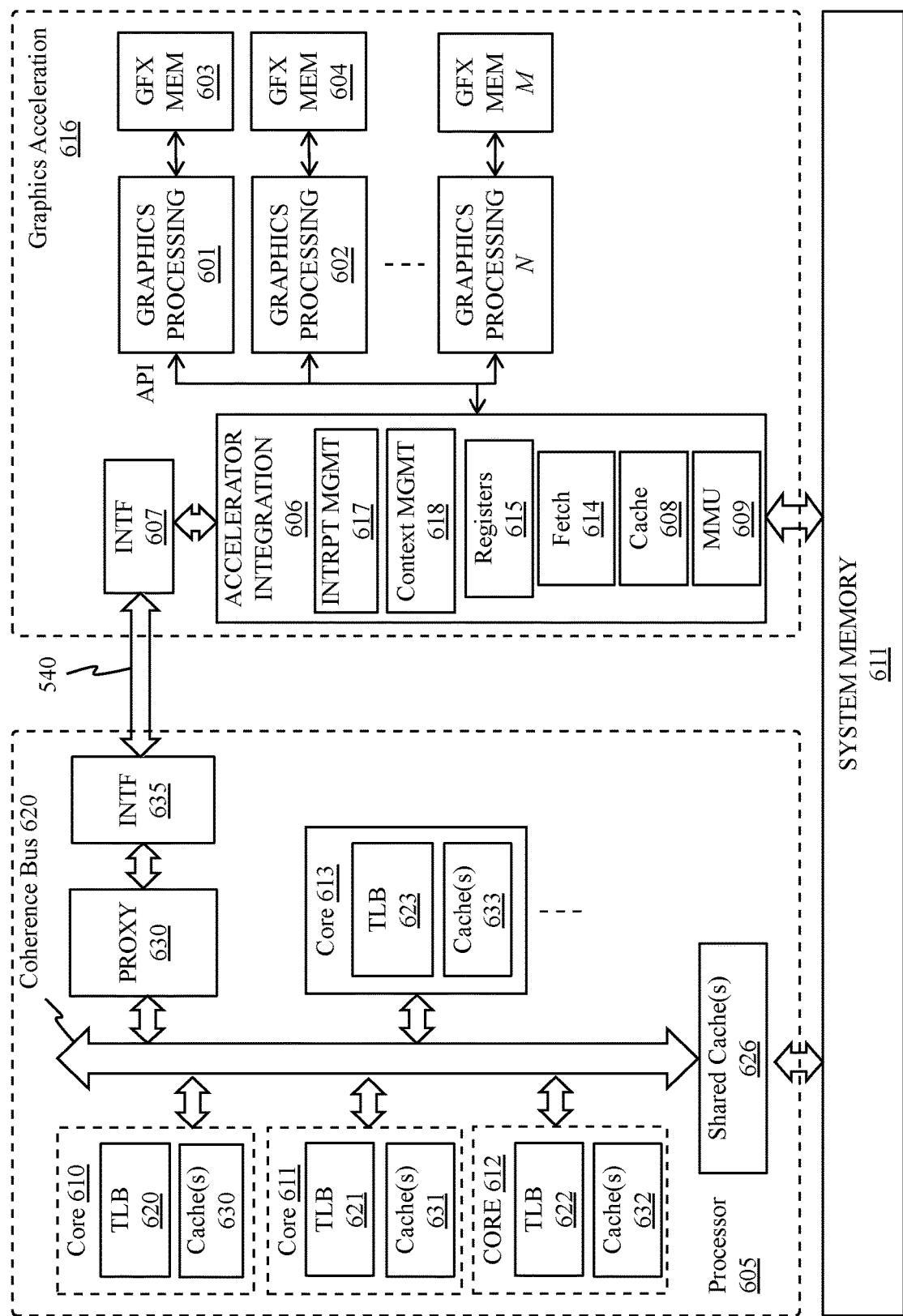
FIG. 6 illustrates additional details for an interconnection between a multi-core processor and a graphics acceleration module in accordance with one embodiment.

FIG. 6 illustrates additional details for an interconnection between a multi-core processor 605 and a graphics acceleration module 616 in accordance with one embodiment. The graphics acceleration module 616 may include one or more GPU chips integrated on a line card which is coupled to the processor 605 via the high-speed link 540. Alternatively, the graphics acceleration module 616 may be integrated on the same package or chip as the processor 605.

The illustrated processor 605 includes a plurality of cores 610-613, each with a translation lookaside buffer 620-623 and one or more caches 631. The cores may include various other components for executing instructions and processing data which are not illustrated to avoid obscuring the underlying principles of the invention (e.g., instruction fetch units, branch prediction units, decoders, execution units, reorder buffers, etc.). The caches 631 may comprise level 1 (L1) and level 2 (L2) caches. In addition, one or more shared caches 626 may be included in the caching hierarchy and shared by sets of the cores 610-613. For example, one embodiment of the processor 605 includes 24 cores, each with its own L1 cache, twelve shared L2 caches, and twelve shared L3 caches. In this embodiment, one of the L2 and L3 caches are shared by two adjacent cores. The processor 605 and the graphics acceleration module 616 connect with system memory 611, which may include processor memories 501-502

Coherency is maintained for data and instructions stored in the various caches 630-633, 626 and system memory 611 via inter-core communication over a coherence bus 620. For example, each cache may have cache coherency logic/circuitry associated therewith to communicate to over the coherence bus 620 in response to detected reads or writes to particular cache lines. In one implementation, a cache snooping protocol is implemented over the coherence bus 620 to snoop cache accesses. Cache snooping/coherency techniques are well understood by those of skill in the art and will not be described in detail here to avoid obscuring the underlying principles of the invention.

In one embodiment, a proxy circuit 630 communicatively couples the graphics acceleration module 616 to the coherence bus 620, allowing the graphics acceleration module 616 to participate in the cache coherence protocol as a peer of the cores. In particular, an interface 635 provides connectivity to the proxy circuit 630 over high-speed link 540 (e.g., a PCIe bus, NVLink, etc.) and an interface 607 connects the graphics acceleration module 616 to the link 540.

In one implementation, an accelerator integration circuit 606 provides cache management, memory access, context management, and interrupt management services on behalf of a plurality of graphics processing engines 601, 602, N of the graphics acceleration module 616. The graphics processing engines 601, 602, N may each comprise a separate graphics processing unit (GPU). Alternatively, the graphics processing engines 601, 602, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 601-602, N or the graphics processing engines 601-602, N may be individual GPUs integrated on a common package, line card, or chip.

In one embodiment, the accelerator integration circuit 606 includes a memory management unit (MMU) 609 for performing various memory management functions such as virtual-to-physical memory translations (also referred to as effective-to-real memory translations) and memory access protocols for accessing system memory 611. The MMU 609 may also include a translation lookaside buffer (TLB) (not shown) for caching the virtual/effective to physical/real address translations. In one implementation, a cache 608 stores commands and data for efficient access by the graphics processing engines 601-602, N. In one embodiment, the data stored in cache 608 and graphics memories 603-604, N is kept coherent with the core caches 630-633, 626 and system memory 611. As mentioned, this may be accomplished via proxy circuit 630 which takes part in the cache coherency mechanism on behalf of cache 608 and memories 603-604, N (e.g., sending updates to the cache 608 related to modifications/accesses of cache lines on processor caches 630-633, 626 and receiving updates from the cache 608).

A set of registers 615 store context data for threads executed by the graphics processing engines 601-602, N and a context management circuit 618 manages the thread contexts. For example, the context management circuit 618 may perform save and restore operations to save and restore contexts of the various threads during context switches (e.g., where a first thread is saved and a second thread is stored so that the second thread can be execute by a graphics processing engine). For example, on a context switch, the context management circuit 618 may store current register values to a designated region in memory (e.g., identified by a context pointer). It may then restore the register values when returning to the context. In one embodiment, an interrupt management circuit 617 receives and processes interrupts received from system devices.

In one implementation, virtual/effective addresses from a graphics processing engine 601 are translated to real/physical addresses in system memory 611 by the memory management unit 609. One embodiment of the accelerator integration circuit 606 supports multiple (e.g., 4, 8, 16) graphics accelerator modules 616 and/or other accelerator devices. The graphics accelerator module 616 may be dedicated to a single application executed on the processor 605 or may be shared between multiple applications. In one embodiment, a virtualized graphics execution environment is presented in which the resources of the graphics processing engines 601-602, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 616 and provides address translation and system memory cache services. In addition, the accelerator integration circuit 606 may provide virtualization facilities for the host processor to manage virtualization of the graphics processing engines, interrupts, and memory management.

Because hardware resources of the graphics processing engines 601-602, N are mapped explicitly to the real address space seen by the host processor 605, any host processor can address these resources directly using an effective address value. One function of the accelerator integration circuit 606, in one embodiment, is the physical separation of the graphics processing engines 601-602, N so that they appear to the system as independent units.

As mentioned, in the illustrated embodiment, one or more graphics memories 603-604, M are coupled to each of the graphics processing engines 601-602, N, respectively. The graphics memories 603-604, M store instructions and data being processed by each of the graphics processing engines 601-602, N. The graphics memories 603-604, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 540, biasing techniques are used to ensure that the data stored in graphics memories 603-604, M is data which will be used most frequently by the graphics processing engines 601-602, N and preferably not used by the cores 610-613 (at least not frequently). Similarly, the biasing mechanism attempts to keep data needed by the cores (and preferably not the graphics processing engines 601-602, N) within the caches 630-633, 626 of the cores and system memory 611.

Figure 7:
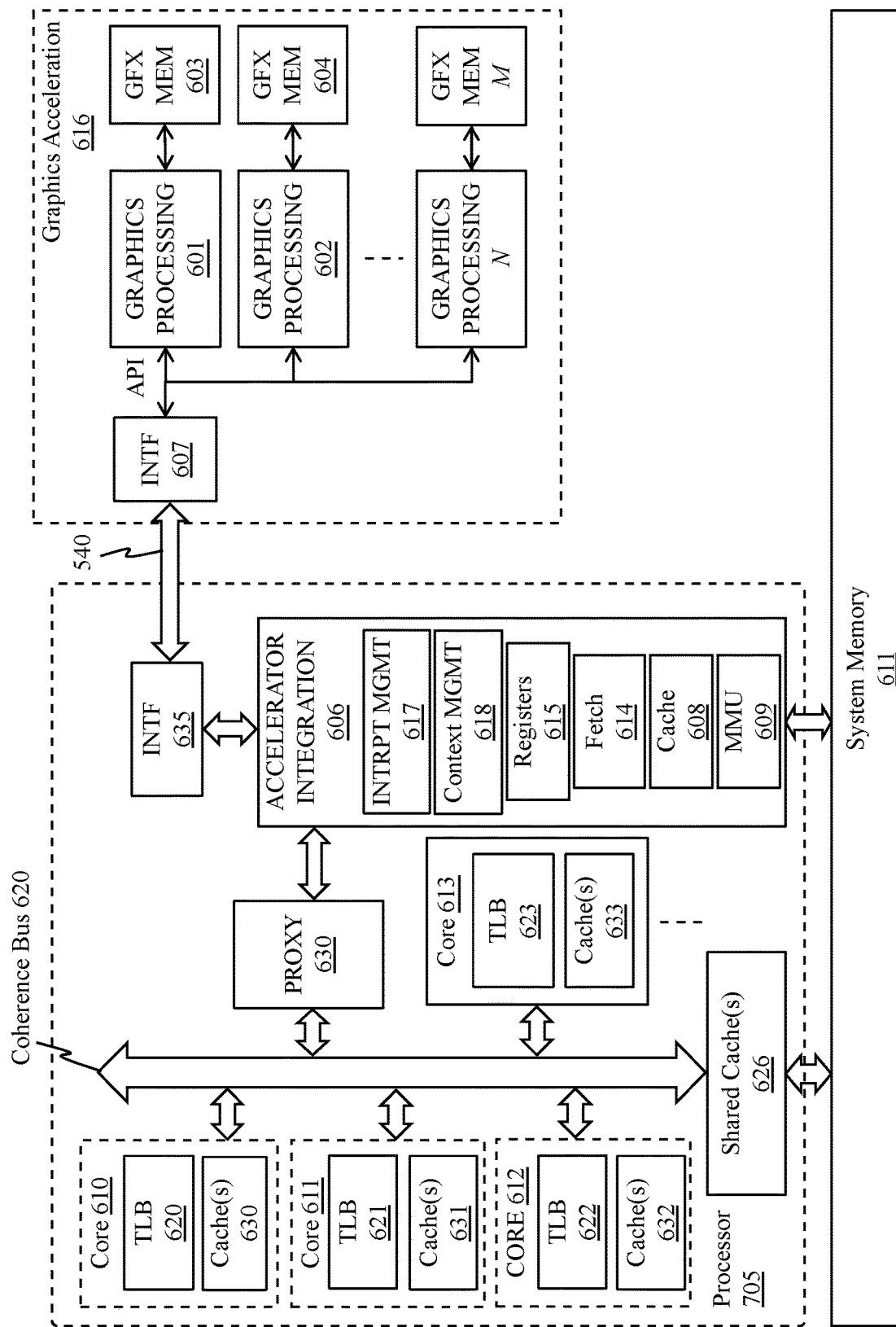
FIG. 7 illustrates another embodiment in which the accelerator integration circuit is integrated within the processor.

FIG. 7 illustrates another embodiment in which the accelerator integration circuit 606 is integrated within the processor 605. In this embodiment, the graphics processing engines 601-602, N communicate directly over the high-speed link 540 to the accelerator integration circuit 606 via interface 607 and interface 635 (which, again, may be utilize any form of bus or interface protocol). The accelerator integration circuit 606 may perform the same operations as those described with respect to FIG. 6, but potentially at a higher throughput given its close proximity to the coherency bus 620 and caches 630-633, 626.

One embodiment supports different programming models including a dedicated-process programming model (no graphics acceleration module virtualization) and shared programming models (with virtualization). The latter may include programming models which are controlled by the accelerator integration circuit 606 and programming models which are controlled by the graphics acceleration module 616.

In one embodiment of the dedicated process model, graphics processing engines 601-602, N are dedicated to a single application or process under a single operating system. The single application can funnel other application requests to the graphics engines 601-602, N, providing virtualization within a VM/partition.

In the dedicated-process programming models, the graphics processing engines 601-602, N, may be shared by multiple VM/application partitions. The shared models require a system hypervisor to virtualize the graphics processing engines 601-602, N to allow access by each operating system. For single-partition systems without a hypervisor, the graphics processing engines 601-602, N are owned by the operating system. In both cases, the operating system can virtualize the graphics processing engines 601-602, N to provide access to each process or application.

For the shared programming model, the graphics acceleration module 616 or an individual graphics processing engine 601-602, N selects a process element using a process handle. In one embodiment, process elements are stored in system memory 611 and are addressable using the effective address to real address translation techniques described herein. The process handle may be an implementation-specific value provided to the host process when registering its context with the graphics processing engine 601-602, N (that is, calling system software to add the process element to the process element linked list). The lower 16-bits of the process handle may be the offset of the process element within the process element linked list.

Figure 8:
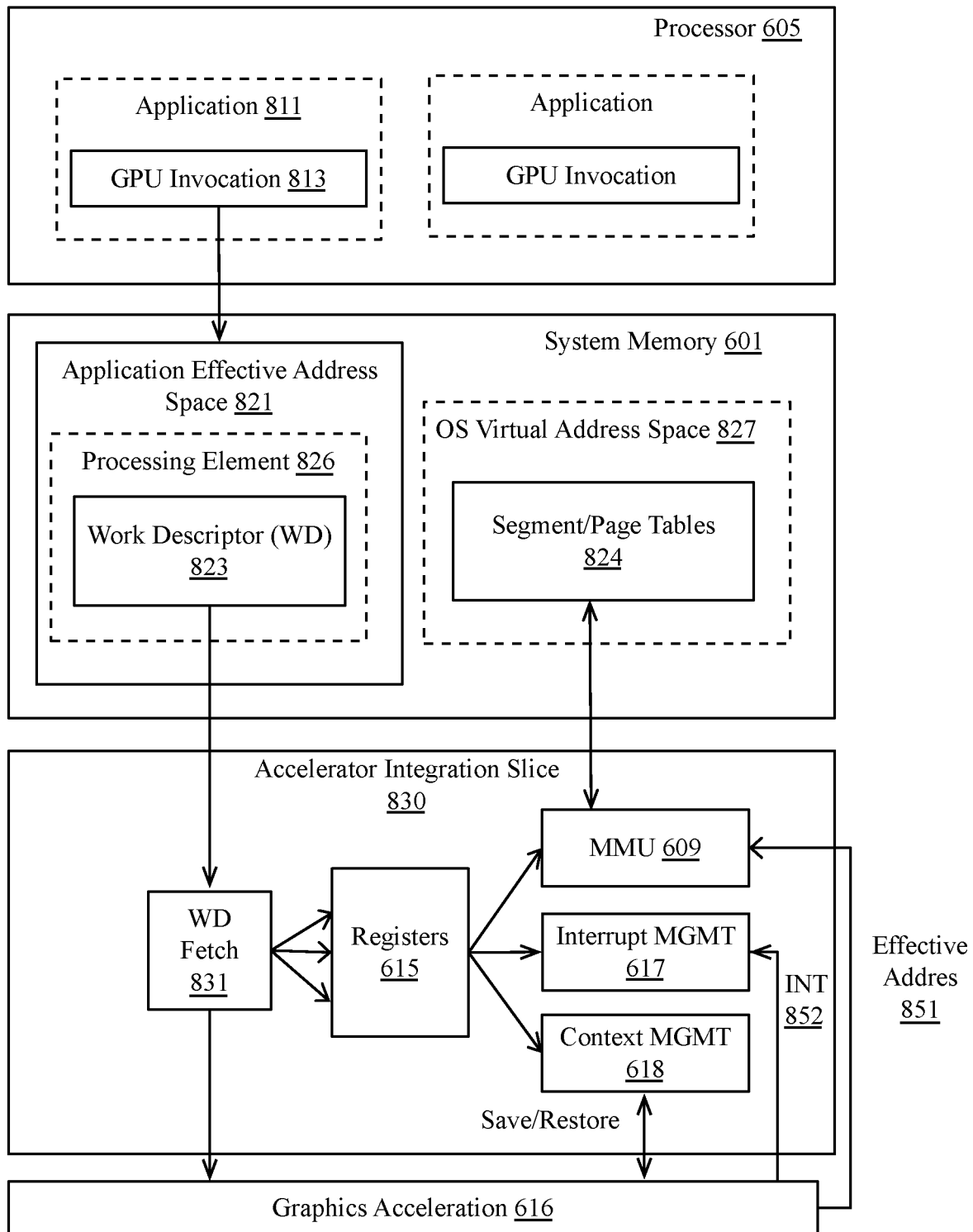
FIG. 8 illustrates an exemplary accelerator integration slice.

FIG. 8 illustrates an exemplary accelerator integration slice 830. As used herein, a "slice" comprises a specified portion of the processing resources of the accelerator integration circuit 606. Application effective address space 821 within system memory 611 stores process elements 826. In one embodiment, the process elements 826 are stored in response to GPU invocations 813 from applications 811 executed on the processor 605. A process element 826 contains the process state for the corresponding application 811. A work descriptor (WD) 823 contained in the process element 826 can be a single job requested by an application or may contain a pointer to a queue of jobs. In the latter case, the WD 823 is a pointer to the job request queue in the application's address space 821.

The graphics acceleration module 616 and/or the individual graphics processing engines 601-602, N can be shared by all or a subset of the processes in the system. Embodiments of the invention include an infrastructure for setting up the process state and sending a WD 823 to a graphics acceleration module 616 to start a job in a virtualized environment.

In one implementation, the dedicated-process programming model is implementation-specific. In this model, a single process owns the graphics acceleration module 616 or an individual graphics processing engine 601. Because the graphics acceleration module 616 is owned by a single process, the hypervisor initializes the accelerator integration circuit 606 for the owning partition and the operating system initializes the accelerator integration circuit 606 for the owning process at the time when the graphics acceleration module 616 is assigned.

In operation, a WD fetch unit 831 in the accelerator integration slice 830 fetches the next WD 823 which includes an indication of the work to be done by one of the graphics processing engines of the graphics acceleration module 616. Data from the WD 823 may be stored in registers 615 and used by the memory management unit (MMU) 609, interrupt management circuit 617 and/or context management circuit 616 as illustrated. For example, one embodiment of the MMU 609 includes segment/page walk circuitry for accessing segment/page tables 824 within the OS virtual address space 827. The interrupt management circuit 617 may process interrupt events 852 received from the graphics acceleration module 616. When performing graphics operations, an effective address 851 generated by a graphics processing engine 601-602, N is translated to a real address by the MMU 609.

In one embodiment, the same set of registers 615 are duplicated for each graphics processing engine 601-602, N and/or graphics acceleration module 616 and may be initialized by the hypervisor or operating system. Each of these duplicated registers may be included in an accelerator integration slice 830. Exemplary registers that may be initialized by the hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 823 is specific to a particular graphics acceleration module 616 and/or graphics processing engine 601-602, N. It contains all the information a graphics processing engine 601-602, N requires to do its work, or it can be a pointer to a memory location where the application has set up a command queue of work to be completed.

Figure 9:
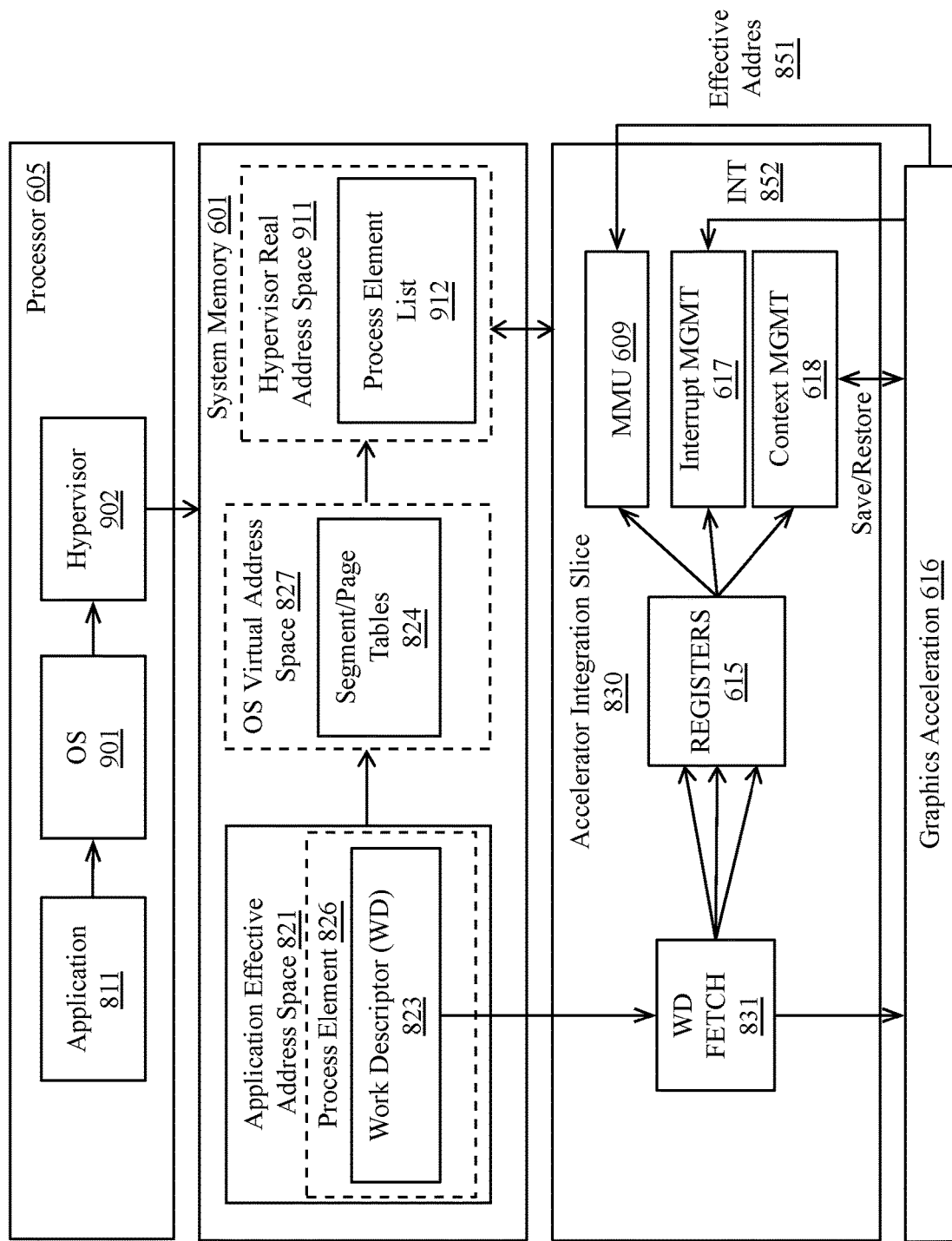
FIG. 9 illustrates additional details for one embodiment of a shared model.

FIG. 9 illustrates additional details for one embodiment of a shared model. This embodiment includes a hypervisor real address space 911 in which a process element list 912 is stored. The hypervisor real address space 911 is accessible via a hypervisor 902 which virtualizes the graphics acceleration module engines for the operating system 901.

The shared programming models allow for all or a subset of processes from all or a subset of partitions in the system to use a graphics acceleration module 616. There are two programming models where the graphics acceleration module 616 is shared by multiple processes and partitions: time-sliced shared and graphics directed shared.

In this model, the system hypervisor 902 owns the graphics acceleration module 616 and makes its function available to all operating systems 901. For a graphics acceleration module 616 to support virtualization by the system hypervisor 902, the graphics acceleration module 616 may adhere to the following requirements: 1) An application's job request must be autonomous (that is, the state does not need to be maintained between jobs), or the graphics acceleration module 616 must provide a context save and restore mechanism. 2) An application's job request is guaranteed by the graphics acceleration module 616 to complete in a specified amount of time, including any translation faults, or the graphics acceleration module 616 provides the ability to preempt the processing of the job. 3) The graphics acceleration module 616 must be guaranteed fairness between processes when operating in the directed shared programming model.

In one embodiment, for the shared model, the application 811 is required to make an operating system 901 system call with a graphics acceleration module 616 type, a work descriptor (WD), an authority mask register (AMR) value, and a context save/restore area pointer (CSRP). The graphics acceleration module 616 type describes the targeted acceleration function for the system call. The graphics acceleration module 616 type may be a system-specific value. The WD is formatted specifically for the graphics acceleration module 616 and can be in the form of a graphics acceleration module 616 command, an effective address pointer to a user-defined structure, an effective address pointer to a queue of commands, or any other data structure to describe the work to be done by the graphics acceleration module 616. In one embodiment, the AMR value is the AMR state to use for the current process. The value passed to the operating system is similar to an application setting the AMR. If the accelerator integration circuit 606 and graphics acceleration module 616 implementations do not support a User Authority Mask Override Register (UAMOR), the operating system may apply the current UAMOR value to the AMR value before passing the AMR in the hypervisor call. The hypervisor 902 may optionally apply the current Authority Mask Override Register (AMOR) value before placing the AMR into the process element 826. In one embodiment, the CSRP is one of the registers 610 containing the effective address of an area in the application's address space 821 for the graphics acceleration module 616 to save and restore the context state. This pointer is optional if no state is required to be saved between jobs or when a job is preempted. The context save/restore area may be pinned system memory.

Upon receiving the system call, the operating system 901 may verify that the application 811 has registered and been given the authority to use the graphics acceleration module 616. The operating system 901 then calls the hypervisor 902 with the information shown in Table 3.

TABLE 3

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 902 verifies that the operating system 901 has registered and been given the authority to use the graphics acceleration module 616. The hypervisor 902 then puts the process element 826 into the process element linked list for the corresponding graphics acceleration module 616 type. The process element may include the information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)
8 Interrupt vector table, derived from the hypervisor call parameters.
9 A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 830 registers 610.

Figure 10:
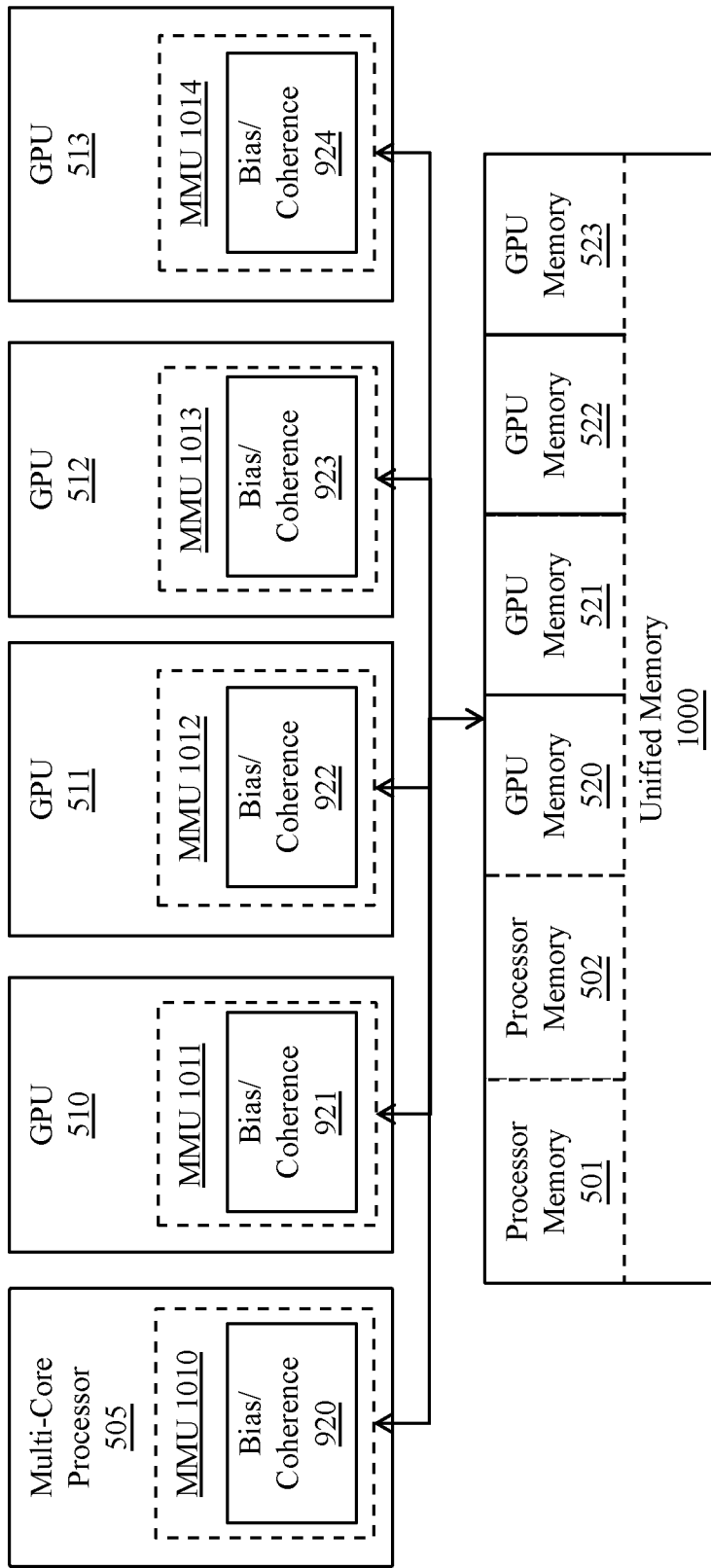
FIG. 10 illustrates a unified memory addressable via a common virtual memory address space, according to an embodiment.

As illustrated in FIG. 10, one embodiment of the invention employs a unified memory 1000 addressable via a common virtual memory address space used to access the physical processor memories 501-502 and GPU memories 520-523. In this implementation, operations executed on the GPUs 510-513 utilize the same virtual/effective memory address space to access the processors memories 501-502 and vice versa, thereby simplifying programmability. In one embodiment, a first portion of the virtual/effective address space is allocated to the processor memory 501, a second portion to the second processor memory 502, a third portion to the GPU memory 520, and so on. The entire virtual/effective memory space (sometimes referred to as the effective address space) is thereby distributed across each of the processor memories 501-502 and GPU memories 520-523, allowing any processor or GPU to access any physical memory with a virtual address mapped to that memory.

In one embodiment, bias/coherence management circuitry 920-924 within one or more of the MMUs 1010-1014 ensures cache coherence between the caches of the host processors (e.g., 505) and the GPUs 510-513 and also implements biasing techniques indicating the physical memories in which certain types of data should be stored. While multiple instances of bias/coherence management circuitry 920-924 are illustrated in FIG. 10, the bias/coherence circuitry may be implemented within the MMU of one or more host processors 1005 and/or within the accelerator integration circuit 606.

One embodiment allows GPU-attached memory 520-523 to be mapped as part of system memory and accessed using shared virtual memory (SVM) technology, but without suffering the typical performance drawbacks associated with full system cache coherence. The ability to GPU-attached memory 520-523 to be accessed as system memory without onerous cache coherence overhead provides a beneficial operating environment for GPU offload. This arrangement allows the host processor 505 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 520-523 without cache coherence overheads can be critical to the execution time of an offloaded computation. In cases with substantial streaming write memory traffic, for example, cache coherence overhead can significantly reduce the effective write bandwidth seen by a GPU 510-513. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 520-523, with or without a bias cache in the GPU 510-513 (e.g., to cache frequently/recently used entries of the bias table). Alternatively, the entire bias table may be maintained within the GPU 510 itself.

In one implementation, the bias table entry associated with each access to the GPU-attached memory 520-523 is accessed prior the actual access to the GPU memory, causing the following operations. First, local requests from the GPU 510 that find their page in GPU bias are forwarded directly to GPU memory 520. Local requests from the GPU 510 that find their page in host bias are forwarded to the processor 505 (e.g., over a high speed link as discussed above). In one embodiment, requests from the processor 505 that find the requested page in host processor bias complete the request like a normal memory read. Alternatively, requests directed to a GPU-biased page may be forwarded to the GPU 510. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 505 bias to GPU bias, but is not required for the opposite transition.

In one embodiment, cache coherency is maintained by temporarily rendering GPU-biased pages uncacheable by the host processor 505. In order to access these pages, the processor 505 may request access from the GPU 510 which may or may not grant access right away, depending on the implementation. Thus, to reduce communication between the processor 505 and GPU 510 it is beneficial to ensure that GPU-biased pages are those which are required by the GPU but not the host processor 505 and vice versa.

Graphics Processing Pipeline

Figure 11:
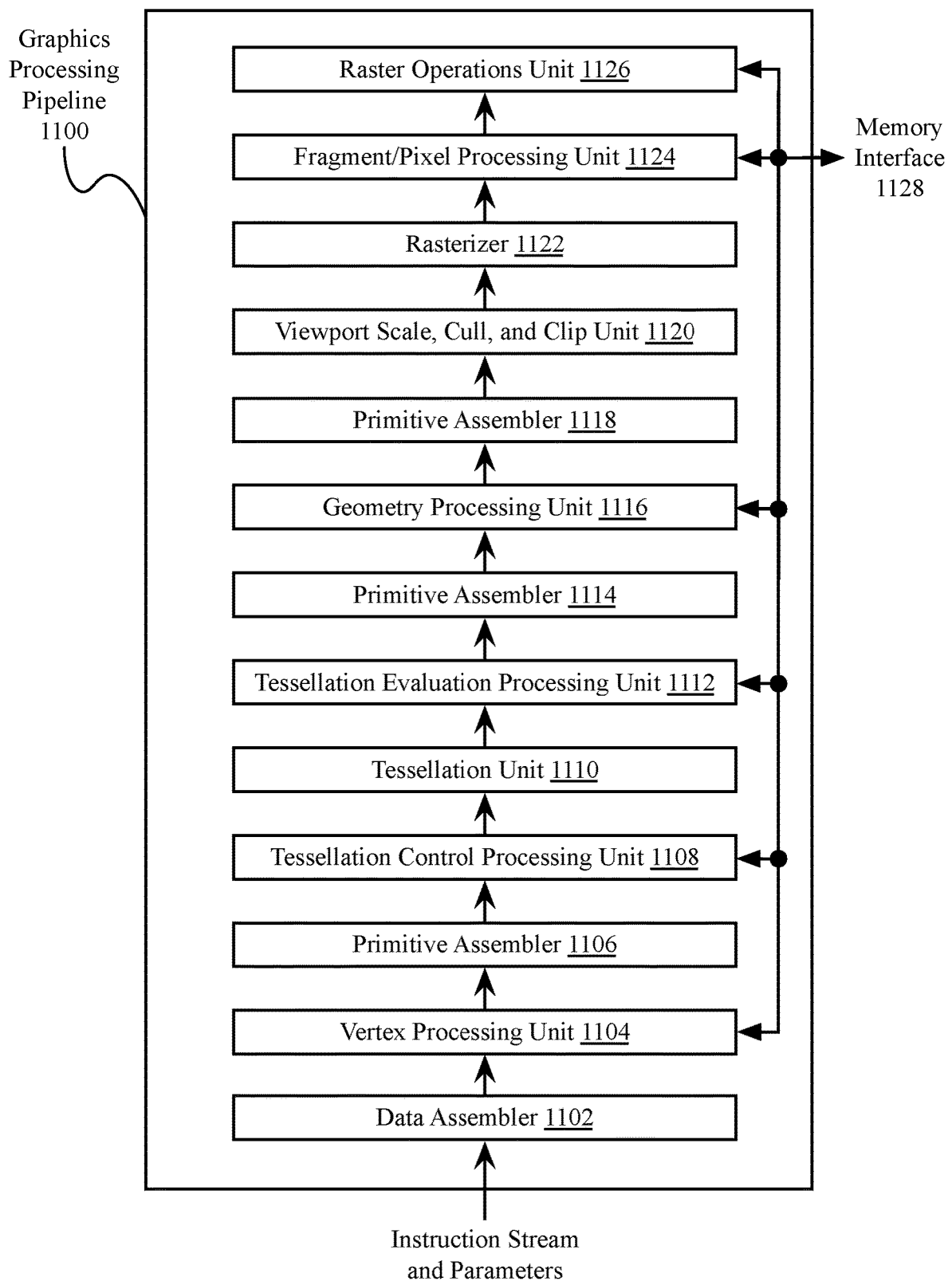
FIG. 11 is a conceptual diagram of a graphics processing pipeline, according to an embodiment.

FIG. 11 is a conceptual diagram of a graphics processing pipeline 1100, according to an embodiment. In one embodiment a graphics processor can implement the illustrated graphics processing pipeline 1100. The graphics processor can be included within the parallel processing subsystems as described herein, such as the parallel processor 200 of FIG. 2, which, in one embodiment, is a variant of the parallel processor(s) 112 of FIG. 1. The various parallel processing systems can implement the graphics processing pipeline 1100 via one or more instances of the parallel processing unit (e.g., parallel processing unit 202 of FIG. 2) as described herein. For example, a shader unit (e.g., graphics multiprocessor 304 of FIG. 3) may be configured to perform the functions of one or more of a vertex processing unit 1104, a tessellation control processing unit 1108, a tessellation evaluation processing unit 1112, a geometry processing unit 1116, and a fragment/pixel processing unit 1124.

The functions of data assembler 1102, primitive assemblers 1106, 1114, 1118, tessellation unit 1110, rasterizer 1122, and raster operations unit 1126 may also be performed by other processing engines within a processing cluster (e.g., processing cluster 314 of FIG. 3) and a corresponding partition unit (e.g., partition unit 220A-220N of FIG. 2). Alternately, the graphics processing pipeline 1100 may be implemented using dedicated processing units for one or more functions. In one embodiment, one or more portions of the graphics processing pipeline 1100 can be performed in by a parallel processing logic within a general purpose processor (e.g., CPU). In one embodiment, one or more portions of the graphics processing pipeline 1100 can access on-chip memory (e.g., parallel processor memory 222 as in FIG. 2) via a memory interface 1128, which may be an instance of the memory interface 218 of FIG. 2.

In one embodiment the data assembler 1102 is a processing unit that collects vertex data for high-order surfaces, primitives, etc., and outputs the vertex data, including the vertex attributes, to the vertex processing unit 1104. The vertex processing unit 1104 is a programmable execution unit that is configured to execute vertex shader programs, lighting and transforming vertex data as specified by the vertex shader programs. For example, vertex processing unit 1104 may be programmed to transform the vertex data from an object-based coordinate representation (object space) to an alternatively based coordinate system such as world space or normalized device coordinates (NDC) space. Vertex processing unit 1104 may read data that is stored in cache, local or system memory for use in processing the vertex data.

A first instance of a primitive assembler 1106 receives vertex attributes from the vertex processing unit 1104, reading stored vertex attributes as needed, and constructs graphics primitives for processing by tessellation control processing unit 1108, where the graphics primitives include triangles, line segments, points, patches, and so forth, as supported by various graphics processing application programming interfaces (APIs).

The tessellation control processing unit 1108 treats the input vertices as control points for a geometric patch and transforms these control points from the patch's input representation, often called the patch's basis, into a representation suitable for efficient surface evaluation by the tessellation evaluation processing unit 1112. The tessellation control processing unit 1108 also computes tessellation factors for edges of geometric patches. A tessellation factor applies to a single edge and quantifies a view-dependent level of detail associated with the edge. A tessellation unit 1110 is configured to receive the tessellation factors for edges of a patch and to tessellate the patch into multiple geometric primitives such as line, triangle, or quadrilateral primitives, which are transmitted to a tessellation evaluation processing unit 1112. The tessellation evaluation processing unit 1112 operates on parameterized coordinates of the subdivided patch to generate a surface representation and vertex attributes for each vertex associated with the geometric primitives.

A second instance of a primitive assembler 1114 receives vertex attributes from the tessellation evaluation processing unit 1112, reading stored vertex attributes as needed, and constructs graphics primitives for processing by the geometry processing unit 1116. The geometry processing unit 1116 is a programmable execution unit that is configured to execute geometry shader programs, transforming graphics primitives received from primitive assembler 1114 as specified by the geometry shader programs. For example, the geometry processing unit 1116 may be programmed to subdivide the graphics primitives into one or more new graphics primitives and calculate parameters, such as plane equation coefficients, that are used to rasterize the new graphics primitives.

In some embodiments the geometry processing unit 1116 may also add or delete elements in the geometry stream. Geometry processing unit 1116 outputs the parameters and vertices specifying new graphics primitives to primitive assembler 1118, which receives the parameters and vertices from the geometry processing unit 1116, reading stored vertex attributes, as needed, and constructs graphics primitives for processing by a viewport scale, cull, and clip unit 1120. The geometry processing unit 1116 may read data that is stored in parallel processor memory or system memory for use in processing the geometry data. The viewport scale, cull, and clip unit 1120 performs clipping, culling, and viewport scaling and outputs processed graphics primitives to a rasterizer 1122.

The rasterizer 1122 scan converts the new graphics primitives and outputs fragment and coverage data to the fragment/pixel processing unit 1124. Additionally, the rasterizer 1122 may be configured to perform z culling and other z-based optimizations.

The fragment/pixel processing unit 1124 is a programmable execution unit that is configured to execute fragment shader programs or pixel shader programs. The fragment/pixel processing unit 1124 transforming fragments or pixels received from rasterizer 1122, as specified by the fragment or pixel shader programs. For example, the fragment/pixel processing unit 1124 may be programmed to perform operations such as perspective correction, texture mapping, shading, blending, and the like, to produce shaded fragments or pixels that are output to raster operations unit 1126. The fragment/pixel processing unit 1124 may read data that is stored in parallel processor memory or system memory for use in processing the fragment data. Fragment or pixel shader programs may be configured to shade at the sample, pixel, tile, or other granularity, depending on the programmed sampling rate.

The raster operations unit 1126 is a processing unit that performs raster operations, such as stencil, z test, blending, and the like, and outputs pixel data as processed graphics data for storage in graphics memory. The processed graphics data may be stored in graphics memory, e.g., parallel processor memory 222 as in FIG. 2, and/or system memory 104 as in FIG. 1, for display on one of the one or more display device(s) 110 or for further processing by one of the one or more processor(s) 102 or parallel processor(s) 112. In some embodiments the raster operations unit 1126 is configured to compress z or color data that is written to memory and decompress z or color data that is read from memory.

Figure 12:
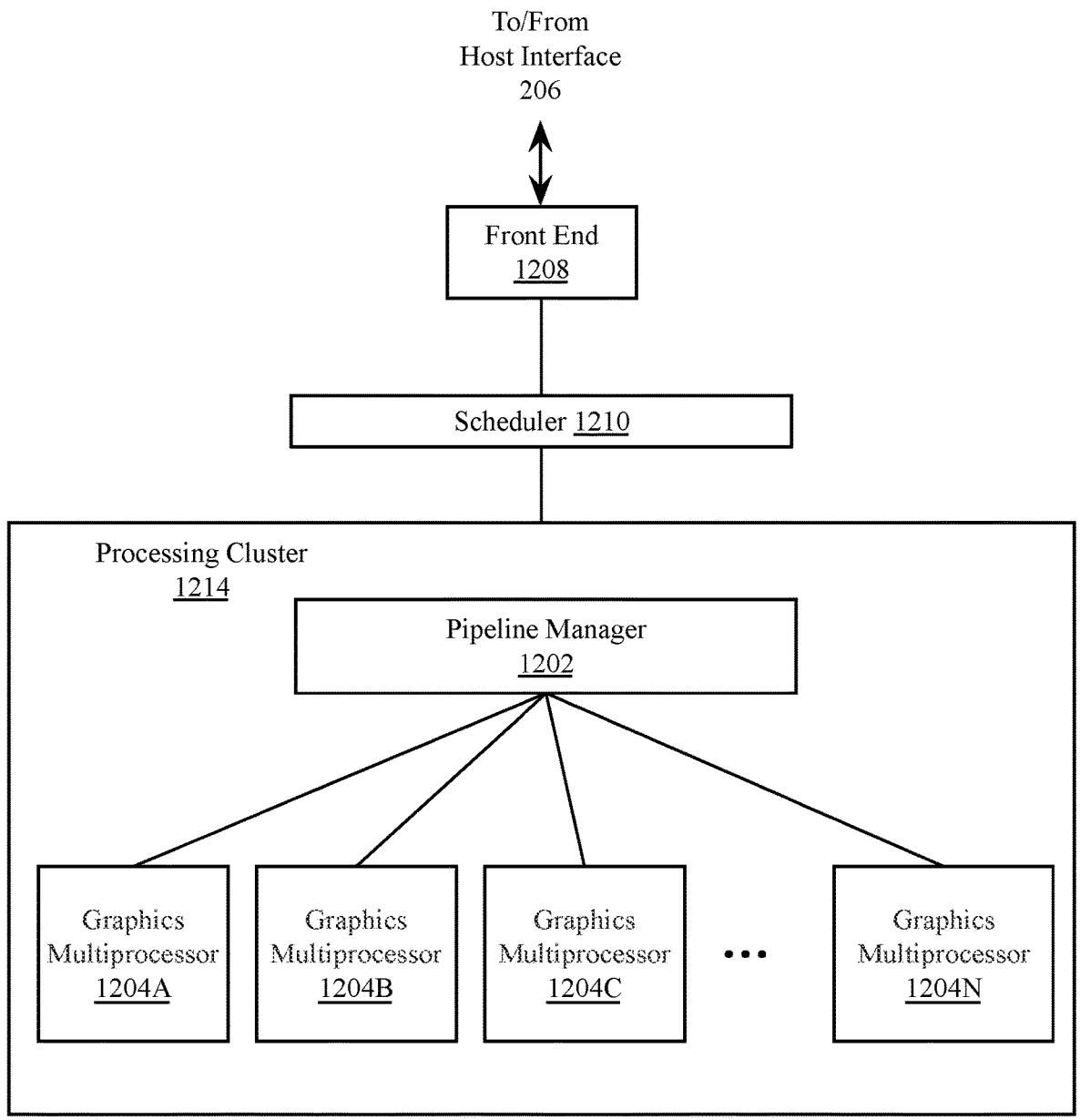
FIG. 12 illustrates a subsystem for spawning threads within a single-instruction multiple-data computation system, according to an embodiment.

FIG. 12 illustrates a subsystem 1200 for spawning threads within a single-instruction multiple-data (SIMD) computation system, according to an embodiment. The subsystem 1200 includes a front end 1208, a scheduler, and a processing cluster 1214, which, in one embodiment, are respective instances of the front end 208, scheduler 210, and any of cluster 214A-214N of the processing cluster array 212 shown in FIG. 2. In such embodiment, the front end is in communication with a host interface, such as the host interface 206 of FIG. 2. In one embodiment the processing cluster 1214 is a variant of the processing cluster 300 of FIG. 3. The processing cluster 1214 includes a pipeline manager 1202 and graphics multiprocessors 1204A-1204N. Each of the graphics multiprocessors 1204A-1204N can be similar to the graphics multiprocessor 304 of the processing cluster 300 of FIG. 3, although in one embodiment one of more instances of the graphics multiprocessors 1204A-1204N can differ slightly in capabilities. The pipeline manager 1202 can be a variant of the pipeline manager 302 of FIG. 3 and is configured to manager execution of thread groups on the graphics multiprocessors 1204A-1204N.

The processing cluster 1214 can execute graphics and general-purpose computations using thread groups. A thread group consists of a number of threads that concurrently execute the same program on an input data set to produce an output data set. The size of a thread group can vary and embodiments are not limited to any particular thread group size, although thread groups are generally scheduled with a number of threads that is a power of two (e.g., 16, 32, 64, 128, etc.). Each thread in the thread group is assigned a unique thread identifier (e.g., thread ID) that is accessible to the thread during its execution. The thread ID controls various aspects of the thread's processing behavior, such as determining which portion of the input data set a thread is to process and/or determining which portion of an output data set a thread is to produce or write.

When processing a graphics or computational workload, the scheduler 1210 receives a request from the front end 1208 to schedule thread groups on the graphics multiprocessors 1204A-1204N of the processing cluster 1214. The request can include a reference to a thread program to execute. The collection of threads of the thread program can be executed as a thread grid including one or more thread groups configured to execute on the processing cluster 1214. Each thread group includes one or more individual threads. In one embodiment, when a scheduler 1210 schedules a thread group to the processing cluster 1214, the pipeline manager 1202 assigns the thread group to one of the graphics multiprocessors 1204A-1204C.

In previous implementations, thread groups are scheduled to the graphics multiprocessors 1204A-1204N at thread group granularity. In other words, a thread group is scheduled to a graphics multiprocessor and executes on the graphics multiprocessor until all threads in the thread group are complete. In embodiments described herein, pipeline submissions are performed across the set of graphics multiprocessors 1204A-1204N within a processing cluster 1214 at sub-group granularity, such that upon completion of a thread sub-group on a graphics multiprocessor, a sub-group from a different thread group can be scheduled to the graphics multiprocessor. In some embodiments the number of threads within each sub-group of a thread group is programmable. In one embodiment the number of sub-groups can contain any even number division of threads within a thread group. For example, if an exemplary thread group contains 64 threads, a number of sub-thread groups can be configured containing any of 2, 4, 8, 16, or 32 threads. In other words, the exemplary thread group can be divided into any of 32, 16, 8, 4, or 2 sub-groups, although these numbers are exemplary and not limiting as to any one embodiment.

Figure 13:
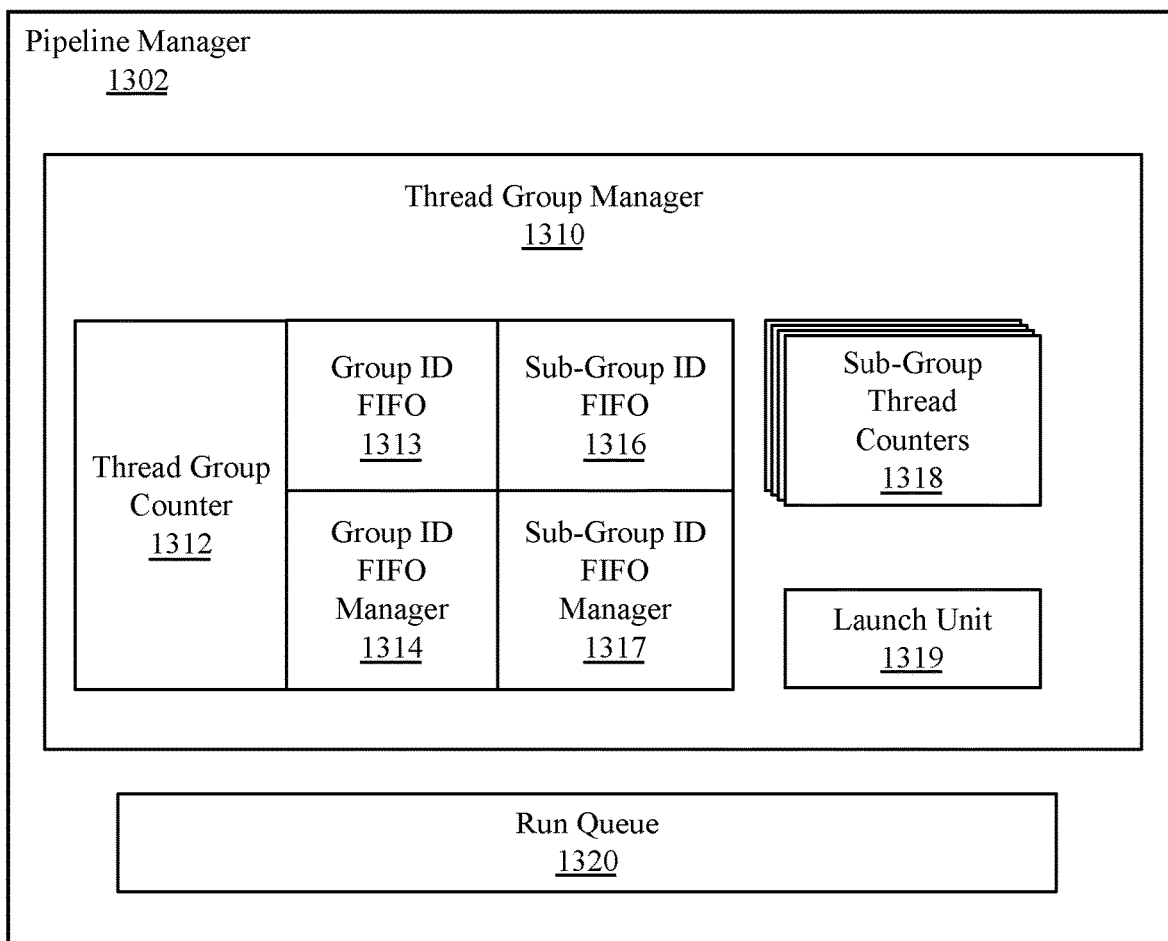
FIG. 13 illustrates a subsystem for managing thread groups and subgroups on an execution pipeline of a general-purpose graphics processing unit, according to an embodiment.

FIG. 13 illustrates a subsystem 1300 for managing thread groups and subgroups on an execution pipeline of a general purpose graphics processing unit, according to an embodiment. In one embodiment the subsystem 1300 includes a pipeline manager 1302, which may be a variant of the pipeline manager 302 of FIG. 3 and/or the pipeline manager 1202 of FIG. 12. The pipeline manager 1302 includes a thread group manager 1310 to manage scheduling of thread groups and subgroups to the execution pipeline of the graphics processor. The execution pipeline can include variants of the graphics multiprocessors 1204A-1204N of FIG. 12. In some embodiments the execution pipeline can also include additional execution resources other than the graphics multiprocessors, including special function units. In one embodiment the thread group manager 1310 includes a thread group counter 1312, a group ID FIFO 1313 (first-in, first-out buffer), a group ID FIFO manager 1314, a sub-group ID FIFO 1316, a sub-group ID FIFO manager 1317, sub-group thread counters 1318, a launch unit 1319, and a run queue 1320. While some embodiments described herein illustrate logic within the thread group manager 1310 to handle thread submission or execution at sub-group granularity, other embodiments can include sub-group logic within other scheduling components, such as the scheduler 1210 as in FIG. 12. In such embodiments, similar logic as illustrated within the thread group manager 1310 is included within a scheduler 1210 of FIG. 12, or other scheduling logic external to the processing cluster 1214 of FIG. 12.

In one embodiment the thread group counter 1312 includes a count of the number of thread groups that have active sub-groups within the execution pipeline. The thread group counter 1312 includes one or more counter registers to store a count value and logic to increment or decrement the count values stored in the one or more counter registers. The group ID FIFO 1313 is a first-in, first-out buffer that stores group identifiers for thread groups that are active in the execution pipeline. A group ID FIFO manager 1314 includes logic to allocate group identifiers for thread groups and insert the group identifiers into the group ID FIFO 1313. The sub-group ID FIFO 1316 is a first-in, first-out buffer that stores group identifiers for thread sub-groups that are active in the execution pipeline. The sub-group ID FIFO manager 1317 includes logic to allocate sub-group identifiers for thread sub-groups and insert the sub-group identifiers into the sub-group ID FIFO 1316.

In one embodiment the sub-group ID FIFO manager 1317 allocates each sub-group identifier based on the thread group associated with sub-group, such that the pipeline manager 1302 and logic within the execution pipeline can determine the thread group identifier that is associated with any given thread sub-group. In one embodiment, metadata is associated with each individual thread that contains the thread group identifier and the thread sub-group identifier to which the thread is assigned. In one embodiment the thread group identifier and sub-group identifier are accessible to the thread during execution.

The sub-group thread counters 1318 are multiple sets of counters, with each counter associated with separate sub-group. The sub-group thread counters 1318 include registers to store an active thread count value for each thread sub-group and logic to increment or decrement the active thread count value for each sub-group. The launch unit 1319 includes logic to dispatch the threads in a thread sub-group to the execution pipeline. Identifiers for executing threads can be stored in the run queue 1320 while the threads are being executed by the execution pipeline. In one embodiment, individual thread identifiers are stored in the run queue 1320. In one embodiment, sub-group identifiers can be stored in the run queue in addition to or in place of individual thread identifiers.

When a thread group is to be launched the thread group identifier is pushed onto the group ID FIFO 1313 by the Group ID FIFO manager 1314. The identifier of each sub-group associated with the thread group identifier is also pushed onto the sub-group ID FIFO 1316 by the sub-group ID FIFO manager 1317. The launch unit 1319 can then launch each thread of the thread group and associated thread sub-groups.

In one embodiment the launch unit 1319 is configured to launch each thread of a thread group when the identifier of the thread group is pushed onto the group ID FIFO 1313. In such embodiment the launch unit 1319 will attempt to launch the sub-groups of the thread group based on available execution resources within the execution pipeline. For example, when the execution pipeline is starting from an idle state, all sub-groups of a thread group can be launched by the launch unit 1319 and the thread group counter 1312 can be incremented to indicate that a thread group is executing on the execution pipeline. The sub-group ID FIFO manager 1317 can then push the identifier of each sub-group into the sub-group ID FIFO 1316. The counters for the respective sub-groups are incremented in the sub-group thread counters 1318 for each thread in the respective sub-groups.

As threads within the sub-groups complete execution within the execution pipeline, the sub-group thread counters 1318 are decremented. When all threads in a thread sub-group complete execution the counter of the thread sub-group will be decremented to zero and the thread sub-group can be retired. Thread sub-groups may be independently retired, such that thread sub-groups may retire when complete without requiring all sub-groups of a thread group to be complete. In one embodiment the launch unit 1319 is configured to remove identifiers for retired threads and/or sub-groups from the run queue 1320 when the thread sub-group is complete. While the run queue 1320 is illustrated as separate from the thread group manager 1310, in one embodiment the run queue 1320 can be a component of the launch unit 1319 within the thread group manager 1310.

As thread sub-groups are retired and execution resources within the execution pipeline become available, the launch unit 1319 can launch threads associated with sub-groups of a pending thread group. Threads can continue to be assigned at sub-group granularity until all pending thread groups and associated sub-groups complete execution. Once all sub-groups of a thread group complete execution, the thread group counter 1312 is decremented.

When dispatching threads at a sub-group granularity, a graphics multiprocessor within the execution pipeline may execute threads from different thread groups. As sub-groups of a first thread group complete execution, thread sub-groups from a different thread group can be launched on the graphics multiprocessor before all sub-groups of the thread group are complete.

Figure 14:
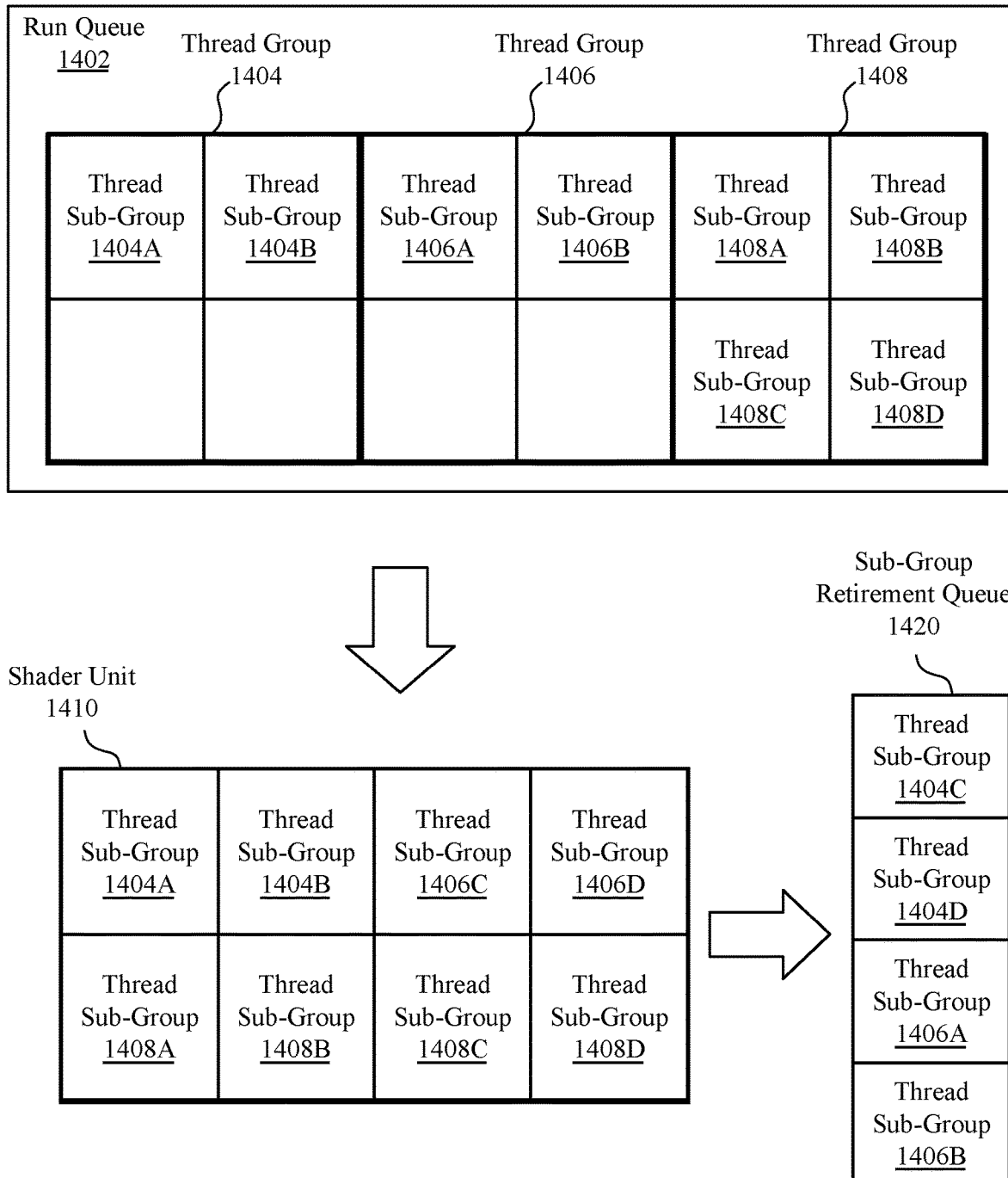
FIG. 14 illustrates execution of thread sub-groups within a graphics multiprocessor, according to an embodiment.

FIG. 14 illustrates execution of thread sub-groups within a graphics multiprocessor, according to an embodiment. In one embodiment a run queue 1402 includes identifiers for threads that have been dispatched to a graphics multiprocessor 1410. The graphics multiprocessor 1410 can be any graphics multiprocessor 1410 described herein, including graphics multiprocessor 304 of FIG. 3, graphics multiprocessor 400 of FIG. 4A, and/or any of graphics multiprocessor 1204A-1204N of FIG. 12. The run queue 1402, in one embodiment, is a variant of the run queue 1320 of FIG. 13 and contains identifiers associated with threads that have been dispatched for execution on a graphics multiprocessor 1410. A sub-group retirement queue 1420 is illustrated that contains identifiers for threads and/or thread sub-groups that have completed execution and are in the process of being retired.

In the illustrated run queue 1402, multiple thread groups, for example, thread group 1404, thread group 1406, and thread group 1408, have been dispatched for execution on the graphics multiprocessor 1410. While the number of thread groups can vary across and within embodiments, each thread group is shown with four exemplary sub-groups. In one embodiment, if the graphics multiprocessor 1410 is starting at an idle state, all thread sub-groups of one or more thread groups can be executed. For example, all sub-groups of thread group 1404 and thread group 1406 can be executed on the graphics multiprocessor 1410 while thread group 1408 waits for execution in the run queue 1402. When initially launched, all sub-groups of a thread group can be launched on the graphics multiprocessor 1410. Sub-groups of a thread group will not necessarily complete at the same rate, so some thread sub-groups may complete before other thread sub-groups. For example, if thread sub-group 1404C and thread sub-group 1404D complete before thread sub-groups 1404A and thread sub-group 1404B, thread sub-groups 1404C, 1404D are removed from the graphics multiprocessor 1410 and identifiers associated with the completed thread sub-groups can be placed into a sub-group retirement queue 1420. Similar operations can occur should thread sub-group 1406A and thread sub-group 1406B complete before thread sub-group 1406C and thread sub-group 1406D. In one embodiment, retired thread sub-groups are tracked via the sub-group retirement queue 1420 until all sub-groups of a thread group are complete.

In embodiments described herein, the vacant execution resources within the graphics multiprocessor 1410 left by the completed thread sub-groups 1404C, 1404D, 1406A, 1406B can be filled with threads of a pending thread group. For example, thread sub-group 1408A, thread sub-group 1408B, thread sub-group 1408C, and thread sub-group 1408D of thread group 1408 can be executed on the graphics multiprocessor 1410 before all threads of thread group 1404 and thread group 1406 are complete.

In one embodiment a thread within one thread sub-group can have dependencies upon a thread within a different sub-group. In such embodiment, a scoreboard can be maintained to track dependencies between the different thread sub-groups. If a first thread sub-group is dependent on a status of execution of a second thread sub-group, the scoreboard can prevent execution of instructions within a thread until the dependencies are satisfied. For example and in one embodiment, if a thread in thread sub-group 1408A is dependent upon the outcome of a thread in thread sub-group 1408B, thread sub-groups 1408B-1408C can execute on the graphics multiprocessor while some other thread sub-group is executed. Thread sub-group 1408A can then execute once thread sub-group 1408B completes. Alternatively, one embodiment can be configured to launch thread sub-group 1408A along with thread sub-group 1408B. For example, if no additional thread sub-groups are pending, it may be beneficial to launch the threads of thread sub-group 1408A and prevent issue or execution of thread instructions (e.g., via barrier instructions, scoreboard logic, etc.) until the dependent data from thread sub-group 1408B is available.

Figure 15:
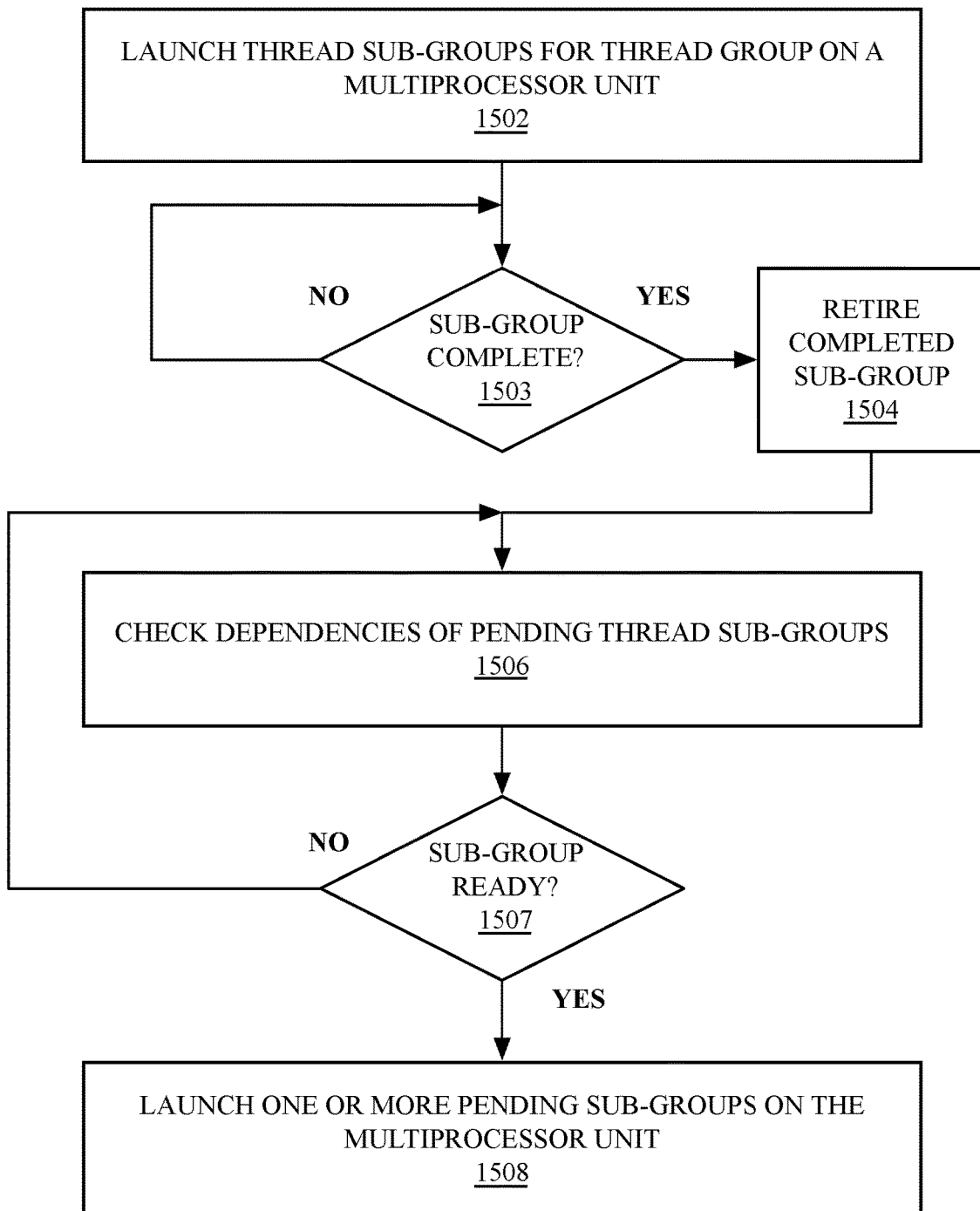
FIG. 15 is a flow diagram of logic to launch thread sub-groups on a graphics multiprocessor, according to an embodiment.

FIG. 15 is a flow diagram of logic 1500 to launch thread sub-groups on a graphics multiprocessor, according to an embodiment. The logic 1500 can be included within hardware or firmware logic of a scheduler or pipeline manager as described herein. The logic 1500 is configured to launch threads on a graphics multiprocessor at sub-group granularity while respecting dependencies between threads in differing sub-groups.

In one embodiment the logic is configured to launch thread sub-groups for a thread group on a multiprocessor unit, as shown at 1502. When starting from an idle state, all sub-groups of a thread group can be launched on the graphics multiprocessor. Once a thread sub-group of a thread group completes, as determined at 1503, the logic 1500 can retired the completed sub-group at 1504. In one embodiment, retiring a completed sub-group includes storing an identifier for the completed sub-group in a retired thread sub-group until all sub-groups of a thread group are complete.

The logic 1500 can fill any idle execution resources within a graphics multiprocessor having completed thread sub-groups by launching additional thread sub-groups. The additional thread sub-groups can be associated with a different thread group than any currently executing thread groups. In one embodiment, threads within a thread group can have cross sub-group dependencies. Additionally, threads within a sub-group can have dependencies on shared resources within the graphics multiprocessor. Accordingly, dependencies for each thread sub-group can be tracked. Before launching additional thread sub-groups the logic 1500 can check the dependencies of pending thread sub-groups, as shown at 1506. If the logic 1500 determines at 1507 that a pending thread sub-group is ready to launch (e.g., has no unsatisfied dependencies), the logic 1500 can launch one or more pending sub-groups on the multiprocessor unit, as shown at 1508. During normal operation the logic 1500 can continue to perform the illustrated operations until the thread sub-groups of the pending thread groups have completed execution.

Additional Exemplary Graphics Processing System

Details of the embodiments described above can be incorporated within graphics processing systems and devices described below. The graphics processing system and devices of FIG. 16 through FIG. 29 illustrate alternative systems and graphics processing hardware that can implement any and all of the techniques described above.

Additional Exemplary Graphics Processing System Overview

Figure 16:
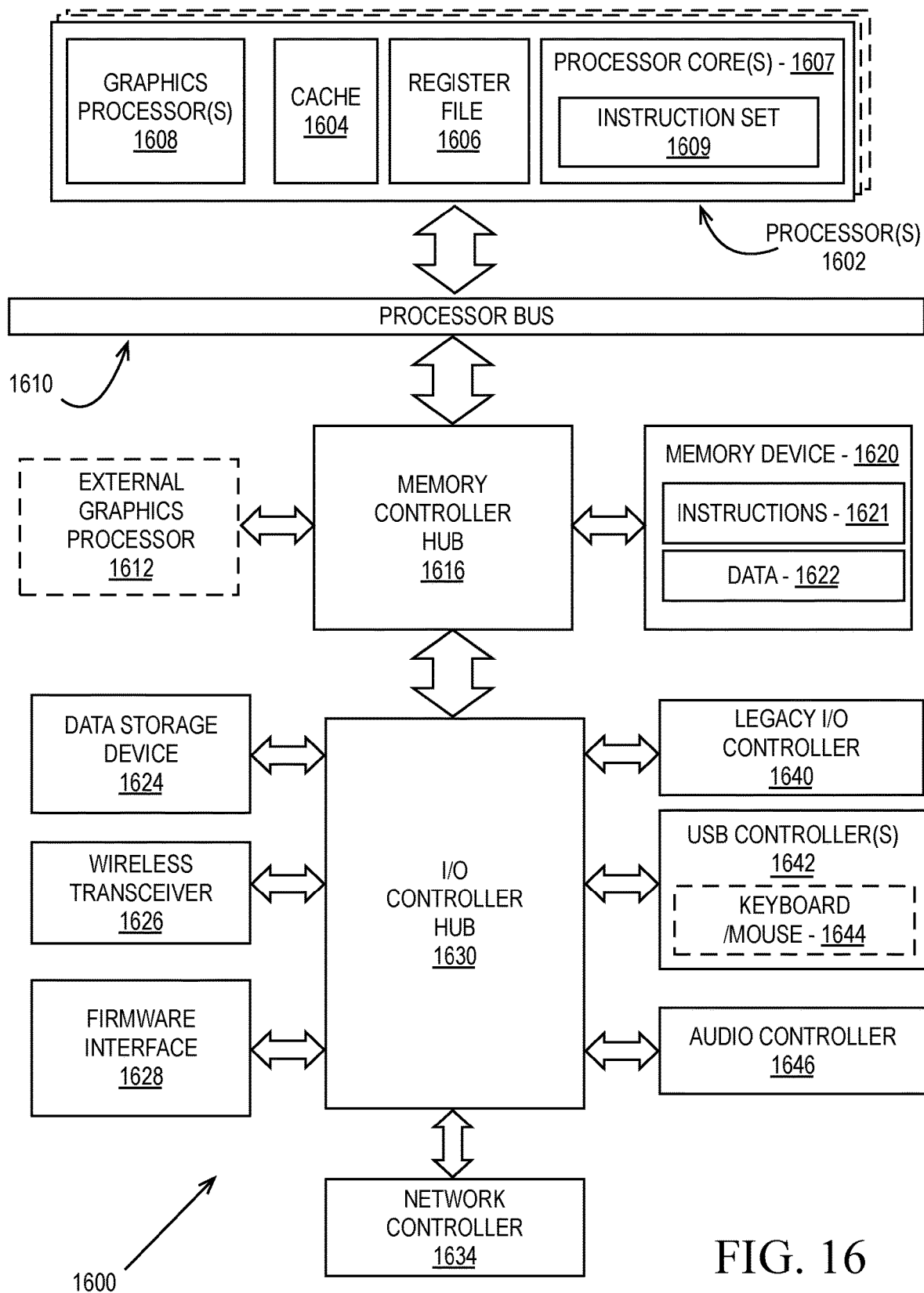
FIG. 16 is a block diagram of a processing system, according to an embodiment.

FIG. 16 is a block diagram of a processing system 1600, according to an embodiment. In various embodiments the system 1600 includes one or more processors 1602 and one or more graphics processors 1608, and may be a single processor desktop system, a multiprocessor workstation system, or a server system having a large number of processors 1602 or processor cores 1607. In one embodiment, the system 1600 is a processing platform incorporated within a system-on-a-chip (SoC) integrated circuit for use in mobile, handheld, or embedded devices.

An embodiment of system 1600 can include, or be incorporated within a server-based gaming platform, a game console, including a game and media console, a mobile gaming console, a handheld game console, or an online game console. In some embodiments system 1600 is a mobile phone, smart phone, tablet computing device or mobile Internet device. Data processing system 1600 can also include, couple with, or be integrated within a wearable device, such as a smart watch wearable device, smart eyewear device, augmented reality device, or virtual reality device. In some embodiments, data processing system 1600 is a television or set top box device having one or more processors 1602 and a graphical interface generated by one or more graphics processors 1608.

In some embodiments, the one or more processors 1602 each include one or more processor cores 1607 to process instructions which, when executed, perform operations for system and user software. In some embodiments, each of the one or more processor cores 1607 is configured to process a specific instruction set 1609. In some embodiments, instruction set 1609 may facilitate Complex Instruction Set Computing (CISC), Reduced Instruction Set Computing (RISC), or computing via a Very Long Instruction Word (VLIW). Multiple processor cores 1607 may each process a different instruction set 1609, which may include instructions to facilitate the emulation of other instruction sets. Processor core 1607 may also include other processing devices, such a Digital Signal Processor (DSP).

In some embodiments, the processor 1602 includes cache memory 1604. Depending on the architecture, the processor 1602 can have a single internal cache or multiple levels of internal cache. In some embodiments, the cache memory is shared among various components of the processor 1602. In some embodiments, the processor 1602 also uses an external cache (e.g., a Level-3 (L3) cache or Last Level Cache (LLC)) (not shown), which may be shared among processor cores 1607 using known cache coherency techniques. A register file 1606 is additionally included in processor 1602 which may include different types of registers for storing different types of data (e.g., integer registers, floating point registers, status registers, and an instruction pointer register). Some registers may be general-purpose registers, while other registers may be specific to the design of the processor 1602.

In some embodiments, processor 1602 is coupled with a processor bus 1610 to transmit communication signals such as address, data, or control signals between processor 1602 and other components in system 1600. In one embodiment the system 1600 uses an exemplary 'hub' system architecture, including a memory controller hub 1616 and an Input Output (I/O) controller hub 1630. A memory controller hub 1616 facilitates communication between a memory device and other components of system 1600, while an I/O Controller Hub (ICH) 1630 provides connections to I/O devices via a local I/O bus. In one embodiment, the logic of the memory controller hub 1616 is integrated within the processor.

Memory device 1620 can be a dynamic random-access memory (DRAM) device, a static random access memory (SRAM) device, flash memory device, phase-change memory device, or some other memory device having suitable performance to serve as process memory. In one embodiment the memory device 1620 can operate as system memory for the system 1600, to store data 1622 and instructions 1621 for use when the one or more processors 1602 executes an application or process. Memory controller hub 1616 also couples with an optional external graphics processor 1612, which may communicate with the one or more graphics processors 1608 in processors 1602 to perform graphics and media operations.

In some embodiments, ICH 1630 enables peripherals to connect to memory device 1620 and processor 1602 via a high-speed I/O bus. The I/O peripherals include, but are not limited to, an audio controller 1646, a firmware interface 1628, a wireless transceiver 1626 (e.g., Wi-Fi, Bluetooth), a data storage device 1624 (e.g., hard disk drive, flash memory, etc.), and a legacy I/O controller 1640 for coupling legacy (e.g., Personal System 2 (PS/2)) devices to the system. One or more Universal Serial Bus (USB) controllers 1642 connect input devices, such as keyboard and mouse 1644 combinations. A network controller 1634 may also couple with ICH 1630. In some embodiments, a high-performance network controller (not shown) couples with processor bus 1610. It will be appreciated that the system 1600 shown is exemplary and not limiting, as other types of data processing systems that are differently configured may also be used. For example, the I/O controller hub 1630 may be integrated within the one or more processor 1602, or the memory controller hub 1616 and I/O controller hub 1630 may be integrated into a discreet external graphics processor, such as the external graphics processor 1612.

Figure 17:
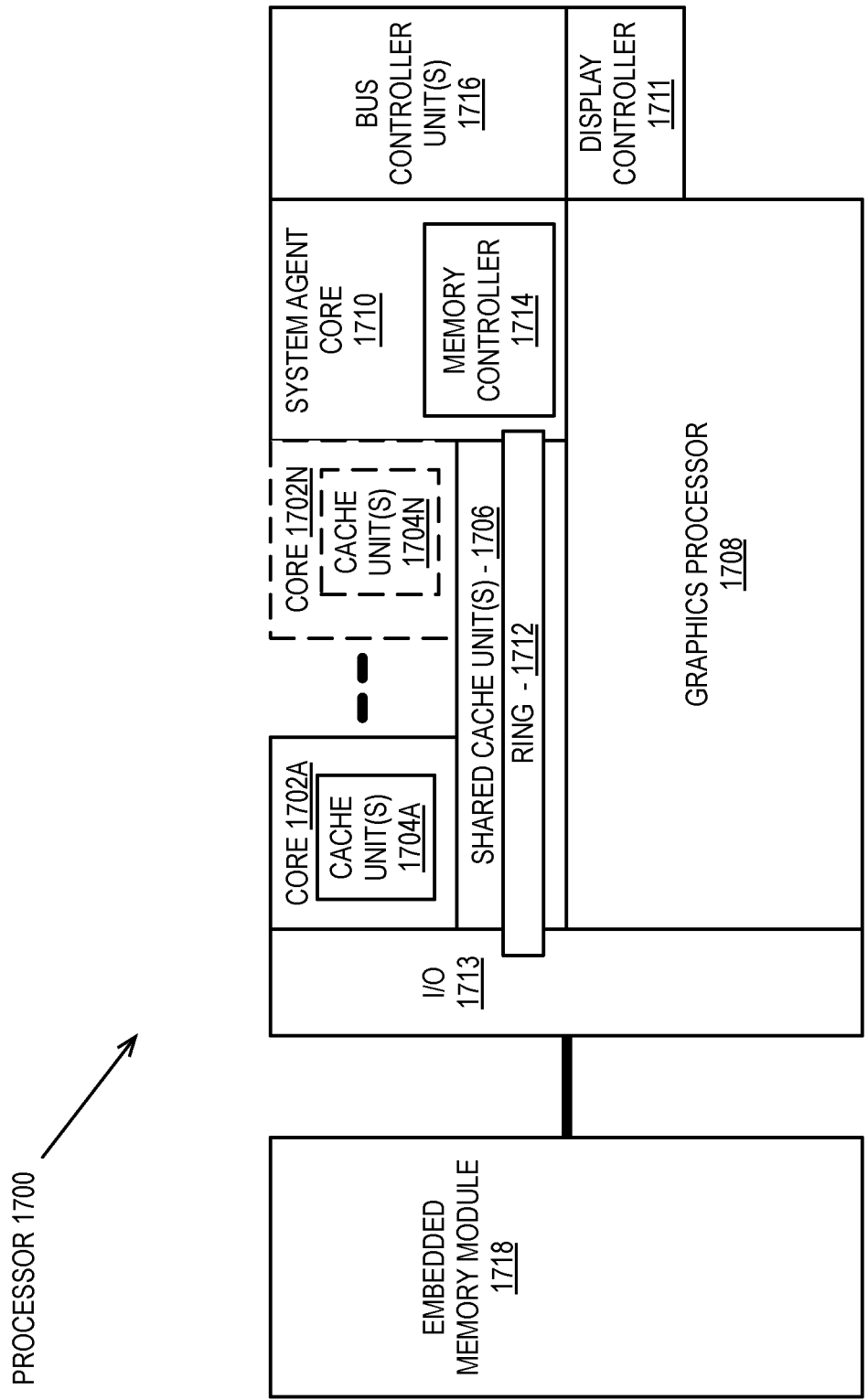
FIG. 17 is a block diagram of a processor according to an embodiment.

FIG. 17 is a block diagram of an embodiment of a processor 1700 having one or more processor cores 1702A-1702N, an integrated memory controller 1714, and an integrated graphics processor 1708. Those elements of FIG. 17 having the same reference numbers (or names) as the elements of any other figure herein can operate or function in any manner similar to that described elsewhere herein but are not limited to such. Processor 1700 can include additional cores up to and including additional core 1702N represented by the dashed lined boxes. Each of processor cores 1702A-1702N includes one or more internal cache units 1704A-1704N. In some embodiments each processor core also has access to one or more shared cached units 1706.

The internal cache units 1704A-1704N and shared cache units 1706 represent a cache memory hierarchy within the processor 1700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1706 and 1704A-1704N.

In some embodiments, processor 1700 may also include a set of one or more bus controller units 1716 and a system agent core 1710. The one or more bus controller units 1716 manage a set of peripheral buses, such as one or more Peripheral Component Interconnect buses (e.g., PCI, PCI Express). System agent core 1710 provides management functionality for the various processor components. In some embodiments, system agent core 1710 includes one or more integrated memory controllers 1714 to manage access to various external memory devices (not shown).

In some embodiments, one or more of the processor cores 1702A-1702N include support for simultaneous multithreading. In such embodiment, the system agent core 1710 includes components for coordinating and operating cores 1702A-1702N during multi-threaded processing. System agent core 1710 may additionally include a power control unit (PCU), which includes logic and components to regulate the power state of processor cores 1702A-1702N and graphics processor 1708.

In some embodiments, processor 1700 additionally includes graphics processor 1708 to execute graphics processing operations. In some embodiments, the graphics processor 1708 couples with the set of shared cache units 1706, and the system agent core 1710, including the one or more integrated memory controllers 1714. In some embodiments, a display controller 1711 is coupled with the graphics processor 1708 to drive graphics processor output to one or more coupled displays. In some embodiments, display controller 1711 may be a separate module coupled with the graphics processor via at least one interconnect, or may be integrated within the graphics processor 1708 or system agent core 1710.

In some embodiments, a ring-based interconnect unit 1712 is used to couple the internal components of the processor 1700. However, an alternative interconnect unit may be used, such as a point-to-point interconnect, a switched interconnect, or other techniques, including techniques well known in the art. In some embodiments, graphics processor 1708 couples with the ring interconnect 1712 via an I/O link 1713.

The exemplary I/O link 1713 represents at least one of multiple varieties of I/O interconnects, including an on package I/O interconnect which facilitates communication between various processor components and a high-performance embedded memory module 1718, such as an eDRAM module. In some embodiments, each of the processor cores 1702A-1702N and graphics processor 1708 use embedded memory modules 1718 as a shared Last Level Cache.

In some embodiments, processor cores 1702A-1702N are homogenous cores executing the same instruction set architecture. In another embodiment, processor cores 1702A-1702N are heterogeneous in terms of instruction set architecture (ISA), where one or more of processor cores 1702A-1702N execute a first instruction set, while at least one of the other cores executes a subset of the first instruction set or a different instruction set. In one embodiment processor cores 1702A-1702N are heterogeneous in terms of microarchitecture, where one or more cores having a relatively higher power consumption couple with one or more power cores having a lower power consumption. Additionally, processor 1700 can be implemented on one or more chips or as an SoC integrated circuit having the illustrated components, in addition to other components.

Figure 18:
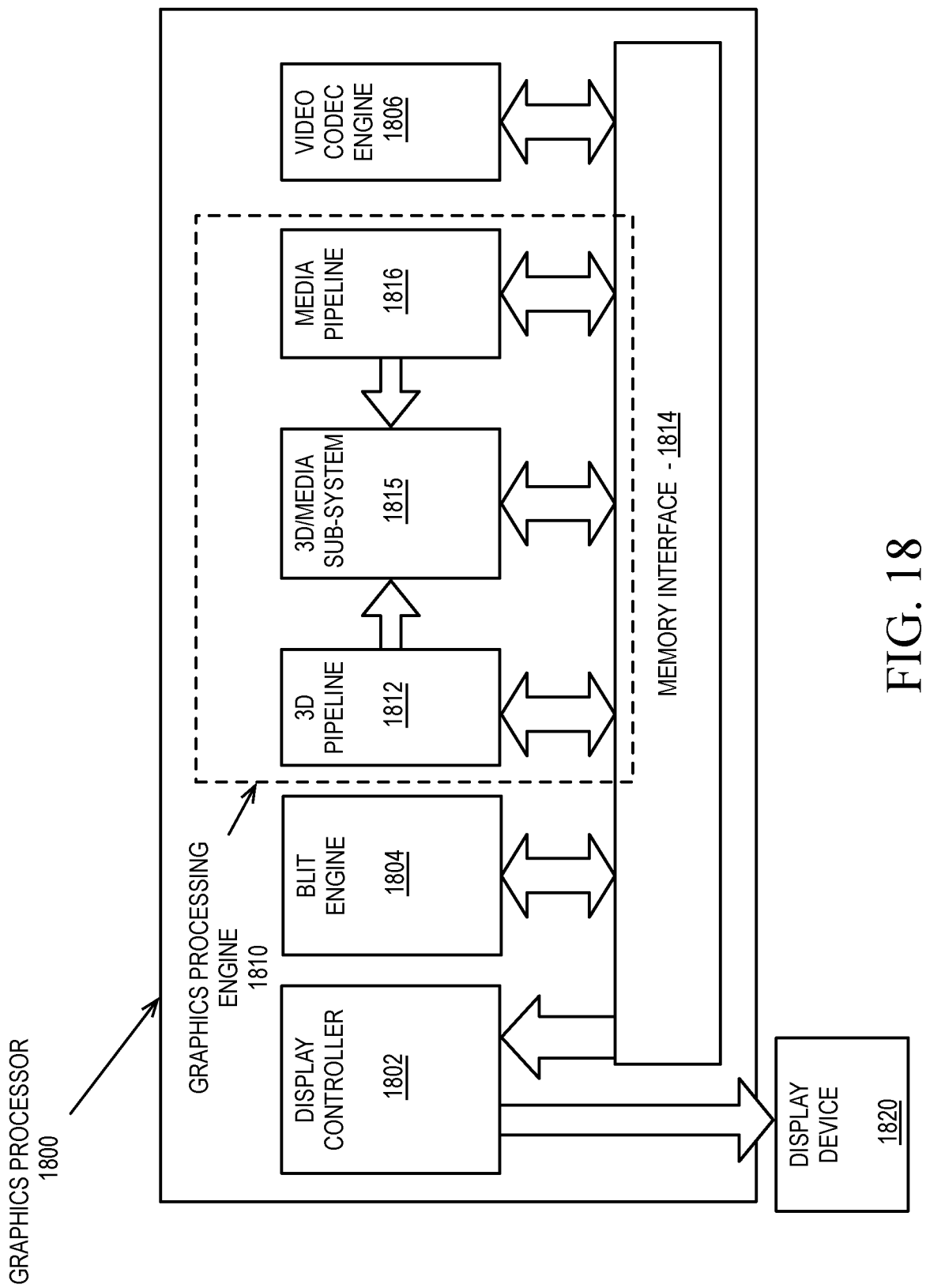
FIG. 18 is a block diagram of a graphics processor, according to an embodiment.

FIG. 18 is a block diagram of a graphics processor 1800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1800 includes a memory interface 1814 to access memory. Memory interface 1814 can be an interface to local memory, one or more internal caches, one or more shared external caches, and/or to system memory.

In some embodiments, graphics processor 1800 also includes a display controller 1802 to drive display output data to a display device 1820. Display controller 1802 includes hardware for one or more overlay planes for the display and composition of multiple layers of video or user interface elements. In some embodiments, graphics processor 1800 includes a video codec engine 1806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1800 includes a block image transfer (BLIT) engine 1804 to perform two-dimensional (2D) rasterizer operations including, for example, bit-boundary block transfers. However, in one embodiment, 2D graphics operations are performed using one or more components of graphics processing engine (GPE) 1810. In some embodiments, GPE 1810 is a compute engine for performing graphics operations, including three-dimensional (3D) graphics operations and media operations.

In some embodiments, GPE 1810 includes a 3D pipeline 1812 for performing 3D operations, such as rendering three-dimensional images and scenes using processing functions that act upon 3D primitive shapes (e.g., rectangle, triangle, etc.). The 3D pipeline 1812 includes programmable and fixed function elements that perform various tasks within the element and/or spawn execution threads to a 3D/Media sub-system 1815. While 3D pipeline 1812 can be used to perform media operations, an embodiment of GPE 1810 also includes a media pipeline 1816 that is specifically used to perform media operations, such as video post-processing and image enhancement.

In some embodiments, media pipeline 1816 includes fixed function or programmable logic units to perform one or more specialized media operations, such as video decode acceleration, video de-interlacing, and video encode acceleration in place of, or on behalf of video codec engine 1806. In some embodiments, media pipeline 1816 additionally includes a thread spawning unit to spawn threads for execution on 3D/Media sub-system 1815. The spawned threads perform computations for the media operations on one or more graphics execution units included in 3D/Media subsystem 1815.

In some embodiments, 3D/Media subsystem 1815 includes logic for executing threads spawned by 3D pipeline 1812 and media pipeline 1816. In one embodiment, the pipelines send thread execution requests to 3D/Media subsystem 1815, which includes thread dispatch logic for arbitrating and dispatching the various requests to available thread execution resources. The execution resources include an array of graphics execution units to process the 3D and media threads. In some embodiments, 3D/Media subsystem 1815 includes one or more internal caches for thread instructions and data. In some embodiments, the subsystem also includes shared memory, including registers and addressable memory, to share data between threads and to store output data.

Additional Exemplary Graphics Processing Engine

Figure 19:
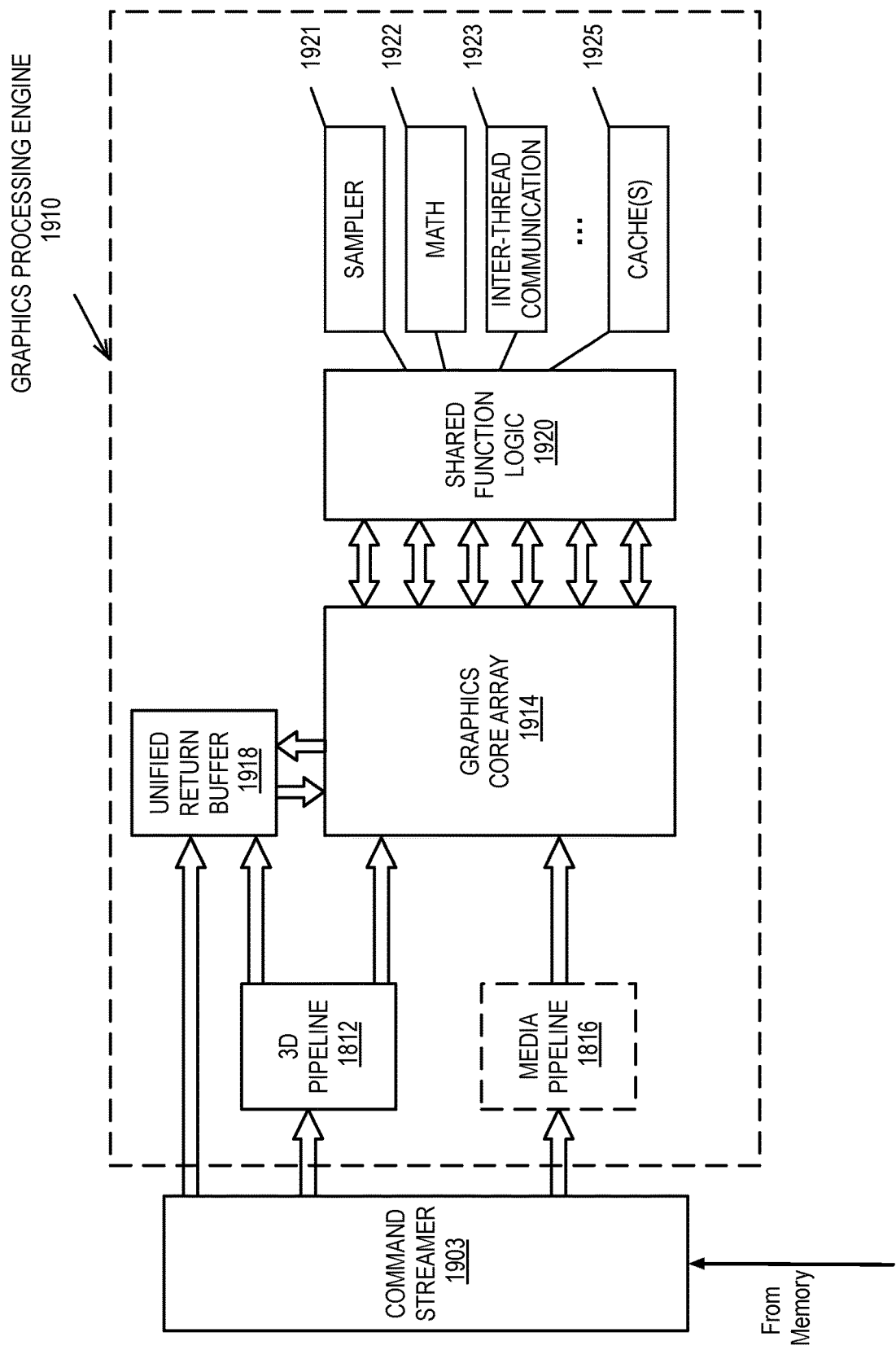
FIG. 19 is a block diagram of a graphics processing engine of a graphics processor in accordance with some embodiments.

FIG. 19 is a block diagram of a graphics processing engine 1910 of a graphics processor in accordance with some embodiments. In one embodiment, the graphics processing engine (GPE) 1910 is a version of the GPE 1810 shown in FIG. 18. Elements of FIG. 19 having the same reference numbers (or names) as the elements of any other figure herein can operate or function in any manner similar to that described elsewhere herein, but are not limited to such. For example, the 3D pipeline 1812 and media pipeline 1816 of FIG. 18 are illustrated. The media pipeline 1816 is optional in some embodiments of the GPE 1910 and may not be explicitly included within the GPE 1910. For example and in at least one embodiment, a separate media and/or image processor is coupled to the GPE 1910.

In some embodiments, GPE 1910 couples with or includes a command streamer 1903, which provides a command stream to the 3D pipeline 1812 and/or media pipelines 1816. In some embodiments, command streamer 1903 is coupled with memory, which can be system memory, or one or more of internal cache memory and shared cache memory. In some embodiments, command streamer 1903 receives commands from the memory and sends the commands to 3D pipeline 1812 and/or media pipeline 1816. The commands are directives fetched from a ring buffer, which stores commands for the 3D pipeline 1812 and media pipeline 1816. In one embodiment, the ring buffer can additionally include batch command buffers storing batches of multiple commands. The commands for the 3D pipeline 1812 can also include references to data stored in memory, such as but not limited to vertex and geometry data for the 3D pipeline 1812 and/or image data and memory objects for the media pipeline 1816. The 3D pipeline 1812 and media pipeline 1816 process the commands and data by performing operations via logic within the respective pipelines or by dispatching one or more execution threads to a graphics core array 1914.

In various embodiments the 3D pipeline 1812 can execute one or more shader programs, such as vertex shaders, geometry shaders, pixel shaders, fragment shaders, compute shaders, or other shader programs, by processing the instructions and dispatching execution threads to the graphics core array 1914. The graphics core array 1914 provides a unified block of execution resources. Multi-purpose execution logic (e.g., execution units) within the graphic core array 1914 includes support for various 3D API shader languages and can execute multiple simultaneous execution threads associated with multiple shaders.

In some embodiments the graphics core array 1914 also includes execution logic to perform media functions, such as video and/or image processing. In one embodiment, the execution units additionally include general-purpose logic that is programmable to perform parallel general purpose computational operations, in addition to graphics processing operations. The general-purpose logic can perform processing operations in parallel or in conjunction with general purpose logic within the processor core(s) 1607 of FIG. 16 or core 1702A-1702N as in FIG. 17.

Output data generated by threads executing on the graphics core array 1914 can output data to memory in a unified return buffer (URB) 1918. The URB 1918 can store data for multiple threads. In some embodiments the URB 1918 may be used to send data between different threads executing on the graphics core array 1914. In some embodiments the URB 1918 may additionally be used for synchronization between threads on the graphics core array and fixed function logic within the shared function logic 1920.

In some embodiments, graphics core array 1914 is scalable, such that the array includes a variable number of graphics cores, each having a variable number of execution units based on the target power and performance level of GPE 1910. In one embodiment the execution resources are dynamically scalable, such that execution resources may be enabled or disabled as needed.

The graphics core array 1914 couples with shared function logic 1920 that includes multiple resources that are shared between the graphics cores in the graphics core array. The shared functions within the shared function logic 1920 are hardware logic units that provide specialized supplemental functionality to the graphics core array 1914. In various embodiments, shared function logic 1920 includes but is not limited to sampler 1921, math 1922, and inter-thread communication (ITC) 1923 logic. Additionally, some embodiments implement one or more cache(s) 1925 within the shared function logic 1920. A shared function is implemented where the demand for a given specialized function is insufficient for inclusion within the graphics core array 1914. Instead a single instantiation of that specialized function is implemented as a stand-alone entity in the shared function logic 1920 and shared among the execution resources within the graphics core array 1914. The precise set of functions that are shared between the graphics core array 1914 and included within the graphics core array 1914 varies between embodiments.

Figure 20:
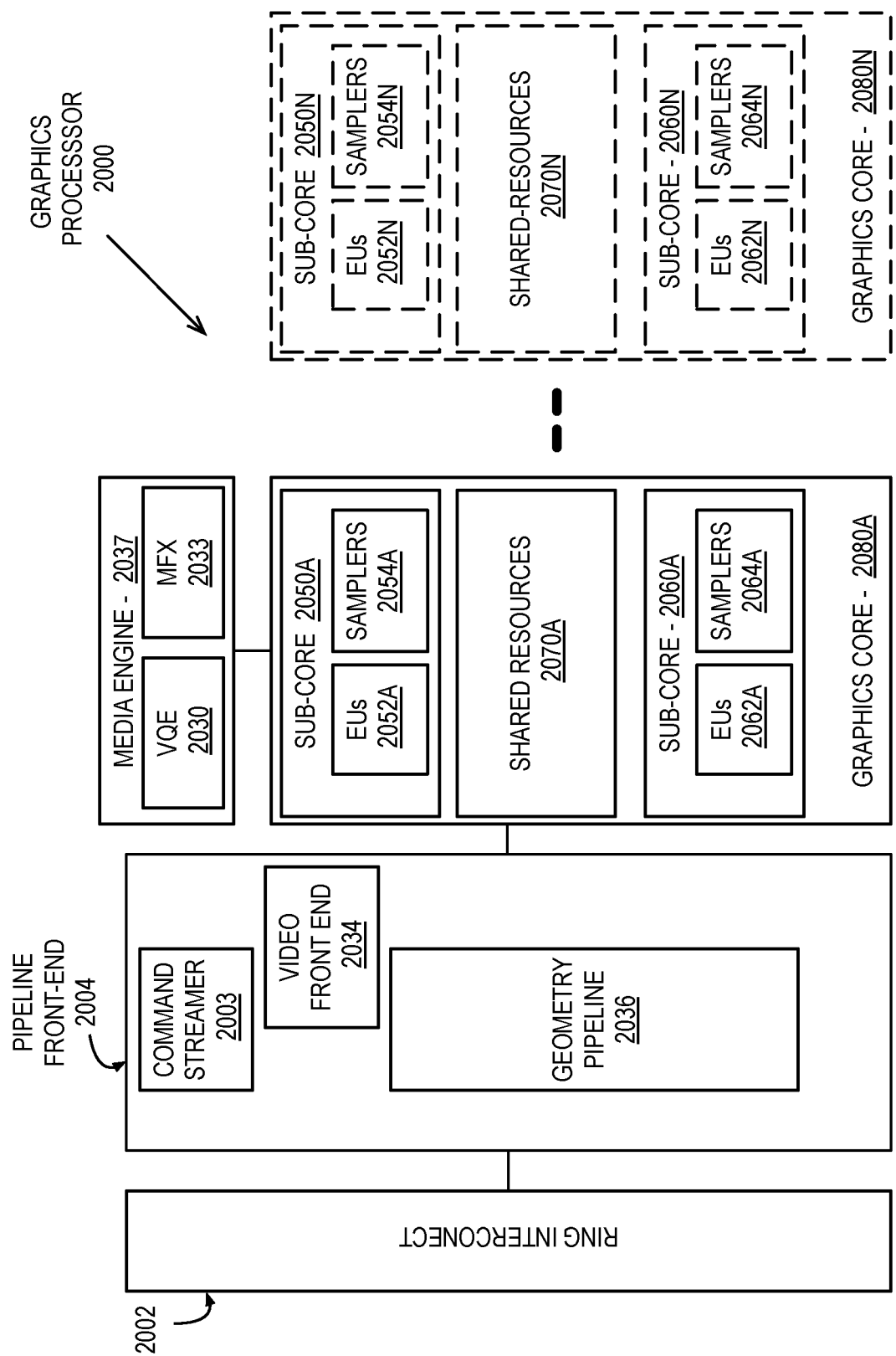
FIG. 20 is a block diagram of a graphics processor provided by an additional embodiment.

FIG. 20 is a block diagram of another embodiment of a graphics processor 2000. Elements of FIG. 20 having the same reference numbers (or names) as the elements of any other figure herein can operate or function in any manner similar to that described elsewhere herein, but are not limited to such.

In some embodiments, graphics processor 2000 includes a ring interconnect 2002, a pipeline front-end 2004, a media engine 2037, and graphics cores 2080A-2080N. In some embodiments, ring interconnect 2002 couples the graphics processor to other processing units, including other graphics processors or one or more general-purpose processor cores. In some embodiments, the graphics processor is one of many processors integrated within a multi-core processing system.

In some embodiments, graphics processor 2000 receives batches of commands via ring interconnect 2002. The incoming commands are interpreted by a command streamer 2003 in the pipeline front-end 2004. In some embodiments, graphics processor 2000 includes scalable execution logic to perform 3D geometry processing and media processing via the graphics core(s) 2080A-2080N. For 3D geometry processing commands, command streamer 2003 supplies commands to geometry pipeline 2036. For at least some media processing commands, command streamer 2003 supplies the commands to a video front-end 2034, which couples with a media engine 2037. In some embodiments, media engine 2037 includes a Video Quality Engine (VQE) 2030 for video and image post-processing and a multi-format encode/decode (MFX) 2033 engine to provide hardware-accelerated media data encode and decode. In some embodiments, geometry pipeline 2036 and media engine 2037 each generate execution threads for the thread execution resources provided by at least one graphics core 2080A.

In some embodiments, graphics processor 2000 includes scalable thread execution resources featuring modular cores 2080A-2080N (sometimes referred to as core slices), each having multiple sub-cores 2050A-550N, 2060A-2060N (sometimes referred to as core sub-slices). In some embodiments, graphics processor 2000 can have any number of graphics cores 2080A through 2080N. In some embodiments, graphics processor 2000 includes a graphics core 2080A having at least a first sub-core 2050A and a second sub-core 2060A. In other embodiments, the graphics processor is a low power processor with a single sub-core (e.g., 2050A). In some embodiments, graphics processor 2000 includes multiple graphics cores 2080A-2080N, each including a set of first sub-cores 2050A-2050N and a set of second sub-cores 2060A-2060N. Each sub-core in the set of first sub-cores 2050A-2050N includes at least a first set of execution units 2052A-2052N and media/texture samplers 2054A-2054N. Each sub-core in the set of second sub-cores 2060A-2060N includes at least a second set of execution units 2062A-2062N and samplers 2064A-2064N. In some embodiments, each sub-core 2050A-2050N, 2060A-2060N shares a set of shared resources 2070A-2070N. In some embodiments, the shared resources include shared cache memory and pixel operation logic. Other shared resources may also be included in the various embodiments of the graphics processor.

Additional Exemplary Execution Units

Figure 21:
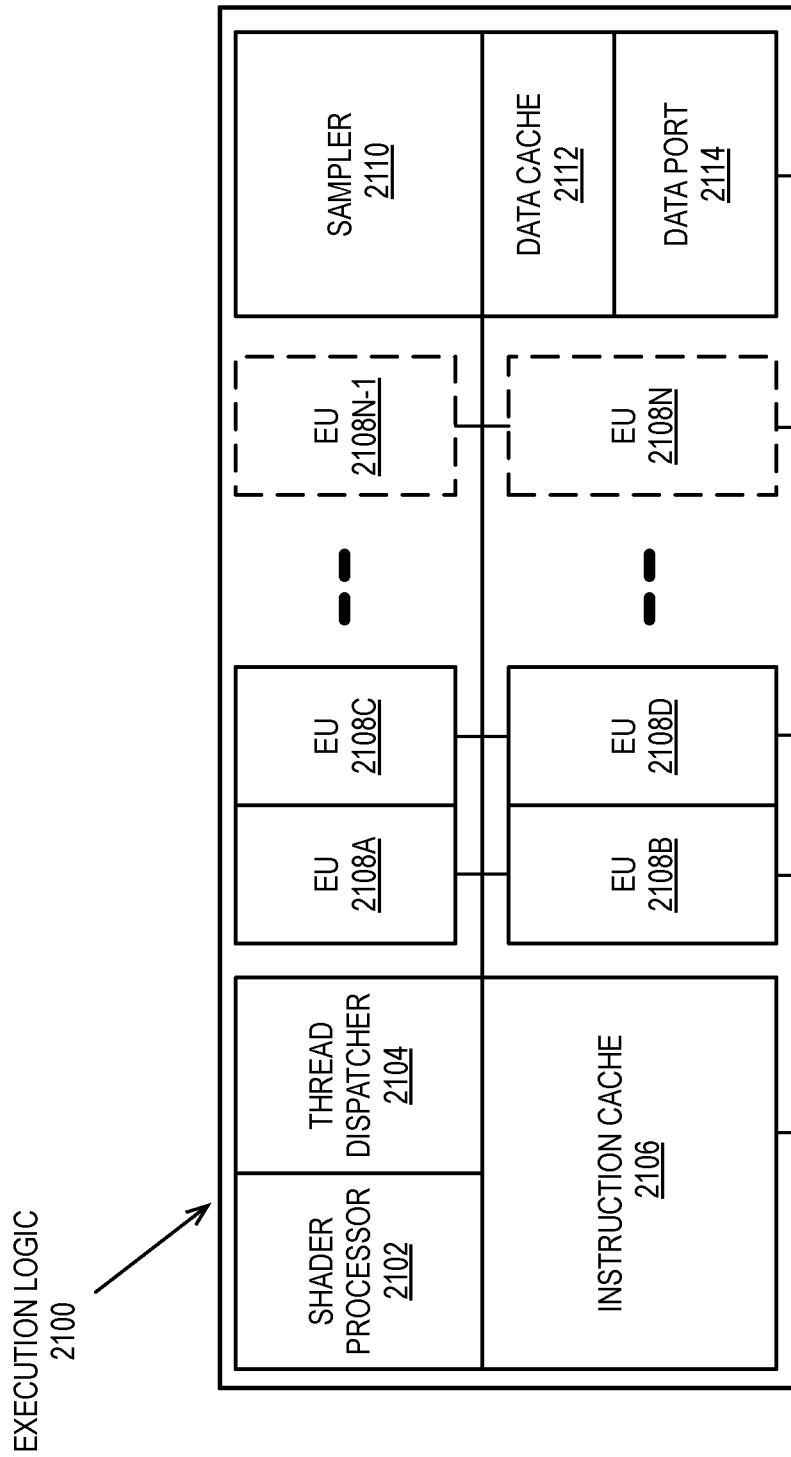
FIG. 21 illustrates thread execution logic including an array of processing elements employed in some embodiments.

FIG. 21 illustrates thread execution logic 2100 including an array of processing elements employed in some embodiments of a GPE. Elements of FIG. 21 having the same reference numbers (or names) as the elements of any other figure herein can operate or function in any manner similar to that described elsewhere herein but are not limited to such.

In some embodiments, thread execution logic 2100 includes a shader processor 2102, a thread dispatcher 2104, instruction cache 2106, a scalable execution unit array including a plurality of execution units 2108A-2108N, a sampler 2110, a data cache 2112, and a data port 2114. In one embodiment the scalable execution unit array can dynamically scale by enabling or disabling one or more execution units (e.g., any of execution unit 2108A, 2108B, 2108C, 2108D, through 2108N-1 and 2108N) based on the computational requirements of a workload. In one embodiment the included components are interconnected via an interconnect fabric that links to each of the components. In some embodiments, thread execution logic 2100 includes one or more connections to memory, such as system memory or cache memory, through one or more of instruction cache 2106, data port 2114, sampler 2110, and execution units 2108A-2108N. In some embodiments, each execution unit (e.g. 2108A) is a stand-alone programmable general purpose computational unit that is capable of executing multiple simultaneous hardware threads while processing multiple data elements in parallel for each thread. In various embodiments, the array of execution units 2108A-2108N is scalable to include any number individual execution units.

In some embodiments, the execution units 2108A-2108N are primarily used to execute shader programs. A shader processor 2102 can process the various shader programs and dispatch execution threads associated with the shader programs via a thread dispatcher 2104. In one embodiment the thread dispatcher includes logic to arbitrate thread initiation requests from the graphics and media pipelines and instantiate the requested threads on one or more execution unit in the execution units 2108A-2108N. For example, the geometry pipeline (e.g., 2036 of FIG. 20) can dispatch vertex, tessellation, or geometry shaders to the thread execution logic 2100 (FIG. 21) for processing. In some embodiments, thread dispatcher 2104 can also process runtime thread spawning requests from the executing shader programs.

In some embodiments, the execution units 2108A-2108N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2108A-2108N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 2108A-2108N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 2108A-2108N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 2108A-2108N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 2106) are included in the thread execution logic 2100 to cache thread instructions for the execution units. In some embodiments, one or more data caches (e.g., 2112) are included to cache thread data during thread execution. In some embodiments, a sampler 2110 is included to provide texture sampling for 3D operations and media sampling for media operations. In some embodiments, sampler 2110 includes specialized texture or media sampling functionality to process texture or media data during the sampling process before providing the sampled data to an execution unit.

During execution, the graphics and media pipelines send thread initiation requests to thread execution logic 2100 via thread spawning and dispatch logic. Once a group of geometric objects has been processed and rasterized into pixel data, pixel processor logic (e.g., pixel shader logic, fragment shader logic, etc.) within the shader processor 2102 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2102 then executes an application programming interface (API)-supplied pixel or fragment shader program. To execute the shader program, the shader processor 2102 dispatches threads to an execution unit (e.g., 2108A) via thread dispatcher 2104. In some embodiments, pixel shader 2102 uses texture sampling logic in the sampler 2110 to access texture data in texture maps stored in memory. Arithmetic operations on the texture data and the input geometry data compute pixel color data for each geometric fragment, or discards one or more pixels from further processing.

In some embodiments, the data port 2114 provides a memory access mechanism for the thread execution logic 2100 output processed data to memory for processing on a graphics processor output pipeline. In some embodiments, the data port 2114 includes or couples to one or more cache memories (e.g., data cache 2112) to cache data for memory access via the data port.

FIG. 22 is a block diagram illustrating a graphics processor instruction formats 2200 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2200 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2210. A 64-bit compacted instruction format 2230 is available for some instructions based on the selected instruction, instruction options, and number of operands. The native 128-bit instruction format 710 provides access to all instruction options, while some options and operations are restricted in the 64-bit format 2230. The native instructions available in the 64-bit format 2230 vary by embodiment. In some embodiments, the instruction is compacted in part using a set of index values in an index field 2213. The execution unit hardware references a set of compaction tables based on the index values and uses the compaction table outputs to reconstruct a native instruction in the 128-bit instruction format 2210.

For each format, instruction opcode 2212 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2214 enables control over certain execution options, such as channels selection (e.g., predication) and data channel order (e.g., swizzle). For instructions in the 128-bit instruction format 2210 an exec-size field 2216 limits the number of data channels that will be executed in parallel. In some embodiments, exec-size field 2216 is not available for use in the 64-bit compact instruction format 2230.

Some execution unit instructions have up to three operands including two source operands, src0 2220, src1 2222, and one destination 2218. In some embodiments, the execution units support dual destination instructions, where one of the destinations is implied. Data manipulation instructions can have a third source operand (e.g., SRC2 2224), where the instruction opcode 2212 determines the number of source operands. An instruction's last source operand can be an immediate (e.g., hard-coded) value passed with the instruction.

In some embodiments, the 128-bit instruction format 2210 includes an access/address mode field 2226 specifying, for example, whether direct register addressing mode or indirect register addressing mode is used. When direct register addressing mode is used, the register address of one or more operands is directly provided by bits in the instruction.

In some embodiments, the 128-bit instruction format 2210 includes an access/address mode field 2226, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2226 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiment's instructions are grouped based on opcode 2212 bit-fields to simplify Opcode decode 2240. For an 8-bit opcode, bits 4, 5, and 6 allow the execution unit to determine the type of opcode. The precise opcode grouping shown is merely an example. In some embodiments, a move and logic opcode group 2242 includes data movement and logic instructions (e.g., move (mov), compare (cmp)). In some embodiments, move and logic group 2242 shares the five most significant bits (MSB), where move (mov) instructions are in the form of 0000xxxxb and logic instructions are in the form of 0001xxxxb. A flow control instruction group 2244 (e.g., call, jump (jmp)) includes instructions in the form of 0010xxxxb (e.g., 0x20). A miscellaneous instruction group 2246 includes a mix of instructions, including synchronization instructions (e.g., wait, send) in the form of 0011xxxxb (e.g., 0x30). A parallel math instruction group 2248 includes component-wise arithmetic instructions (e.g., add, multiply (mul)) in the form of 0100xxxxb (e.g., 0x40). The parallel math group 2248 performs the arithmetic operations in parallel across data channels. The vector math group 2250 includes arithmetic instructions (e.g., dp4) in the form of 0101xxxxb (e.g., 0x50). The vector math group performs arithmetic such as dot product calculations on vector operands.

Exemplary Additional Graphics Pipeline

Figure 23:
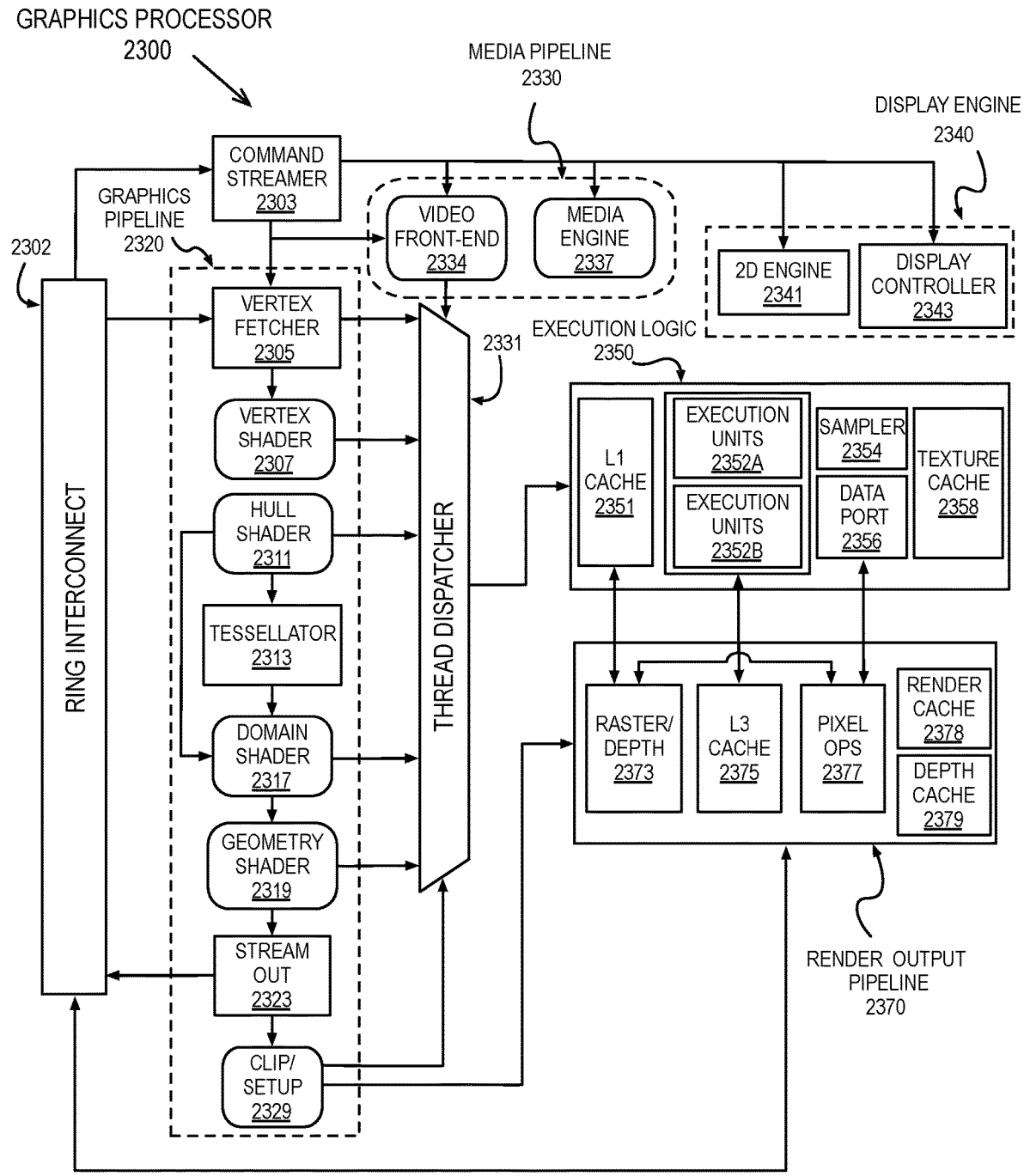
FIG. 23 is a block diagram of a graphics processor according to another embodiment.

FIG. 23 is a block diagram of another embodiment of a graphics processor 2300. Elements of FIG. 23 having the same reference numbers (or names) as the elements of any other figure herein can operate or function in any manner similar to that described elsewhere herein, but are not limited to such.

In some embodiments, graphics processor 2300 includes a graphics pipeline 2320, a media pipeline 2330, a display engine 2340, thread execution logic 2350, and a render output pipeline 2370. In some embodiments, graphics processor 2300 is a graphics processor within a multi-core processing system that includes one or more general purpose processing cores. The graphics processor is controlled by register writes to one or more control registers (not shown) or via commands issued to graphics processor 2300 via a ring interconnect 2302. In some embodiments, ring interconnect 2302 couples graphics processor 2300 to other processing components, such as other graphics processors or general-purpose processors. Commands from ring interconnect 2302 are interpreted by a command streamer 2303, which supplies instructions to individual components of graphics pipeline 2320 or media pipeline 2330.

In some embodiments, command streamer 2303 directs the operation of a vertex fetcher 2305 that reads vertex data from memory and executes vertex-processing commands provided by command streamer 2303. In some embodiments, vertex fetcher 2305 provides vertex data to a vertex shader 2307, which performs coordinate space transformation and lighting operations to each vertex. In some embodiments, vertex fetcher 2305 and vertex shader 2307 execute vertex-processing instructions by dispatching execution threads to execution units 2352A-2352B via a thread dispatcher 2331.

In some embodiments, execution units 2352A-2352B are an array of vector processors having an instruction set for performing graphics and media operations. In some embodiments, execution units 2352A-2352B have an attached L1 cache 2351 that is specific for each array or shared between the arrays. The cache can be configured as a data cache, an instruction cache, or a single cache that is partitioned to contain data and instructions in different partitions.

In some embodiments, graphics pipeline 2320 includes tessellation components to perform hardware-accelerated tessellation of 3D objects. In some embodiments, a programmable hull shader 2311 configures the tessellation operations. A programmable domain shader 2317 provides back-end evaluation of tessellation output. A tessellator 2313 operates at the direction of hull shader 2311 and contains special purpose logic to generate a set of detailed geometric objects based on a coarse geometric model that is provided as input to graphics pipeline 2320. In some embodiments, if tessellation is not used, tessellation components (e.g., hull shader 2311, tessellator 2313, and domain shader 2317) can be bypassed.

In some embodiments, complete geometric objects can be processed by a geometry shader 2319 via one or more threads dispatched to execution units 2352A-2352B, or can proceed directly to the clipper 2329. In some embodiments, the geometry shader operates on entire geometric objects, rather than vertices or patches of vertices as in previous stages of the graphics pipeline. If the tessellation is disabled the geometry shader 2319 receives input from the vertex shader 2307. In some embodiments, geometry shader 2319 is programmable by a geometry shader program to perform geometry tessellation if the tessellation units are disabled. Before rasterization, a clipper 2329 processes vertex data. The clipper 2329 may be a fixed function clipper or a programmable clipper having clipping and geometry shader functions. In some embodiments, a rasterizer and depth test component 2373 in the render output pipeline 2370 dispatches pixel shaders to convert the geometric objects into their per pixel representations. In some embodiments, pixel shader logic is included in thread execution logic 2350. In some embodiments, an application can bypass the rasterizer and depth test component 2373 and access un-rasterized vertex data via a stream out unit 2323.

The graphics processor 2300 has an interconnect bus, interconnect fabric, or some other interconnect mechanism that allows data and message passing amongst the major components of the processor. In some embodiments, execution units 2352A-2352B and associated cache(s) 2351, texture and media sampler 2354, and texture/sampler cache 2358 interconnect via a data port 2356 to perform memory access and communicate with render output pipeline components of the processor. In some embodiments, sampler 2354, caches 2351, 2358 and execution units 2352A-2352B each have separate memory access paths.

In some embodiments, render output pipeline 2370 contains a rasterizer and depth test component 2373 that converts vertex-based objects into an associated pixel-based representation. In some embodiments, the rasterizer logic includes a windower/masker unit to perform fixed function triangle and line rasterization. An associated render cache 2378 and depth cache 2379 are also available in some embodiments. A pixel operations component 2377 performs pixel-based operations on the data, though in some instances, pixel operations associated with 2D operations (e.g. bit block image transfers with blending) are performed by the 2D engine 2341 or substituted at display time by the display controller 2343 using overlay display planes. In some embodiments, a shared L3 cache 2375 is available to all graphics components, allowing the sharing of data without the use of main system memory.

In some embodiments, graphics processor media pipeline 2330 includes a media engine 2337 and a video front-end 2334. In some embodiments, video front-end 2334 receives pipeline commands from the command streamer 2303. In some embodiments, media pipeline 2330 includes a separate command streamer. In some embodiments, video front-end 2334 processes media commands before sending the command to the media engine 2337. In some embodiments, media engine 2337 includes thread spawning functionality to spawn threads for dispatch to thread execution logic 2350 via thread dispatcher 2331.

In some embodiments, graphics processor 2300 includes a display engine 2340. In some embodiments, display engine 2340 is external to processor 2300 and couples with the graphics processor via the ring interconnect 2302, or some other interconnect bus or fabric. In some embodiments, display engine 2340 includes a 2D engine 2341 and a display controller 2343. In some embodiments, display engine 2340 contains special purpose logic capable of operating independently of the 3D pipeline. In some embodiments, display controller 2343 couples with a display device (not shown), which may be a system integrated display device, as in a laptop computer, or an external display device attached via a display device connector.

In some embodiments, graphics pipeline 2320 and media pipeline 2330 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Exemplary Graphics Pipeline Programming

FIG. 24A is a block diagram illustrating a graphics processor command format 2400 according to some embodiments. FIG. 24B is a block diagram illustrating a graphics processor command sequence 2410 according to an embodiment. The solid lined boxes in FIG. 24A illustrate the components that are generally included in a graphics command while the dashed lines include components that are optional or that are only included in a sub-set of the graphics commands. The exemplary graphics processor command format 2400 of FIG. 24A includes data fields to identify a target client 2402 of the command, a command operation code (opcode) 2404, and the relevant data 2406 for the command. A sub-opcode 2405 and a command size 2408 are also included in some commands.

In some embodiments, client 2402 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2404 and, if present, sub-opcode 2405 to determine the operation to perform. The client unit performs the command using information in data field 2406. For some commands an explicit command size 2408 is expected to specify the size of the command. In some embodiments, the command parser automatically determines the size of at least some of the commands based on the command opcode. In some embodiments, commands are aligned via multiples of a double word.

The flow diagram in FIG. 24B shows an exemplary graphics processor command sequence 2410. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2410 may begin with a pipeline flush command 2412 to cause any active graphics pipeline to complete the currently pending commands for the pipeline. In some embodiments, the 3D pipeline 2422 and the media pipeline 2424 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2412 can be used for pipeline synchronization or before placing the graphics processor into a low power state.

In some embodiments, a pipeline select command 2413 is used when a command sequence requires the graphics processor to explicitly switch between pipelines. In some embodiments, a pipeline select command 2413 is required only once within an execution context before issuing pipeline commands unless the context is to issue commands for both pipelines. In some embodiments, a pipeline flush command 2412 is required immediately before a pipeline switch via the pipeline select command 2413.

In some embodiments, a pipeline control command 2414 configures a graphics pipeline for operation and is used to program the 3D pipeline 2422 and the media pipeline 2424. In some embodiments, pipeline control command 2414 configures the pipeline state for the active pipeline. In one embodiment, the pipeline control command 2414 is used for pipeline synchronization and to clear data from one or more cache memories within the active pipeline before processing a batch of commands.

In some embodiments, return buffer state commands 2416 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2416 includes selecting the size and number of return buffers to use for a set of pipeline operations.

The remaining commands in the command sequence differ based on the active pipeline for operations. Based on a pipeline determination 2420, the command sequence is tailored to the 3D pipeline 2422 beginning with the 3D pipeline state 2430 or the media pipeline 2424 beginning at the media pipeline state 2440.

The commands to configure the 3D pipeline state 2430 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2430 commands are also able to selectively disable or bypass certain pipeline elements if those elements will not be used.

In some embodiments, 3D primitive 2432 command is used to submit 3D primitives to be processed by the 3D pipeline. Commands and associated parameters that are passed to the graphics processor via the 3D primitive 2432 command are forwarded to the vertex fetch function in the graphics pipeline. The vertex fetch function uses the 3D primitive 2432 command data to generate vertex data structures. The vertex data structures are stored in one or more return buffers. In some embodiments, 3D primitive 2432 command is used to perform vertex operations on 3D primitives via vertex shaders. To process vertex shaders, 3D pipeline 2422 dispatches shader execution threads to graphics processor execution units.

In some embodiments, 3D pipeline 2422 is triggered via an execute 2434 command or event. In some embodiments, command execution is triggered via a register write. In some embodiment's execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2410 follows the media pipeline 2424 path when performing media operations. In general, the specific use and manner of programming for the media pipeline 2424 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2424 is configured in a similar manner as the 3D pipeline 2422. A set of commands to configure the media pipeline state 2440 are dispatched or placed into a command queue before the media object commands 2442. In some embodiments, commands for the media pipeline state 2440 include data to configure the media pipeline elements that will be used to process the media objects. This includes data to configure the video decode and video encode logic within the media pipeline, such as encode or decode format. In some embodiments, commands for the media pipeline state 2440 also support the use of one or more pointers to "indirect" state elements that contain a batch of state settings.

In some embodiments, media object commands 2442 supply pointers to media objects for processing by the media pipeline. The media objects include memory buffers containing video data to be processed. In some embodiments, all media pipeline states must be valid before issuing a media object command 2442. Once the pipeline state is configured and media object commands 2442 are queued, the media pipeline 2424 is triggered via an execute command 2444 or an equivalent execute event (e.g., register write). Output from media pipeline 2424 may then be post processed by operations provided by the 3D pipeline 2422 or the media pipeline 2424. In some embodiments, GPGPU operations are configured and executed in a similar manner as media operations.

Additional Exemplary Graphics Software Architecture

Figure 25:
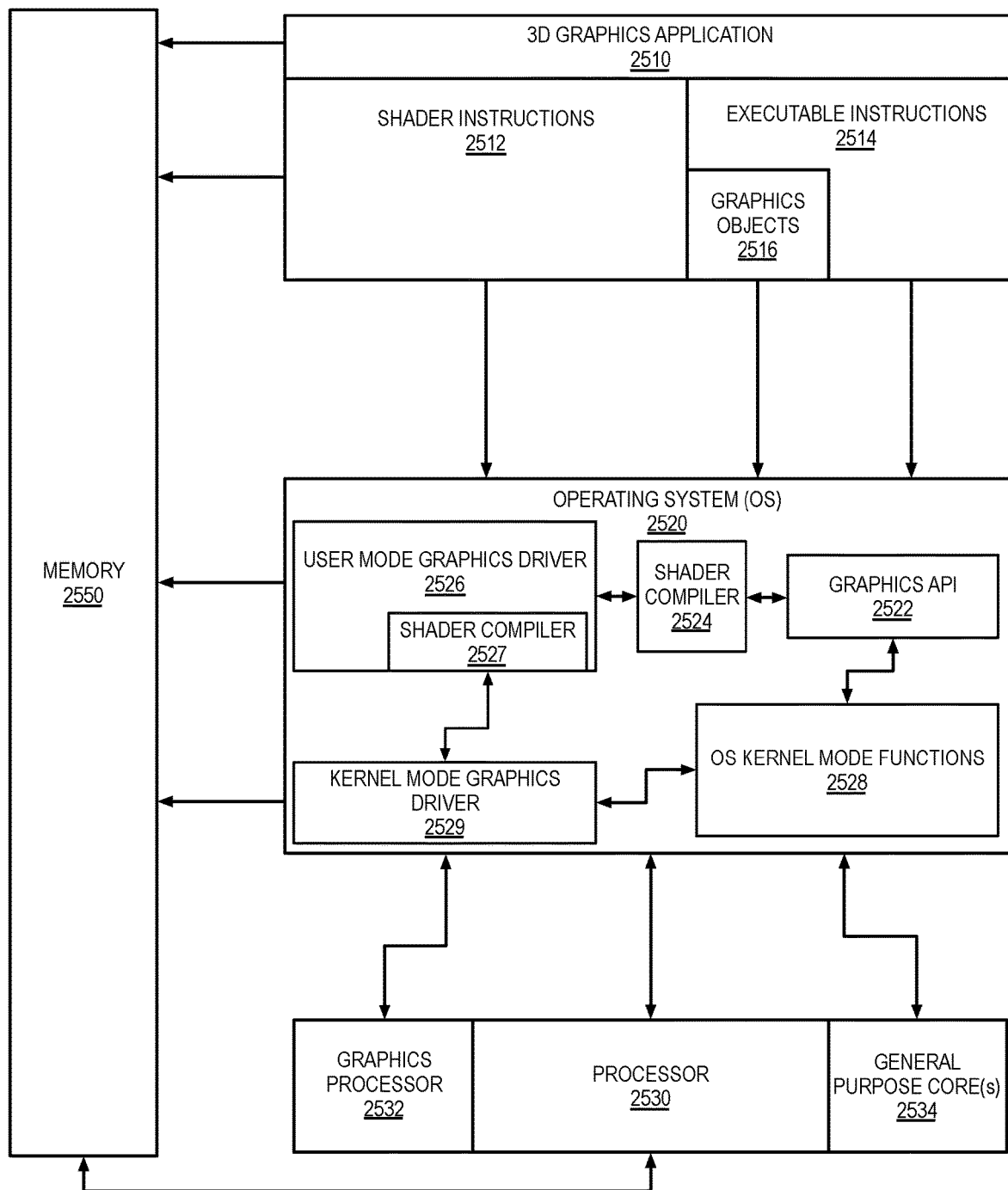
FIG. 25 illustrates exemplary graphics software architecture for a data processing system according to some embodiments.

FIG. 25 illustrates exemplary graphics software architecture for a data processing system 2500 according to some embodiments. In some embodiments, software architecture includes a 3D graphics application 2510, an operating system 2520, and at least one processor 2530. In some embodiments, processor 2530 includes a graphics processor 2532 and one or more general-purpose processor core(s) 2534. The graphics application 2510 and operating system 2520 each execute in the system memory 2550 of the data processing system.

In some embodiments, 3D graphics application 2510 contains one or more shader programs including shader instructions 2512. The shader language instructions may be in a high-level shader language, such as the High Level Shader Language (HLSL) or the OpenGL Shader Language (GLSL). The application also includes executable instructions 2514 in a machine language suitable for execution by the general-purpose processor core 2534. The application also includes graphics objects 2516 defined by vertex data.

In some embodiments, operating system 2520 is a Microsoft® Windows® operating system from the Microsoft Corporation, a proprietary UNIX-like operating system, or an open source UNIX-like operating system using a variant of the Linux kernel. The operating system 2520 can support a graphics API 2522 such as the Direct3D API, the OpenGL API, or the Vulkan API. When the Direct3D API is in use, the operating system 2520 uses a front-end shader compiler 2524 to compile any shader instructions 2512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2510. In some embodiments, the shader instructions 2512 are provided in an intermediate form, such as a version of the Standard Portable Intermediate Representation (SPIR) used by the Vulkan API.

In some embodiments, user mode graphics driver 2526 contains a back-end shader compiler 2527 to convert the shader instructions 2512 into a hardware specific representation. When the OpenGL API is in use, shader instructions 2512 in the GLSL high-level language are passed to a user mode graphics driver 2526 for compilation. In some embodiments, user mode graphics driver 2526 uses operating system kernel mode functions 2528 to communicate with a kernel mode graphics driver 2529. In some embodiments, kernel mode graphics driver 2529 communicates with graphics processor 2532 to dispatch commands and instructions.

Exemplary IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 26:
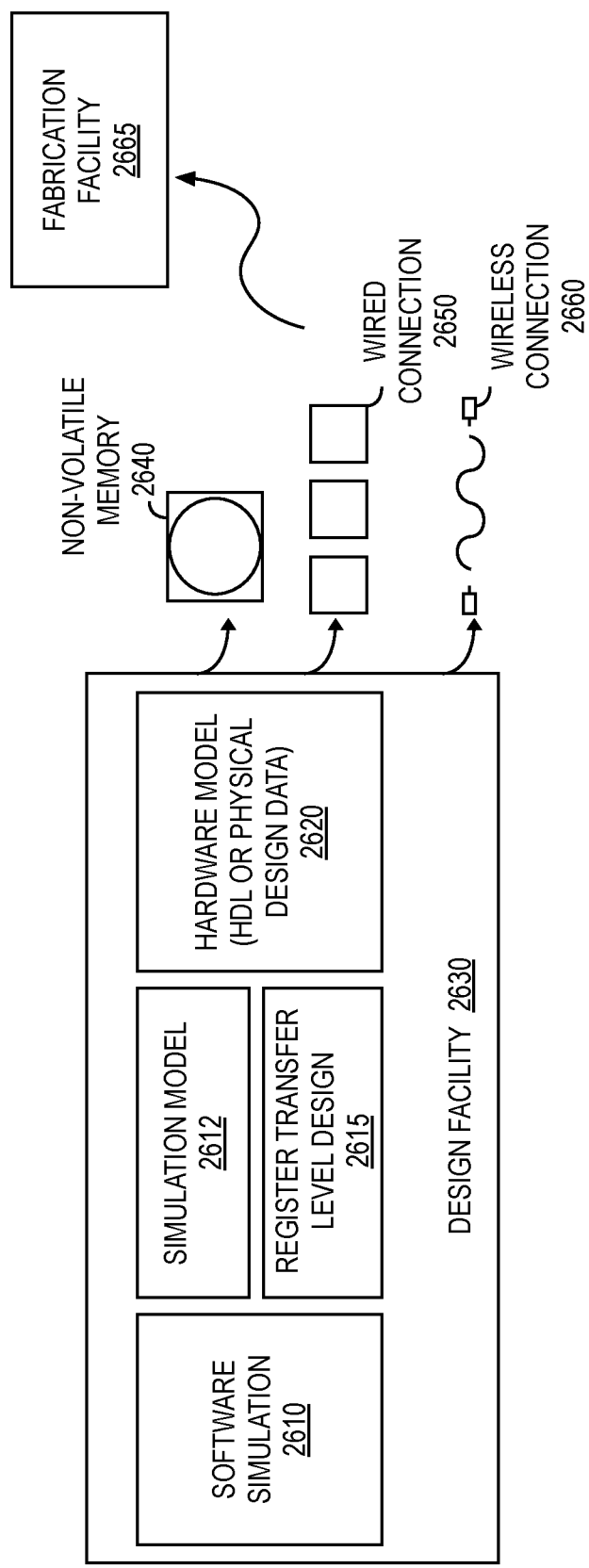
FIG. 26 is a block diagram illustrating an IP core development system, according to an embodiment.

FIG. 26 is a block diagram illustrating an IP core development system 2600 that may be used to manufacture an integrated circuit to perform operations according to an embodiment. The IP core development system 2600 may be used to generate modular, re-usable designs that can be incorporated into a larger design or used to construct an entire integrated circuit (e.g., an SOC integrated circuit). A design facility 2630 can generate a software simulation 2610 of an IP core design in a high level programming language (e.g., C/C++). The software simulation 2610 can be used to design, test, and verify the behavior of the IP core using a simulation model 2612. The simulation model 2612 may include functional, behavioral, and/or timing simulations. A register transfer level (RTL) design 2615 can then be created or synthesized from the simulation model 2612. The RTL design 2615 is an abstraction of the behavior of the integrated circuit that models the flow of digital signals between hardware registers, including the associated logic performed using the modeled digital signals. In addition to an RTL design 2615, lower-level designs at the logic level or transistor level may also be created, designed, or synthesized. Thus, the particular details of the initial design and simulation may vary.

The RTL design 2615 or equivalent may be further synthesized by the design facility into a hardware model 2620, which may be in a hardware description language (HDL), or some other representation of physical design data. The HDL may be further simulated or tested to verify the IP core design. The IP core design can be stored for delivery to a $3^{rd}$ party fabrication facility 2665 using non-volatile memory 2640 (e.g., hard disk, flash memory, or any non-volatile storage medium). Alternatively, the IP core design may be transmitted (e.g., via the Internet) over a wired connection 2650 or wireless connection 2660. The fabrication facility 2665 may then fabricate an integrated circuit that is based at least in part on the IP core design. The fabricated integrated circuit can be configured to perform operations in accordance with at least one embodiment described herein.

Exemplary System on a Chip Integrated Circuit

Figure 27:
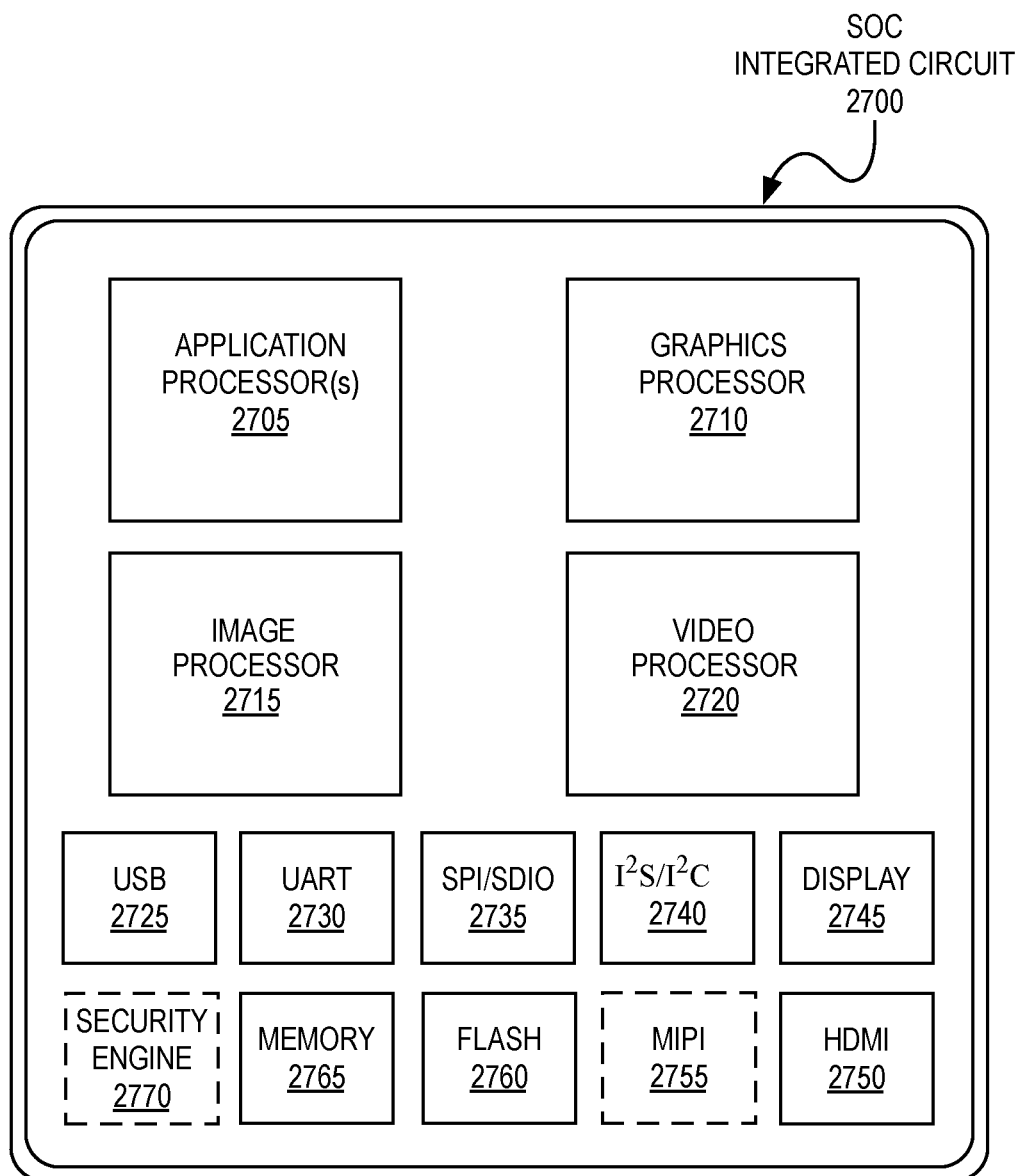
FIG. 27 is a block diagram illustrating an exemplary system on a chip integrated circuit, according to an embodiment.
Figure 28:
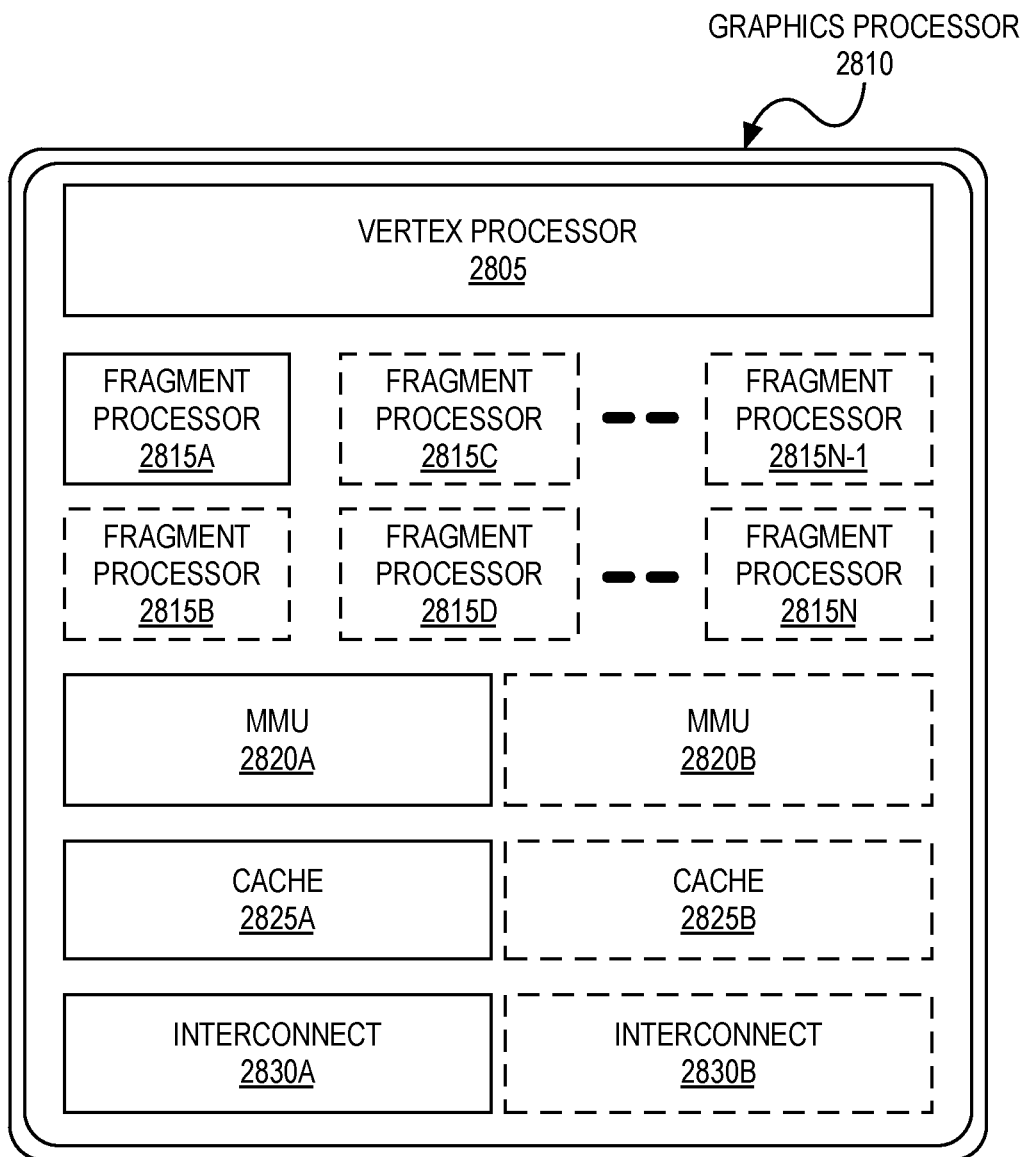
FIG. 28 is a block diagram illustrating an additional graphics processor, according to an embodiment.
Figure 29:
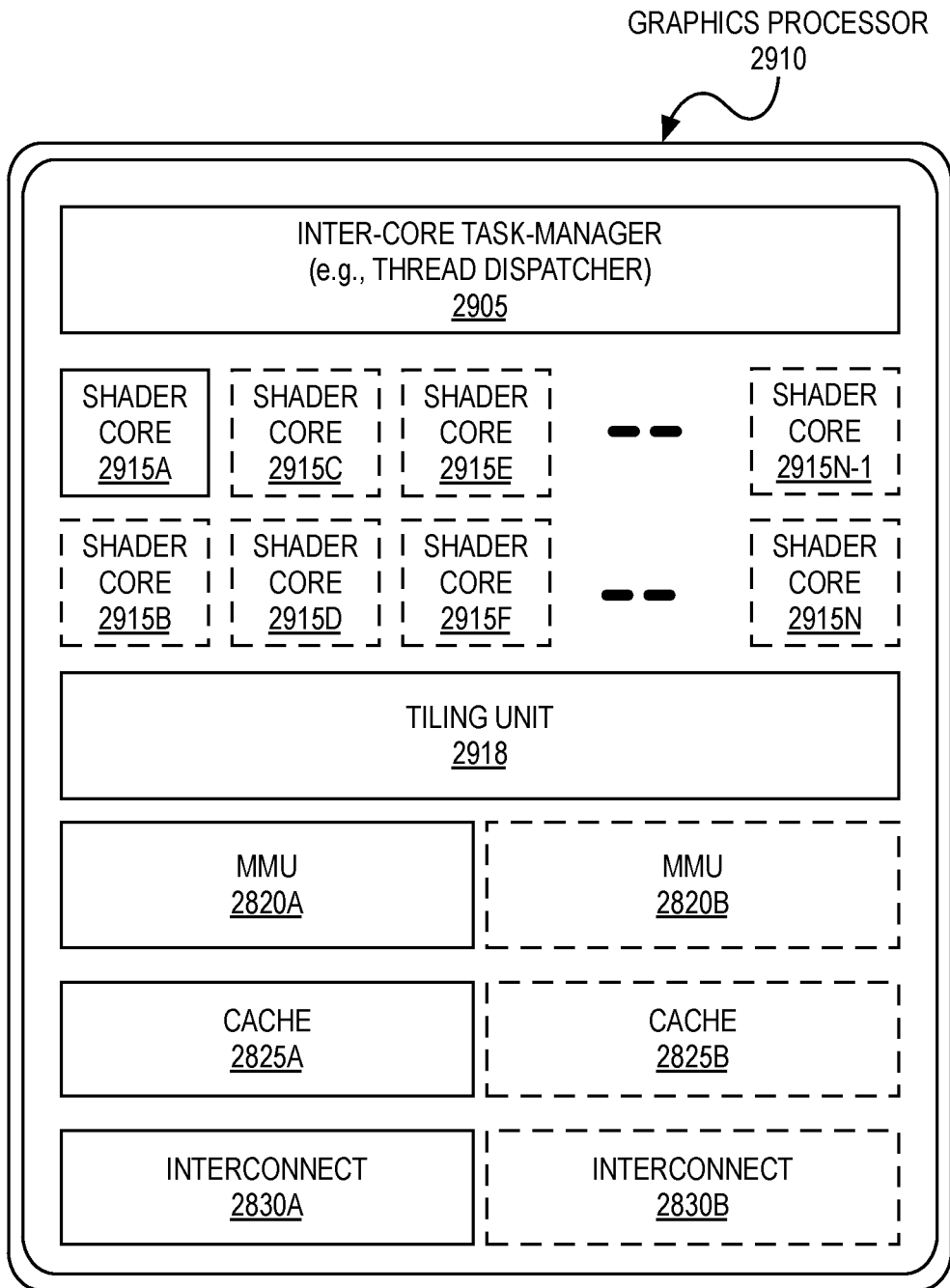
FIG. 29 is a block diagram illustrating an additional exemplary graphics processor of a system on a chip integrated circuit, according to an embodiment.

FIG. 27-29 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 27 is a block diagram illustrating an exemplary system on a chip integrated circuit 2700 that may be fabricated using one or more IP cores, according to an embodiment. Exemplary integrated circuit 2700 includes one or more application processor(s) 2705 (e.g., CPUs), at least one graphics processor 2710, and may additionally include an image processor 2715 and/or a video processor 2720, any of which may be a modular IP core from the same or multiple different design facilities. Integrated circuit 2700 includes peripheral or bus logic including a USB controller 2725, UART controller 2730, an SPI/SDIO controller 2735, and an $I^2S/I^2C$ controller 2740. Additionally, the integrated circuit can include a display device 2745 coupled to one or more of a high-definition multimedia interface (HDMI) controller 2750 and a mobile industry processor interface (MIPI) display interface 2755. Storage may be provided by a flash memory subsystem 2760 including flash memory and a flash memory controller. Memory interface may be provided via a memory controller 2765 for access to SDRAM or SRAM memory devices. Some integrated circuits additionally include an embedded security engine 2770.

FIG. 28 is a block diagram illustrating an exemplary graphics processor 2810 of a system on a chip integrated circuit that may be fabricated using one or more IP cores, according to an embodiment. Graphics processor 2810 can be a variant of the graphics processor 2710 of FIG. 27. Graphics processor 2810 includes a vertex processor 2805 and one or more fragment processor(s) 2815A-2815N (e.g., 2815A, 2815B, 2815C, 2815D, through 2815N-1, and 2815N). Graphics processor 2810 can execute different shader programs via separate logic, such that the vertex processor 2805 is optimized to execute operations for vertex shader programs, while the one or more fragment processor(s) 2815A-2815N execute fragment (e.g., pixel) shading operations for fragment or pixel shader programs. The vertex processor 2805 performs the vertex processing stage of the 3D graphics pipeline and generates primitives and vertex data. The fragment processor(s) 2815A-2815N use the primitive and vertex data generated by the vertex processor 2805 to produce a framebuffer that is displayed on a display device. In one embodiment, the fragment processor(s) 2815A-2815N are optimized to execute fragment shader programs as provided for in the OpenGL API, which may be used to perform similar operations as a pixel shader program as provided for in the Direct 3D API.

Graphics processor 2810 additionally includes one or more memory management units (MMUs) 2820A-2820B, cache(s) 2825A-2825B, and circuit interconnect(s) 2830A-2830B. The one or more MMU(s) 2820A-2820B provide for virtual to physical address mapping for graphics processor 2810, including for the vertex processor 2805 and/or fragment processor(s) 2815A-2815N, which may reference vertex or image/texture data stored in memory, in addition to vertex or image/texture data stored in the one or more cache(s) 2825A-2825B. In one embodiment the one or more MMU(s) 2820A-2820B may be synchronized with other MMUs within the system, including one or more MMUs associated with the one or more application processor(s) 2705, image processor 2715, and/or video processor 2720 of FIG. 27, such that each processor 2705-2720 can participate in a shared or unified virtual memory system. The one or more circuit interconnect(s) 2830A-2830B enable graphics processor 2810 to interface with other IP cores within the SoC, either via an internal bus of the SoC or via a direct connection, according to embodiments.

FIG. 29 is a block diagram illustrating an additional exemplary graphics processor 2910 of a system on a chip integrated circuit that may be fabricated using one or more IP cores, according to an embodiment. Graphics processor 2910 can be a variant of the graphics processor 2710 of FIG. 27. Graphics processor 2910 includes the one or more MMU(s) 2820A-2820B, caches 2825A-2825B, and circuit interconnects 2830A-2830B of the integrated circuit 2800 of FIG. 28.

Graphics processor 2910 includes one or more shader core(s) 2915A-2915N (e.g., 2915A, 2915B, 2915C, 2915D, 2915E, 2915F, through 2915N-1, and 2915N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2910 includes an inter-core task manager 2905, which acts as a thread dispatcher to dispatch execution threads to one or more shader cores 2915A-2915N and a tiling unit 2918 to accelerate tiling operations for tile-based rendering, in which rendering operations for a scene are subdivided in image space, for example to exploit local spatial coherence within a scene or to optimize use of internal caches.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a general-purpose graphics processing unit comprising multiple processing units and a pipeline manager to distribute a thread group to the multiple processing units, wherein the pipeline manager is to distribute the thread group as multiple thread sub-groups.

One embodiment provides for a method of managing thread execution on a general-purpose graphics processing unit (GPGPU), the method comprising launching multiple thread sub-groups of a thread group on a processing unit of the GPGPU; monitoring execution of the multiple thread sub-groups until a thread sub-group is complete; retiring a completed thread sub-group; and launching one or more pending thread sub-groups on the processing unit after retiring a completed thread sub-group.

One embodiment provides for a data processing system comprising a non-transitory machine-readable medium to store instructions for execution by one or more processors of the data processing system; and a general-purpose graphics processing unit (GPGPU) comprising multiple processing units and a pipeline manager to distribute a thread group to the multiple processing units, wherein the pipeline manager is to distribute the thread group as multiple thread sub-groups.

One embodiment provides for a general-purpose graphics processing unit comprising multiple processing elements having a single instruction, multiple thread architecture, the multiple processing elements enabled to perform hardware multithreading, wherein execution context for threads to be executed is maintained on-chip during execution, a scheduler to schedule a warp to the multiple processing elements, wherein the warp is a group of parallel threads, the warp includes multiple sub-warps, and threads within the warp diverge at sub-warp granularity, and a logic unit including hardware or firmware logic, the logic unit to group active threads from the warp for execution on the multiple processing elements.

In a further embodiment, the multiple processing elements are to maintain per-thread execution state, enable switching between execution contexts, and are to yield execution at per-thread granularity. Additionally, the scheduler can schedule threads of the warp at sub-warp granularity. The multiple processing elements can complete a first sub-warp of threads and execute a second sub-warp of threads after the first sub-warp of threads completes. In one embodiment, the multiple processing elements and the scheduler are included within a streaming multiprocessor. The streaming multiprocessor can additionally include a dispatch unit to dispatch threads to the multiple processing elements and a register file to store independent thread state.

One embodiment provides for a method of managing thread execution on a general-purpose graphics processing unit, the method comprising scheduling a warp to multiple processing elements of the general-purpose graphics processing unit, wherein the warp is a group of parallel threads, the warp includes multiple sub-warps, and threads within the warp diverge at sub-warp granularity and grouping active threads from the warp for execution on the multiple processing elements, the multiple processing elements having a single instruction, multiple thread architecture, the multiple processing elements enabled to perform hardware multithreading, wherein execution context for threads executed by the multiple processing elements is maintained on-chip during execution.

One embodiment provides for a data processing system comprising a memory to store instructions for execution and a general-purpose graphics processing unit. The general-purpose processing unit includes multiple processing elements having a single instruction, multiple thread architecture, the multiple processing elements enabled to perform hardware multithreading, wherein execution context for threads to be executed is maintained on-chip during execution. The general-purpose processing unit additionally includes a scheduler to schedule a warp to the multiple processing elements, where the warp is a group of parallel threads, the warp includes multiple sub-warps and threads within the warp diverge at sub-warp granularity. The general-purpose processing unit additionally includes a logic unit including hardware or firmware logic, the logic unit to group active threads from the warp for execution on the multiple processing elements.

The embodiments described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. A graphics processor device comprising:
a host interconnect;
multiple processing elements having a single instruction, multiple thread (SIMT) architecture including hardware multithreading, the multiple processing elements to execute multiple warps of threads, wherein a warp includes a group of parallel threads and during execution of the multiple warps of threads, the multiple processing elements are to yield execution at per-thread granularity and execution context is maintained on-chip during execution; and
a scheduler to schedule a set of sub-warps to the multiple processing elements, wherein a sub-warp includes a sub-group of parallel threads, a warp includes multiple sub-warps, and threads within the warp can diverge at sub-warp granularity.

2. The graphics processor device as in claim 1, wherein the scheduler is to schedule a first sub-warp from a first warp of threads to execute concurrently with a second sub-warp from a second warp of threads.

3. The graphics processor device as in claim 2, additionally comprising a logic unit including hardware or firmware logic, the logic unit to group active threads for execution on the multiple processing elements.

4. The graphics processor device as in claim 3, wherein the multiple processing elements are to complete the first sub-warp and execute a third sub-warp of threads after the first sub-warp completes.

5. The graphics processor device as in claim 2, wherein the first warp of threads includes 32 threads, the second warp of threads includes 32 threads, and each sub-warp includes fewer than 32 threads.

6. The graphics processor device as in claim 1, additionally including a streaming multiprocessor, the streaming multiprocessor including the multiple processing elements and the scheduler.

7. The graphics processor device as in claim 6, the streaming multiprocessor additionally including a dispatch unit, wherein the dispatch unit is to dispatch threads to the multiple processing elements.

8. The graphics processor device as in claim 7, the streaming multiprocessor additionally including a register file to store independent thread state.

9. A general-purpose graphics processing unit comprising:
multiple processing elements having a single instruction, multiple thread (SIMT) architecture including hardware multithreading, the multiple processing elements to execute multiple warps of threads, wherein a warp includes a group of parallel threads and execution context is maintained on-chip during execution; and
a scheduler to schedule a set of sub-warps to the multiple processing elements at sub-warp granularity, wherein a sub-warp includes a sub-group of parallel threads, and a warp includes multiple sub-warps.

10. The general-purpose graphics processing unit as in claim 9, wherein the scheduler is to schedule a first sub-warp from a first warp of threads to execute concurrently with a second sub-warp from a second warp of threads.

11. The general-purpose graphics processing unit as in claim 10, wherein the multiple processing elements are to maintain per-thread execution state and threads within the first warp of threads and the second warp of threads can diverge at sub-warp granularity.

12. The general-purpose graphics processing unit as in claim 11, additionally comprising a logic unit including hardware or firmware logic, the logic unit to group active threads for execution on the multiple processing elements, wherein the multiple processing elements are to switch between execution contexts during execution of the multiple warps of threads.

13. The general-purpose graphics processing unit as in claim 12, wherein the multiple processing elements are to yield execution at per-thread granularity during execution of the multiple warps of threads.

14. The general-purpose graphics processing unit as in claim 13, wherein multiple processing elements are to complete the first sub-warp and execute a third sub-warp of threads after the first sub-warp completes.

15. The general-purpose graphics processing unit as in claim 10, wherein the first warp of threads includes 32 threads, the second warp of threads includes 32 threads, and each sub-warp includes fewer than 32 threads.

16. The general-purpose graphics processing unit as in claim 9, additionally including a streaming multiprocessor, the streaming multiprocessor including the multiple processing elements and the scheduler.

17. The general-purpose graphics processing unit as in claim 16, the streaming multiprocessor additionally including a dispatch unit, wherein the dispatch unit is to dispatch threads to the multiple processing elements.

18. The general-purpose graphics processing unit as in claim 17, the streaming multiprocessor additionally including a register file to store independent thread state.

19. A method of managing thread execution on a general-purpose graphics processing unit, the method comprising:
scheduling a warp to multiple processing elements of the general-purpose graphics processing unit at sub-warp granularity, wherein the warp includes a group of parallel threads, the warp includes multiple sub-warps, each sub-warp includes a sub-group of parallel threads, and threads within the warp can diverge at sub-warp granularity; and
grouping active threads from a first sub-warp from a first warp of threads to execute concurrently on the multiple processing elements with active threads of a second sub-warp from a second warp of threads, the multiple processing elements having a single instruction, multiple thread (SIMT) architecture, the multiple processing elements enabled to perform hardware multithreading, wherein execution context for threads executed by the multiple processing elements is maintained on-chip during execution.

20. The method as in claim 19, additionally comprising maintaining per-thread execution state on the multiple processing elements and switching between execution contexts on the multiple processing elements.

21. The method as in claim 20, additionally comprising yielding execution at per-thread granularity on the multiple processing elements.

22. The method as in claim 21, wherein switching between the execution contexts includes retrieving per-thread execution state from a register file within the general-purpose graphics processing unit.

23. The method as in claim 19, wherein the first warp of threads includes 32 threads, the second warp of threads includes 32 threads, and each sub-warp includes fewer than 32 threads.

24. A graphics processing system comprising:
a memory device; and
a streaming multiprocessor coupled with the memory device, the streaming multiprocessor including:
multiple processing elements having a single instruction, multiple thread (SIMT) architecture including hardware multithreading, the multiple processing elements to execute multiple warps of threads, wherein a warp includes a group of parallel threads and execution context for threads to be executed is maintained within the streaming multiprocessor during execution;
a scheduler to schedule a set of sub-warps to the multiple processing elements at sub-warp granularity, wherein a sub-warp includes a sub-group of parallel threads, a warp includes multiple sub-warps; and
a logic unit including hardware or firmware logic, the logic unit to group active threads for execution on the multiple processing elements.

25. The graphics processing system as in claim 24, wherein the scheduler is to schedule threads in a first sub-warp of a first warp of threads to execute concurrently with threads in a second sub-warp of a second warp of threads.

26. The graphics processing system as in claim 25, wherein the multiple processing elements are to maintain per-thread execution state and switch between execution contexts and yield execution at per-thread granularity during execution of multiple warps of threads.

27. The graphics processing system as in claim 26, wherein multiple processing elements are to complete the first sub-warp and execute a third sub-warp of threads after the first sub-warp completes.

28. The graphics processing system as in claim 27, wherein the streaming multiprocessor additionally includes a dispatch unit to dispatch threads to the multiple processing elements and a register file to store independent thread state.

29. The graphics processing system as in claim 25, wherein the first warp of threads includes 32 threads, the second warp of threads includes 32 threads, and each sub-warp includes fewer than 32 threads.

* * * * *